United States Patent
Gottwein et al.

(10) Patent No.: US 12,497,598 B2
(45) Date of Patent: Dec. 16, 2025

(54) METHOD OF PURIFYING WHOLE VIRUS PARTICLES

(71) Applicant: Hvidovre Hospital, Hvidovre (DK)

(72) Inventors: Judith Margarete Gottwein, Frederiksberg C (DK); Jens Bukh, Præstø (DK); Anna Offersgaard, København Ø (DK); Anne Finne Pihl, København Ø (DK); Michael Wolff, Wandlitz (DE); Keven Lothert, Giessen (DE)

(73) Assignee: Hvidovre Hospital, Hvidovre (DK)

( * ) Notice: Subject to any disclaimer, the term of this patent is extended or adjusted under 35 U.S.C. 154(b) by 529 days.

(21) Appl. No.: 18/016,150

(22) PCT Filed: Jul. 12, 2021

(86) PCT No.: PCT/EP2021/069300
§ 371 (c)(1),
(2) Date: Jan. 13, 2023

(87) PCT Pub. No.: WO2022/013139
PCT Pub. Date: Jan. 20, 2022

(65) Prior Publication Data
US 2023/0272350 A1 Aug. 31, 2023

(30) Foreign Application Priority Data
Jul. 17, 2020 (EP) .................................... 20186549

(51) Int. Cl.
*C12N 7/00* (2006.01)
*G01N 30/88* (2006.01)

(52) U.S. Cl.
CPC ...... *C12N 7/00* (2013.01); *C12N 2770/24222* (2013.01); *C12N 2770/24223* (2013.01); *C12N 2770/24234* (2013.01); *C12N 2770/24252* (2013.01); *C12N 2770/24261* (2013.01); *G01N 2030/8813* (2013.01)

(58) Field of Classification Search
CPC .................. C12N 7/00; C12N 15/86; C12N 2770/24252; C12N 2770/24261; G01N 2030/8813
See application file for complete search history.

(56) References Cited

U.S. PATENT DOCUMENTS

2013/0164821 A1  6/2013  Faber et al.

FOREIGN PATENT DOCUMENTS

| EP | 2484378 A1 | 8/2012 |
|---|---|---|
| WO | WO 98/26048 A1 | 6/1998 |
| WO | WO 2008/125361 A1 | 10/2008 |
| WO | WO 2015/158353 A1 | 10/2015 |
| WO | WO 2017/076553 A1 | 5/2017 |

OTHER PUBLICATIONS

Lothert, Keven et al., "Membrane-based steric exclusion chromatography for the purification of a recombinant baculovirus and its application for cell therapy" Journal of Virological Methods, 2020, pp. 1-11, vol. 275, No. 113756.
Lothert, Keven et al., "Development of a downstream process for the production of an inactivated whole hepatitis C virus vaccine" Scientific Reports, 2020, vol. 10, No. 16261.
Marichal-Gallardo, Pavel Alejandro "Chromatographic purification of biological macromolecules by their capture on hydrophilic surfaces with the aid of non-ionic polymers" Dissertation, Universität Madgeburg, Nov. 2019, pp. 1-117.
Opitz, Lars et al., "Sulfated Membrane Adsorbers for Economic Pseudo-Affinity Capture of Influenza Virus Particles" Biotechnology and Bioengineering, Aug. 2009, pp. 1144-1154, vol. 103, No. 6.
Weigel, Thomas et al., "A membrane-based purification process for cell culture-derived influenza A virus" Journal of Biotechnology, 2016, pp. 12-20, vol. 220.
International Search Report for PCT/EP2021/069300 dated Oct. 27, 2021.

*Primary Examiner* — Padmashri Ponnaluri
(74) *Attorney, Agent, or Firm* — Knobbe, Martens, Olson & Bear, LLP

(57) ABSTRACT

The present invention relates to a method of purifying whole HCV particles, the method comprising the steps of a) providing a cell culture supernatant comprising virus particles, b) purification and/or concentration of the cell culture supernatant, c) purification and/or concentration of the product of above step b) using steric exclusion chromatography (SXC) at alkaline pH in the range of 8-10, d) purification and/or concentration of the product of the above step c) using sulphated cellulose membrane absorbers (SCMA), e) obtaining whole virus particles.

15 Claims, 9 Drawing Sheets
Specification includes a Sequence Listing.

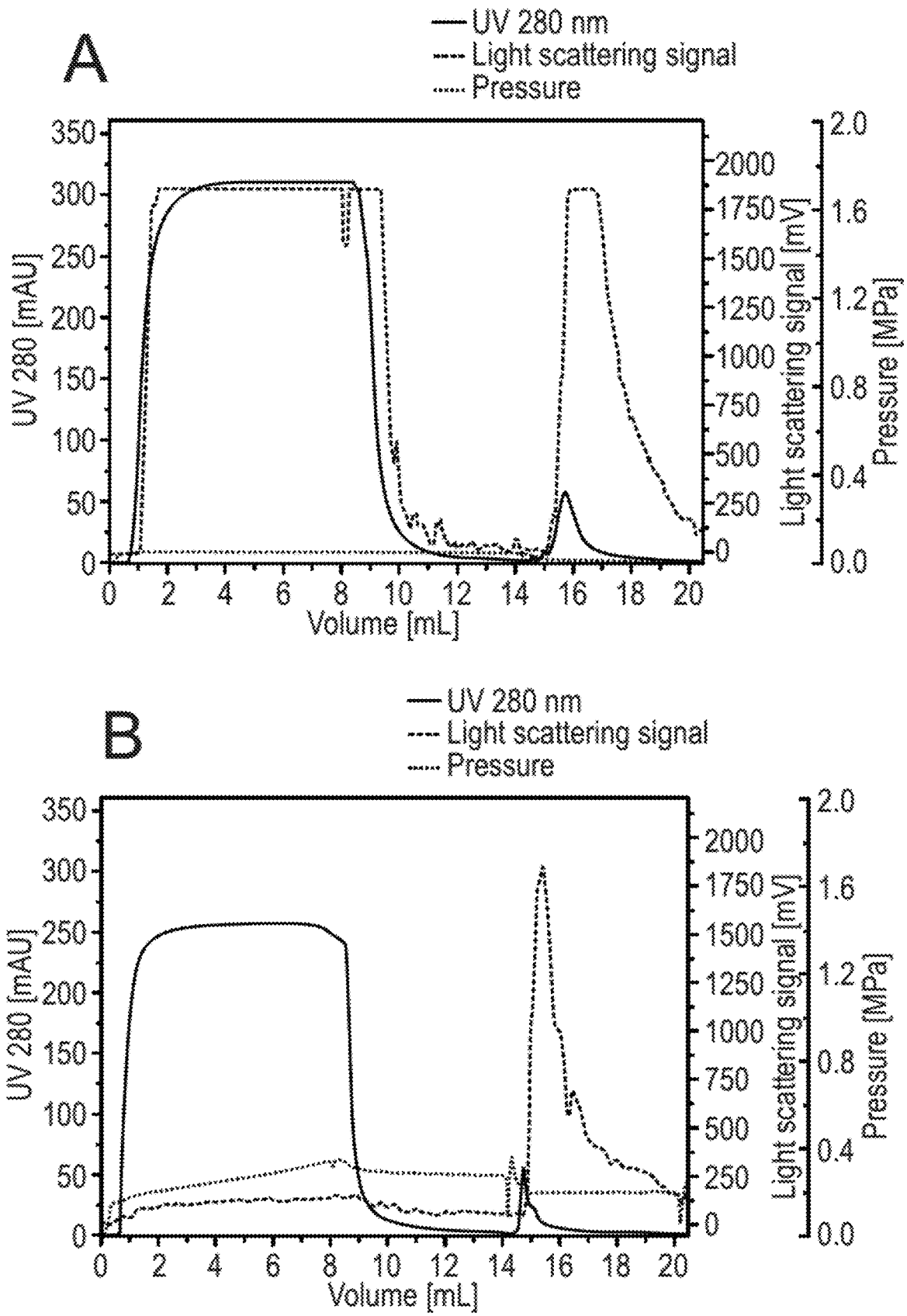
Fig. 2A-B

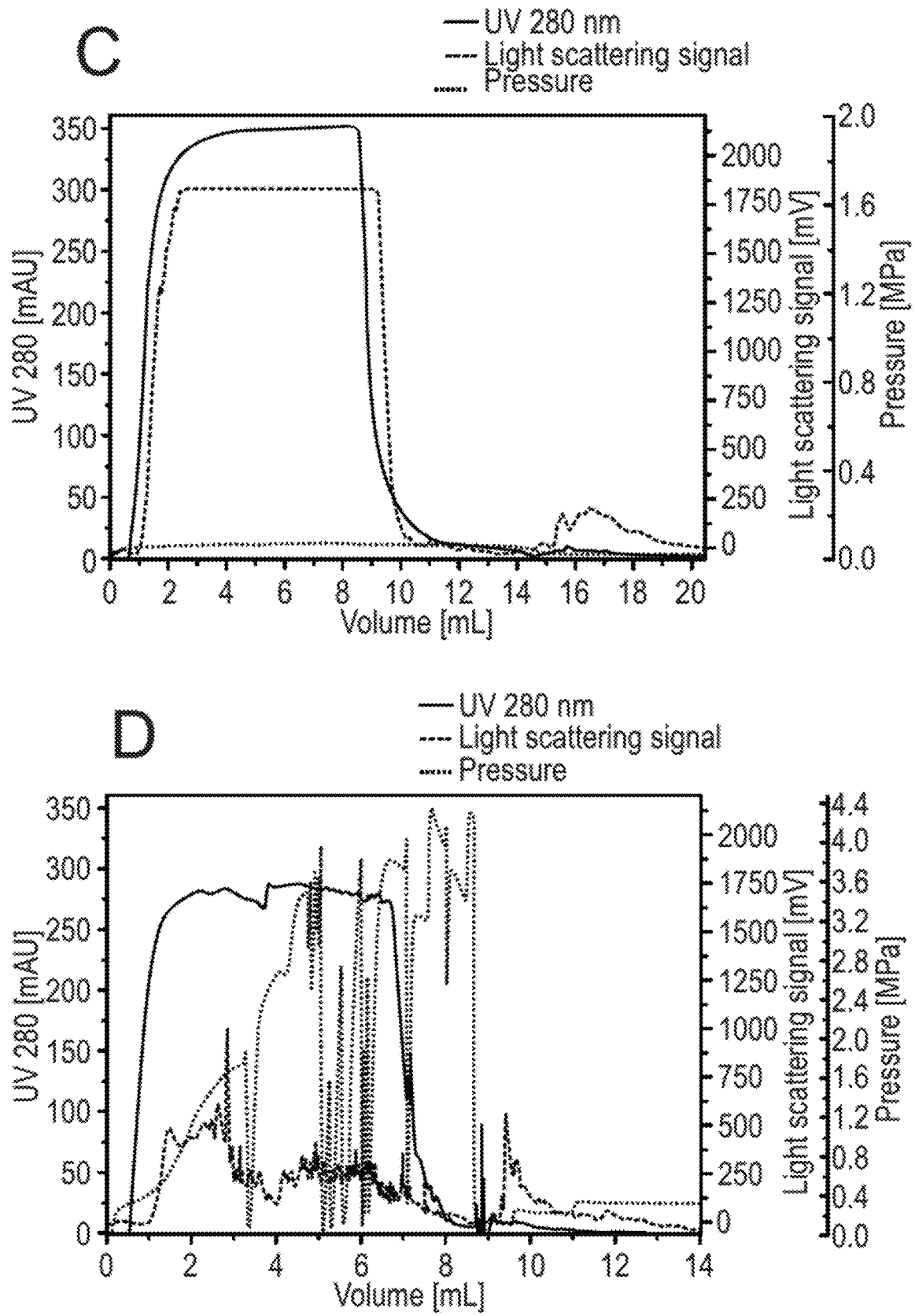
Fig. 2C-D

Fig. 4A-B

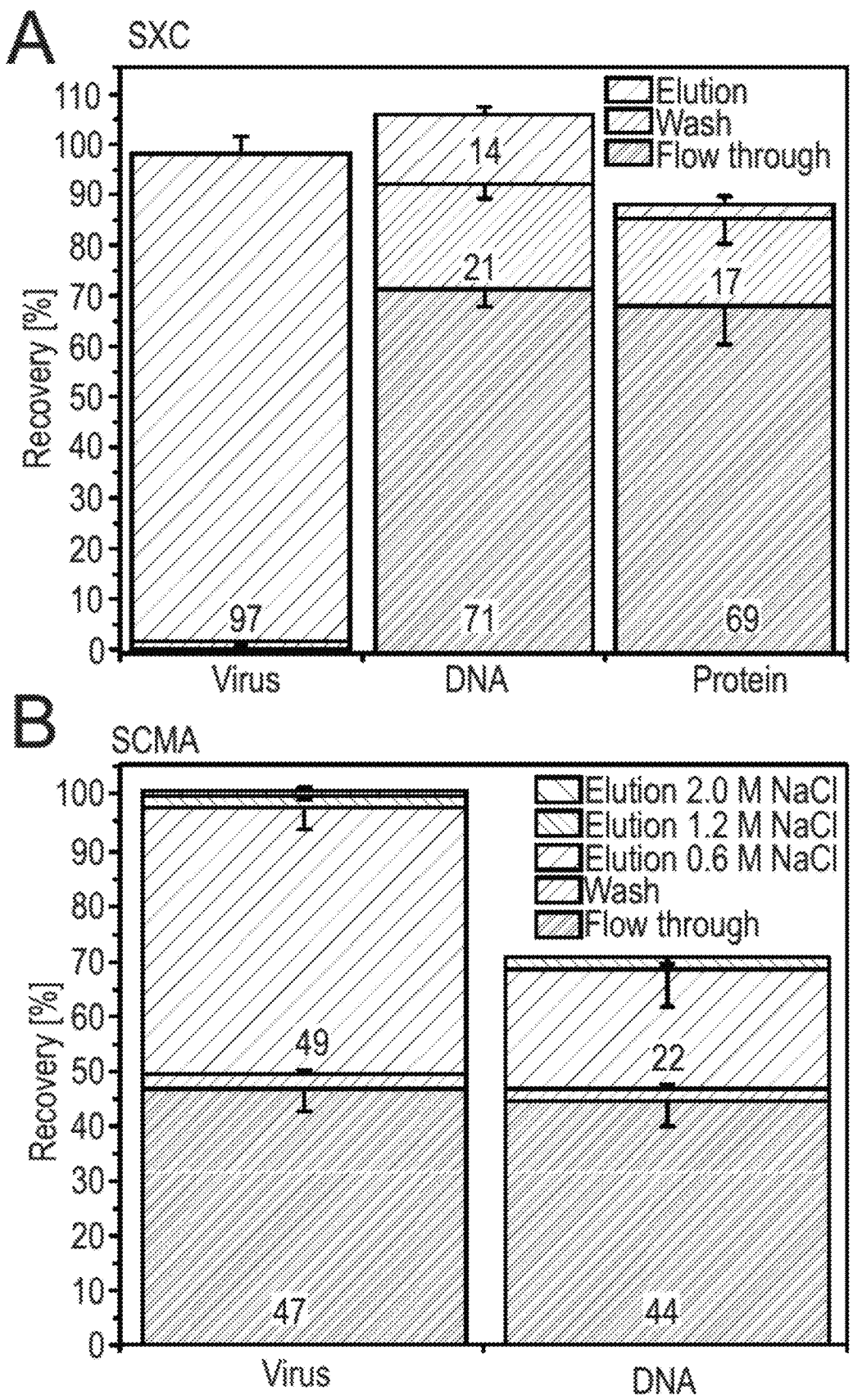
Fig. 6A-B

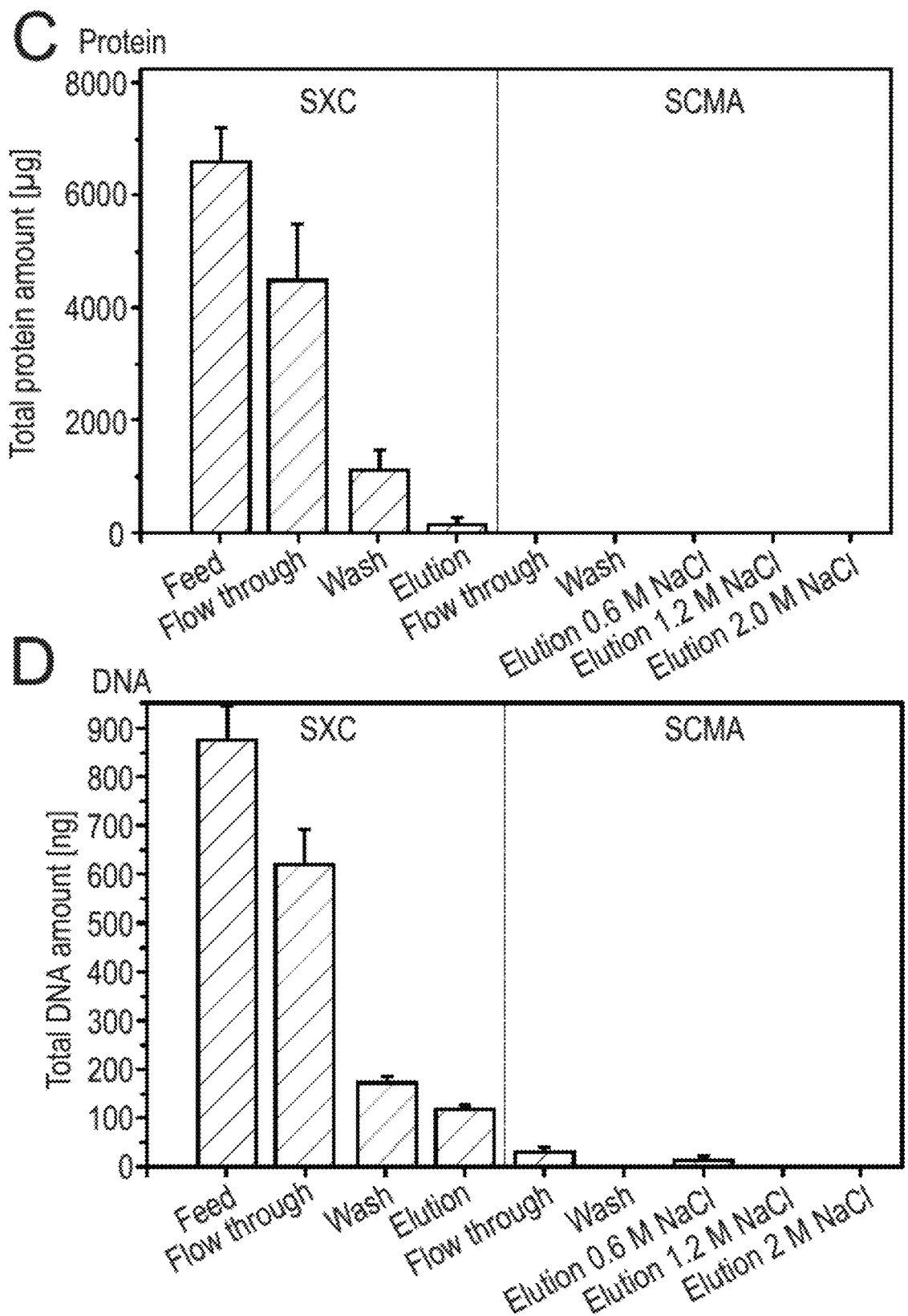
Fig. 6C-D

SEQUENCE LISTING

```
<160> NUMBER OF SEQ ID NOS: 7

<210> SEQ ID NO 1
<211> LENGTH: 3011
<212> TYPE: PRT
<213> ORGANISM: Hepatitis C virus

<400> SEQUENCE: 1

Met Ser Thr Asn Pro Lys Pro Gln Arg Lys Thr Lys Arg Asn Thr Asn
1               5                   10                  15

Arg Arg Pro Gln Asp Val Lys Phe Pro Gly Gly Gly Gln Ile Val Gly
            20                  25                  30

Gly Val Tyr Leu Leu Pro Arg Arg Gly Pro Arg Leu Gly Val Arg Ala
        35                  40                  45

Thr Arg Lys Thr Ser Glu Arg Ser Gln Pro Arg Gly Arg Arg Gln Pro
    50                  55                  60

Ile Pro Lys Ala Arg Arg Pro Glu Gly Arg Thr Trp Ala Gln Pro Gly
65                  70                  75                  80

Tyr Pro Trp Pro Leu Tyr Gly Asn Glu Gly Cys Gly Trp Ala Gly Trp
                85                  90                  95

Leu Leu Ser Pro Arg Gly Ser Arg Pro Ser Trp Gly Pro Thr Asp Pro
            100                 105                 110

Arg Arg Arg Ser Arg Asn Leu Gly Lys Val Ile Asp Thr Leu Thr Cys
        115                 120                 125

Gly Phe Ala Asp Leu Met Gly Tyr Ile Pro Leu Val Gly Ala Pro Leu
    130                 135                 140
```

-continued

Gly Gly Ala Ala Arg Ala Leu Ala His Gly Val Arg Val Leu Glu Asp
145                 150                 155                 160

Gly Val Asn Tyr Ala Thr Gly Asn Leu Pro Gly Cys Ser Phe Ser Ile
            165                 170                 175

Phe Leu Leu Ala Leu Leu Ser Cys Leu Thr Gly Pro Ala Ser Ala Tyr
        180                 185                 190

Gln Val Arg Asn Ser Thr Gly Leu Tyr His Val Thr Asn Asp Cys Pro
    195                 200                 205

Asn Ser Ser Ile Val Phe Glu Ala Ala Asp Ala Ile Leu His Thr Pro
    210                 215                 220

Gly Cys Val Pro Cys Val Arg Glu Gly Asn Ala Ser Arg Cys Trp Val
225                 230                 235                 240

Ala Val Thr Pro Thr Val Ala Thr Arg Asp Gly Lys Leu Pro Thr Thr
                245                 250                 255

Gln Leu Arg Arg His Ile Asp Leu Leu Val Gly Ser Ala Thr Leu Cys
        260                 265                 270

Ser Ala Leu Tyr Val Gly Asp Leu Cys Gly Ser Val Phe Leu Val Gly
        275                 280                 285

Gln Leu Phe Thr Phe Ser Pro Arg Arg His Trp Thr Thr Gln Asp Cys
    290                 295                 300

Asn Cys Ser Ile Tyr Pro Gly His Ile Ser Gly His Arg Met Ala Trp
305                 310                 315                 320

Asp Met Met Met Asn Trp Ser Pro Thr Ala Leu Leu Val Ala Gln
                325                 330                 335

Leu Leu Arg Ile Pro Gln Ala Ile Leu Asp Met Ile Ala Gly Ala His
            340                 345                 350

Trp Gly Val Leu Ala Gly Met Ala Tyr Phe Ser Met Val Gly Asn Trp
        355                 360                 365

Ala Lys Val Leu Val Val Leu Leu Leu Phe Ala Gly Val Asp Ala Glu
    370                 375                 380

Thr Tyr Val Thr Gly Gly Ser Ala Ala Arg Thr Thr Ala Gly Leu Ala
385                 390                 395                 400

Ser Leu Phe Ser Pro Gly Ala Lys Gln Asn Ile Gln Leu Val Asn Thr
        405                 410                 415

Asn Gly Ser Trp His Ile Asn Ser Thr Ala Leu Asn Cys Asn Asp Ser
            420                 425                 430

Leu Asn Thr Gly Trp Ile Ala Gly Leu Phe Tyr His His Lys Phe Asn
    435                 440                 445

Ser Ser Gly Cys Ser Glu Arg Leu Ala Ser Cys Arg Pro Leu Thr Asp
450                 455                 460

Phe Ala Gln Gly Trp Gly Pro Ile Ser His Ala Asp Gly Ser Gly Pro
465                 470                 475                 480

Asp Gln Arg Pro Tyr Cys Trp His Tyr Pro Pro Lys Pro Cys Gly Ile
            485                 490                 495

Val Pro Ala Lys Ser Val Cys Gly Pro Val Tyr Cys Phe Thr Pro Ser
            500                 505                 510

Pro Val Val Val Gly Thr Thr Asp Arg Ser Gly Ala Pro Thr Tyr Ser
        515                 520                 525

Trp Gly Ala Asn Asp Thr Asp Val Phe Val Leu Asn Thr Arg Pro
        530                 535                 540

Pro Leu Gly Asn Trp Phe Gly Cys Thr Trp Met Asn Ser Thr Gly Phe
545                 550                 555                 560

Thr Lys Val Cys Gly Ala Pro Pro Cys Val Ile Gly Gly Val Gly Asn

```
                565                 570                 575
Asn Thr Leu Arg Cys Pro Thr Asp Cys Phe Arg Lys His Pro Glu Ala
                580                 585                 590
Thr Tyr Ser Arg Cys Gly Ser Gly Pro Trp Ile Thr Pro Arg Cys Leu
                595                 600                 605
Val Asp Tyr Pro Tyr Arg Leu Trp His Tyr Pro Cys Thr Ile Asn Tyr
610                 615                 620
Thr Val Phe Lys Val Arg Met Tyr Val Gly Gly Val Glu His Arg Leu
625                 630                 635                 640
Glu Ala Ala Cys Asn Trp Thr Arg Gly Asp Arg Cys Asn Leu Asp Asp
                645                 650                 655
Arg Asp Arg Ser Glu Leu Ser Pro Leu Leu Leu Ser Thr Thr Gln Trp
                660                 665                 670
Gln Val Leu Pro Cys Ser Phe Thr Thr Leu Pro Ala Leu Ser Thr Gly
                675                 680                 685
Leu Ile His Leu His Gln Asn Ile Val Asp Val Gln Tyr Leu Tyr Gly
                690                 695                 700
Val Gly Ser Ser Ile Ala Ser Trp Ala Ile Lys Trp Glu Tyr Val Val
705                 710                 715                 720
Leu Leu Phe Leu Leu Leu Ala Asp Ala Arg Val Cys Ser Cys Leu Trp
                725                 730                 735
Met Met Leu Leu Ile Ser Gln Val Glu Ala Ala Leu Glu Asn Leu Val
                740                 745                 750
Val Leu Asn Ala Ala Ser Leu Ala Gly Thr His Gly Leu Val Ser Phe
                755                 760                 765
Leu Val Phe Phe Cys Phe Ala Trp Tyr Leu Lys Gly Lys Trp Val Pro
                770                 775                 780
Gly Ala Val Tyr Ala Leu Tyr Gly Met Trp Pro Leu Leu Leu Leu Leu
785                 790                 795                 800
Leu Ala Leu Pro Gln Arg Ala Tyr Ala Leu Asp Thr Glu Val Ala Ala
                805                 810                 815
Ser Cys Gly Gly Val Val Leu Val Gly Leu Met Ala Leu Thr Leu Ser
                820                 825                 830
Pro Tyr Tyr Lys Arg Tyr Ile Ser Trp Cys Leu Trp Trp Leu Gln Tyr
                835                 840                 845
Phe Leu Thr Arg Ile Glu Ala Gln Leu His Val Trp Ile Pro Pro Leu
                850                 855                 860
Asn Val Arg Gly Gly Arg Asp Ala Val Ile Leu Leu Met Cys Val Val
865                 870                 875                 880
His Pro Ala Leu Val Phe Asp Ile Thr Lys Leu Leu Leu Ala Ala Phe
                885                 890                 895
Gly Pro Leu Trp Ile Leu Gln Ala Ser Leu Leu Lys Val Pro Tyr Phe
                900                 905                 910
Val Arg Val Gln Gly Leu Leu Arg Ile Cys Ala Leu Ala Arg Lys Met
                915                 920                 925
Ala Gly Gly His Tyr Val Gln Met Ala Ile Ile Lys Leu Gly Ala Leu
                930                 935                 940
Thr Gly Thr Tyr Val Tyr Asn His Leu Thr Pro Leu Arg Asp Trp Ala
945                 950                 955                 960
His Asn Gly Leu Arg Asp Leu Ala Val Ala Val Glu Pro Val Val Phe
                965                 970                 975
Ser Arg Met Glu Thr Lys Leu Ile Thr Trp Gly Ala Asp Thr Ala Ala
                980                 985                 990
```

```
Cys Gly Asp Ile Ile Asn Gly Leu  Pro Val Ser Ala Arg  Arg Gly Arg
        995              1000              1005

Glu Ile  Leu Leu Gly Pro Ala  Asp Gly Met Val Ser  Lys Gly Trp
    1010              1015              1020

Arg Leu  Leu Ala Pro Ile Thr  Ala Tyr Ala Gln Gln  Thr Arg Gly
    1025              1030              1035

Leu Leu  Gly Cys Ile Ile Thr  Ser Leu Thr Gly Arg  Asp Lys Asn
    1040              1045              1050

Gln Val  Glu Gly Glu Ile Gln  Ile Val Ser Thr Ala  Ala Gln Thr
    1055              1060              1065

Phe Leu  Ala Thr Cys Ile Asn  Gly Val Cys Trp Thr  Val Tyr His
    1070              1075              1080

Gly Ala  Gly Thr Arg Thr Ile  Ala Ser Pro Lys Gly  Pro Val Ile
    1085              1090              1095

Gln Met  Tyr Thr Asn Val Asp  Lys Asp Leu Val Gly  Trp Pro Ala
    1100              1105              1110

Pro Gln  Gly Ala Arg Ser Leu  Thr Pro Cys Thr Cys  Gly Ser Ser
    1115              1120              1125

Asp Leu  Tyr Leu Val Thr Arg  His Ala Asp Val Ile  Pro Val Arg
    1130              1135              1140

Arg Arg  Gly Asp Ser Arg Gly  Ser Leu Leu Ser Pro  Arg Pro Ile
    1145              1150              1155

Ser Tyr  Leu Lys Gly Ser Ser  Gly Gly Pro Leu Leu  Cys Pro Ala
    1160              1165              1170

Gly His  Ala Val Gly Leu Phe  Arg Ala Ala Val Cys  Thr Arg Gly
    1175              1180              1185

Val Ala  Lys Ala Val Asp Phe  Ile Pro Val Glu Asn  Leu Glu Thr
    1190              1195              1200

Thr Met  Arg Ser Pro Val Phe  Thr Asp Asn Ser Ser  Pro Pro Ala
    1205              1210              1215

Val Pro  Gln Ser Phe Gln Val  Gly His Leu His Ala  Pro Thr Gly
    1220              1225              1230

Ser Gly  Lys Ser Thr Lys Val  Pro Ala Ala Tyr Ala  Ala Gln Gly
    1235              1240              1245

Tyr Lys  Val Leu Val Leu Asn  Pro Ser Val Ala Ala  Thr Leu Gly
    1250              1255              1260

Phe Gly  Ala Tyr Met Ser Lys  Ala His Gly Val Asp  Pro Asn Ile
    1265              1270              1275

Arg Thr  Gly Val Arg Thr Ile  Thr Thr Gly Ser Pro  Ile Thr Tyr
    1280              1285              1290

Ser Thr  Tyr Gly Lys Phe Leu  Ala Asp Gly Gly Cys  Ser Gly Gly
    1295              1300              1305

Ala Tyr  Asp Ile Ile Ile Cys  Asp Glu Cys His Ser  Thr Asp Ala
    1310              1315              1320

Thr Ser  Ile Leu Gly Ile Gly  Thr Val Leu Asp Gln  Ala Glu Thr
    1325              1330              1335

Ala Gly  Ala Arg Leu Val Val  Leu Ala Thr Ala Thr  Pro Pro Gly
    1340              1345              1350

Ser Ile  Thr Val Pro His Pro  Asn Ile Glu Glu Val  Ala Leu Ser
    1355              1360              1365

Thr Thr  Gly Glu Ile Pro Phe  Tyr Gly Lys Ala Ile  Pro Leu Glu
    1370              1375              1380
```

```
Ala Ile Lys Gly Gly Arg His Leu Ile Phe Cys His Ser Lys Lys
1385                1390                1395

Lys Cys Asp Glu Leu Ala Ala Lys Leu Val Ala Leu Gly Ile Asn
1400                1405                1410

Ala Val Ala Tyr Tyr Arg Gly Leu Asp Val Ser Val Ile Pro Thr
1415                1420                1425

Ser Gly Asp Val Val Val Ala Thr Asp Ala Leu Met Thr Gly
1430                1435                1440

Tyr Thr Gly Asp Phe Asp Ser Val Ile Asp Cys Asn Thr Cys Val
1445                1450                1455

Thr Gln Thr Val Asp Leu Ser Leu Asp Pro Thr Phe Thr Ile Glu
1460                1465                1470

Thr Thr Thr Leu Pro Gln Asp Ala Val Ser Arg Thr Gln Arg Arg
1475                1480                1485

Gly Arg Thr Gly Arg Gly Lys Pro Gly Ile Tyr Arg Phe Val Ala
1490                1495                1500

Leu Gly Glu Arg Pro Ser Gly Met Phe Asp Ser Ser Val Leu Cys
1505                1510                1515

Glu Cys Tyr Asp Ala Gly Cys Ala Trp Tyr Glu Leu Thr Pro Ala
1520                1525                1530

Glu Thr Thr Val Arg Leu Arg Ala Tyr Met Asn Thr Pro Gly Leu
1535                1540                1545

Pro Val Cys Gln Asp His Leu Glu Phe Trp Glu Gly Val Phe Thr
1550                1555                1560

Gly Leu Thr His Ile Asp Ala His Phe Leu Ser Gln Thr Lys Gln
1565                1570                1575

Ser Gly Glu Asn Phe Pro Tyr Leu Val Ala Tyr Gln Ala Thr Val
1580                1585                1590

Cys Ala Arg Ala Gln Ala Pro Pro Ser Trp Asp Gln Met Trp
1595                1600                1605

Lys Cys Leu Thr Arg Leu Lys Pro Thr Leu His Gly Pro Thr Pro
1610                1615                1620

Leu Leu Tyr Arg Leu Gly Ala Val Gln Asn Glu Val Thr Leu Thr
1625                1630                1635

His Pro Ile Thr Lys Tyr Ile Met Thr Cys Met Ser Ala Asp Leu
1640                1645                1650

Glu Val Val Thr Ser Thr Trp Val Leu Val Gly Gly Val Leu Ala
1655                1660                1665

Ala Leu Ala Ser Tyr Cys Leu Ser Thr Gly Cys Val Val Ile Val
1670                1675                1680

Gly Arg Ile Val Leu Ser Gly Lys Pro Ala Ile Ile Pro Asp Arg
1685                1690                1695

Glu Val Leu Tyr Arg Glu Phe Asp Glu Met Glu Glu Cys Ser Gln
1700                1705                1710

His Leu Pro Tyr Ile Glu Gln Gly Met Met Leu Ala Glu Gln Phe
1715                1720                1725

Lys Gln Lys Ala Leu Gly Leu Leu Gln Thr Ala Ser Arg Gln Ala
1730                1735                1740

Glu Val Val Ala Pro Ala Val Gln Thr Asn Trp Gln Lys Leu Glu
1745                1750                1755

Ala Phe Trp Ala Lys His Met Trp Asn Phe Ile Ser Gly Ile His
1760                1765                1770

Tyr Leu Ala Gly Leu Ser Thr Leu Pro Gly Asn Pro Ala Ile Ala
```

```
                1775                1780                1785

Ser Leu Met Ala Phe Thr Ala Ala Val Thr Ser Pro Leu Thr Thr
    1790                1795                1800

Ser Gln Thr Leu Leu Phe Asn Ile Leu Gly Gly Trp Val Ala Ala
    1805                1810                1815

Gln Leu Ala Ala Pro Gly Ala Ala Thr Ala Phe Val Gly Ala Gly
    1820                1825                1830

Leu Ala Gly Ala Ala Ile Gly Ser Val Gly Leu Gly Lys Val Leu
    1835                1840                1845

Val Asp Ile Leu Ala Gly Tyr Gly Ala Gly Val Ala Gly Ala Leu
    1850                1855                1860

Val Ala Phe Lys Ile Met Ser Gly Glu Val Pro Ser Thr Glu Asp
    1865                1870                1875

Leu Val Asn Leu Leu Pro Ala Ile Leu Ser Pro Gly Ala Leu Val
    1880                1885                1890

Val Gly Val Val Cys Ala Ala Ile Leu Arg Arg His Val Gly Pro
    1895                1900                1905

Gly Glu Gly Ala Val Gln Trp Met Asn Arg Leu Ile Ala Phe Ala
    1910                1915                1920

Ser Arg Gly Thr His Val Ser Pro Thr His Tyr Val Pro Glu Ser
    1925                1930                1935

Asp Ala Ala Arg Val Thr Thr Ile Leu Ser Ser Leu Thr Val
    1940                1945                1950

Thr Gln Leu Leu Arg Arg Leu His Gln Trp Ile Ser Ser Glu Cys
    1955                1960                1965

Thr Thr Pro Cys Ser Gly Ser Trp Leu Arg Asp Ile Trp Asp Trp
    1970                1975                1980

Ile Cys Glu Val Leu Ser Asp Phe Lys Thr Trp Leu Lys Ala Lys
    1985                1990                1995

Leu Met Pro Gln Leu Pro Gly Ile Pro Phe Val Ser Cys Gln Arg
    2000                2005                2010

Gly Tyr Lys Gly Val Trp Arg Gly Asp Gly Ile Met His Thr Arg
    2015                2020                2025

Cys His Cys Gly Ala Glu Ile Thr Gly His Val Lys Asn Gly Thr
    2030                2035                2040

Met Arg Ile Val Gly Pro Lys Thr Cys Arg Asn Met Trp Ser Gly
    2045                2050                2055

Thr Phe Pro Ile Asn Ala Tyr Thr Thr Gly Pro Cys Thr Pro Leu
    2060                2065                2070

Pro Ala Pro Asn Tyr Thr Phe Ala Leu Trp Arg Val Ser Ala Glu
    2075                2080                2085

Glu Tyr Val Glu Ile Arg Gln Val Gly Asp Phe His Tyr Val Thr
    2090                2095                2100

Gly Met Thr Thr Asp Asn Leu Lys Cys Pro Cys Gln Val Pro Ser
    2105                2110                2115

Pro Glu Phe Phe Thr Glu Leu Asp Gly Val Arg Leu His Arg Phe
    2120                2125                2130

Ala Pro Pro Cys Lys Pro Leu Leu Arg Glu Glu Val Ser Phe Arg
    2135                2140                2145

Val Gly Leu His Glu Tyr Pro Val Gly Ser Gln Leu Pro Cys Glu
    2150                2155                2160

Pro Glu Pro Asp Val Ala Val Leu Thr Ser Met Leu Thr Asp Pro
    2165                2170                2175
```

```
Ser His Ile Thr Ala Glu Ala Ala Gly Arg Arg Leu Ala Arg Gly
2180                2185                2190

Ser Pro Pro Ser Met Ala Ser Ser Ser Ala Ser Gln Leu Ser Ala
2195                2200                2205

Pro Ser Leu Arg Ala Thr Cys Thr Thr Asn His Asp Ser Pro Asp
2210                2215                2220

Ala Glu Leu Ile Glu Ala Asn Leu Leu Trp Arg Gln Glu Met Gly
2225                2230                2235

Gly Asn Ile Thr Arg Val Glu Ser Glu Asn Lys Val Val Ile Leu
2240                2245                2250

Asp Ser Phe Asp Pro Leu Val Ala Glu Glu Asp Glu Arg Glu Val
2255                2260                2265

Ser Val Pro Ala Glu Ile Leu Arg Lys Ser Arg Lys Phe Thr Pro
2270                2275                2280

Ala Leu Pro Ile Trp Ala Arg Pro Asp Tyr Asn Pro Pro Leu Val
2285                2290                2295

Glu Pro Trp Lys Lys Pro Asp Tyr Glu Pro Pro Val Val His Gly
2300                2305                2310

Cys Pro Leu Pro Pro Gln Ser Pro Pro Val Pro Pro Pro Arg
2315                2320                2325

Lys Lys Arg Thr Val Ile Leu Thr Glu Ser Thr Leu Pro Thr Ala
2330                2335                2340

Leu Ala Glu Leu Ala Thr Lys Ser Phe Gly Ser Ser Ser Thr Ser
2345                2350                2355

Gly Ile Thr Gly Asp Asp Thr Thr Thr Ser Pro Glu Pro Ala Ser
2360                2365                2370

Ser Ser Cys Pro Pro Asp Ser Asp Ala Glu Ser Tyr Ser Ser Met
2375                2380                2385

Pro Pro Leu Glu Gly Glu Pro Gly Asp Pro Asp Leu Ser Asp Gly
2390                2395                2400

Ser Trp Ser Thr Val Ser Ser Glu Ala Asp Lys Glu Asp Val Val
2405                2410                2415

Cys Cys Ser Met Ser Tyr Thr Trp Thr Gly Ala Leu Val Thr Pro
2420                2425                2430

Cys Ala Ala Glu Glu Gln Lys Leu Pro Ile Asn Ala Leu Ser Asn
2435                2440                2445

Ser Leu Leu Arg His His Asn Leu Val Tyr Ser Thr Thr Ser Arg
2450                2455                2460

Ser Ala Cys Gln Arg Gln Lys Lys Val Thr Phe Asp Arg Leu Gln
2465                2470                2475

Val Leu Asp Ser His Tyr Gln Asp Val Leu Lys Glu Val Lys Ala
2480                2485                2490

Ala Ala Ser Lys Val Lys Ala Asn Leu Leu Ser Val Glu Glu Ala
2495                2500                2505

Cys Ser Leu Thr Pro Pro His Ser Ala Lys Ser Lys Phe Gly Tyr
2510                2515                2520

Gly Ala Lys Asp Val Arg Cys His Ala Arg Lys Ala Val Asn His
2525                2530                2535

Ile Asn Ser Val Trp Lys Asp Leu Leu Glu Asp Ser Val Thr Pro
2540                2545                2550

Ile Asp Thr Thr Ile Met Ala Lys Asn Glu Val Phe Cys Val Gln
2555                2560                2565
```

```
Pro Glu Lys Gly Gly Arg Lys Pro Ala Arg Leu Ile Val Phe Pro
2570                2575                2580

Asp Leu Gly Val Arg Val Cys Glu Lys Met Ala Leu Tyr Asp Val
2585                2590                2595

Val Ser Lys Leu Pro Leu Ala Val Met Gly Ser Ser Tyr Gly Phe
2600                2605                2610

Gln Tyr Ser Pro Gly Gln Arg Val Glu Phe Leu Val Gln Ala Trp
2615                2620                2625

Lys Ser Lys Lys Thr Pro Met Gly Phe Ser Tyr Asp Thr Arg Cys
2630                2635                2640

Phe Asp Ser Thr Val Thr Glu Asn Asp Ile Arg Thr Glu Glu Ala
2645                2650                2655

Ile Tyr Gln Cys Cys Asp Leu Asp Pro Gln Ala Arg Val Ala Ile
2660                2665                2670

Lys Ser Leu Thr Glu Arg Leu Tyr Val Gly Gly Pro Leu Thr Asn
2675                2680                2685

Ser Arg Gly Glu Asn Cys Gly Tyr Arg Arg Cys Arg Ala Ser Gly
2690                2695                2700

Val Leu Thr Thr Ser Cys Gly Asn Thr Leu Thr Cys Tyr Ile Lys
2705                2710                2715

Ala Arg Ala Ala Cys Arg Ala Ala Gly Leu Gln Asp Cys Thr Met
2720                2725                2730

Leu Val Cys Gly Asp Asp Leu Val Val Ile Cys Glu Ser Ala Gly
2735                2740                2745

Val Gln Glu Asp Ala Ala Ser Leu Arg Ala Phe Thr Glu Ala Met
2750                2755                2760

Thr Arg Tyr Ser Ala Pro Pro Gly Asp Pro Pro Gln Pro Glu Tyr
2765                2770                2775

Asp Leu Glu Leu Ile Thr Ser Cys Ser Ser Asn Val Ser Val Ala
2780                2785                2790

His Asp Gly Ala Gly Lys Arg Val Tyr Tyr Leu Thr Arg Asp Pro
2795                2800                2805

Thr Thr Pro Leu Ala Arg Ala Ala Trp Glu Thr Ala Arg His Thr
2810                2815                2820

Pro Val Asn Ser Trp Leu Gly Asn Ile Ile Met Phe Ala Pro Thr
2825                2830                2835

Leu Trp Ala Arg Met Ile Leu Met Thr His Phe Phe Ser Val Leu
2840                2845                2850

Ile Ala Arg Asp Gln Leu Glu Gln Ala Leu Asp Cys Glu Ile Tyr
2855                2860                2865

Gly Ala Cys Tyr Ser Ile Glu Pro Leu Asp Leu Pro Pro Ile Ile
2870                2875                2880

Gln Arg Leu His Gly Leu Ser Ala Phe Ser Leu His Ser Tyr Ser
2885                2890                2895

Pro Gly Glu Ile Asn Arg Val Ala Ala Cys Leu Arg Lys Leu Gly
2900                2905                2910

Val Pro Pro Leu Arg Ala Trp Arg His Arg Ala Arg Asn Val Arg
2915                2920                2925

Ala Arg Leu Leu Ser Arg Gly Gly Arg Ala Ala Ile Cys Gly Lys
2930                2935                2940

Tyr Leu Phe Asn Trp Ala Val Arg Thr Lys Leu Lys Leu Thr Pro
2945                2950                2955

Ile Ala Ala Ala Gly Arg Leu Asp Leu Ser Gly Trp Phe Thr Ala
```

```
           2960              2965              2970
Gly Tyr Ser Gly Gly Gly Ile Phe His Ser Val Ser His Ala Arg
    2975              2980              2985

Pro Arg Trp Phe Trp Ser Cys Leu Leu Leu Leu Ala Ala Gly Val
    2990              2995              3000

Gly Ile Tyr Leu Leu Pro Asn Arg
    3005              3010

<210> SEQ ID NO 2
<211> LENGTH: 9599
<212> TYPE: DNA
<213> ORGANISM: Hepatitis C virus

<400> SEQUENCE: 2
```

| | | | | | |
|---|---|---|---|---|---|
| gccagccccc | tgatggggc | gacactccac | catgaatcac | tccctgtga | ggaactactg | 60 |
| tcttcacgca | gaaagcgtct | agccatggcg | ttagtatgag | tgtcgtgcag | cctccaggac | 120 |
| cccccctccc | gggagagcca | tagtggtctg | cggaaccggt | gagtacaccg | gaattgccag | 180 |
| gacgaccggg | tcctttcttg | gatcaacccg | ctcaatgcct | ggagatttgg | gcgtgccccc | 240 |
| gcaagactgc | tagccgagta | gtgttgggtc | gcgaaaggcc | ttgtggtact | gcctgatagg | 300 |
| gtgcttgcga | gtgccccggg | aggtctcgta | gaccgtgcac | catgagcacg | aatcctaaac | 360 |
| ctcaaagaaa | aaccaaacgt | aacaccaacc | gtcgcccaca | ggacgtcaag | ttcccgggtg | 420 |
| gcggtcagat | cgttggtgga | gtttacttgt | tgccgcgcag | gggccctaga | ttgggtgtgc | 480 |
| gcgcgacgag | gaagacttcc | gagcggtcgc | aacctcgagg | tagacgtcag | cctatcccca | 540 |
| aggcgcgtcg | gcccgagggc | aggacctggg | ctcagcccgg | gtacccttgg | cccctctatg | 600 |
| gcaatgaggg | ttgcgggtgg | gcgggatggc | tcctgtctcc | ccgtggctct | cggcctagct | 660 |
| ggggccccac | ggacccccgg | cgtaggtcgc | gcaatttggg | taaggtcatc | gataccctta | 720 |
| cgtgcggctt | cgccgacctc | atggggtaca | taccgctcgt | cggcgcccct | cttggaggcg | 780 |
| ctgccagggc | cctggcgcat | ggcgtccggg | ttttggaaga | cggcgtgaac | tatgcaacag | 840 |
| ggaaccttcc | tggttgctct | ttctctattt | tccttctggc | cctgctctct | tgtctgactg | 900 |
| gacccgcttc | agcctaccaa | gtcgcgcaact | ccacggggct | ttaccatgtc | accaatgatt | 960 |
| gccccaactc | gagcattgtg | ttcgaggcgg | ctgatgccat | cctgcacact | ccggggtgtg | 1020 |
| tccccttgcgt | acgcgagggt | aacgcctcga | ggtgttgggt | ggcggtaacc | ccacggtgg | 1080 |
| ccaccaggga | tggcaaactc | cccacaacgc | agcttcgacg | tcacatcgat | ctgcttgtcg | 1140 |
| ggagcgccac | cctctgctcg | gcccctttacg | tgggggacct | gtgcgggtct | gtctttcttg | 1200 |
| ttggtcaact | gttcaccttc | tctcccaggc | gccactggac | gacgcaagat | tgcaattgtt | 1260 |
| ctatctaccc | cggccatatt | tcaggtcacc | gtatggcatg | ggatatgatg | atgaactggt | 1320 |
| cccctacggc | ggcgttgttg | gtagctcagc | tgctccggat | cccacaagcc | atcctggaca | 1380 |
| tgatcgctgg | tgctcactgg | ggagtcctgg | cgggcatggc | gtatttctcc | atggtgggga | 1440 |
| actgggcgaa | ggttctggta | gtgctgctgc | tatttgccgg | cgtcgacgcg | aaacctacg | 1500 |
| tcaccggggg | aagtgccgcc | cgtactacgg | ctggacttgc | tagtcttttc | tcaccaggcg | 1560 |
| ccaagcagaa | catccagctg | gtcaacacca | acggcagttg | gcacatcaat | agcacggcct | 1620 |
| tgaactgcaa | tgacagcctc | aacaccggct | ggatagcagg | acttttctat | caccacaaat | 1680 |
| tcaactcttc | gggctgttcc | gagaggttag | ccagctgccg | acccctacc | gattttgccc | 1740 |
| agggctgggg | ccctatcagt | cacgccgacg | gaagtggccc | cgaccaacgc | ccctactgct | 1800 |

```
ggcactaccc tccaaaacct tgtggtattg tgcccgcaaa gagcgtgtgt ggcccggtat    1860
attgtttcac tcccagtccc gtggtggtgg aacgaccga caggtcgggc gcgcctacct    1920
acagctgggg tgcaaatgac acggacgtct tcgtccttaa caacaccagg ccaccgctgg    1980
gcaattggtt cggttgcacc tggatgaact caactggatt caccaaagtg tgcggagcgc    2040
ccccttgcgt catcggaggg gtgggcaaca acaccttgcg ctgccccact gattgtttcc    2100
gcaagcatcc ggaagccaca tactctcggt gcggctccgg tccctggatt acgcccaggt    2160
gcctggtcga ctaccgtat aggctttggc attatccttg taccatcaac tacaccgtgt     2220
ttaaagtcag gatgtacgtg ggaggggtcg agcacaggct ggaagctgcc tgcaactgga    2280
cgcggggcga ccgttgtaat ctggatgaca gggacaggtc cgagctcagc ccgctgctgc    2340
tgtccactac gcagtggcag gtcctcccgt gttccttcac gacccctgcca gccttgtcca   2400 ccggcctcat ccacctccac caaaacatcg tggacgtgca atacttgtac ggggtgggat    2460
caagcatcgc gtcctgggcc atcaagtggg aatacgtcgt tctcttgttc cttctgcttg    2520
cagacgcgcg cgtctgctcc tgcttgtgga tgatgttact catatcccaa gtggaggcgg    2580
ctttggagaa cctcgtagta ctcaatgcag catccctggc cgggacacac ggtcttgtat    2640
ccttcctcgt gttcttctgc tttgcatggt atctgaaggg taagtgggtg cccggagcgg    2700
tctacgccct ctacgggatg tggcctctcc tcttgctcct gttagcgttg ccccagcggg    2760
catacgcact ggacacggag gtggccgcgt cgtgtggcgg cgttgttctt gtcgggttaa    2820
tggcgctgac tctgtcacca tattacaagc gctatatcag ctggtgcttg tggtggcttc    2880
agtatttcct gaccagaata gaagcgcaac tgcacgtgtg gattcccct ctcaacgtcc      2940 ggggggggcg cgatgccgtc atcttactca tgtgtgttgt gcacccggct ctggtatttg    3000
acatcaccaa gctactgctg gctgccttcg ggccccttg gattcttcaa gccagtttgc     3060
ttaaggtacc ctacttcgtg cgcgttcaag gccttctccg gatctgcgcg ctagcgcgga    3120
agatggctgg aggccattac gtgcaaatgg ccatcatcaa gttaggggcg cttactggca    3180
cttatgttta caaccatctc acccccccttc gggactgggc gcacaacggc ctgcgagatc    3240
tggccgtggc tgtggagcca gtcgtcttct cccgaatgga gaccaagctt atcacctggg    3300
gggcagacac cgccgcgtgc ggtgacatca tcaacggctt gcccgtctcc gcccggaggg    3360
gccgggagat actgctcggg ccagccgatg gaatggtctc caaggggtgg agattgctgg    3420
cgcccatcac ggcgtacgcc cagcaaacga ggggcctcct agggtgtata atcaccagtc    3480
tgaccggccg ggacaaaaac caagtggagg gtgagatcca gattgtgtca actgctgccc    3540
aaaccttcct ggcaacgtgc atcaacgggg tttgctggac cgtctaccac ggggccggaa    3600
cgaggaccat cgcatcaccc aagggtccgg ttatccaaat gtataccaat gtggacaaag    3660
accttgtggg ctggcccgct cctcaaggtg cccgctcact gacaccctgt acctgcggct    3720
cctcggacct ttacctggtc acgaggcacg ccgatgtcat tcccgtgcgc cggcggggtg    3780
atagcagggg cagcctgctt tcgccccggc ccatttccta cttgaaaggc tcctcggggg    3840
gtccgctgct gtgccccgcg ggacacgccg taggcttatt cagggccgcg gtgtgcaccc    3900
gtggagtggc taaggcggtg gacttcatcc ctgtggagaa cctagagaca accatgaggt    3960
ccccggtgtt cacggacaac tcctctccac cagcagtgcc ccagagcttc caggtgggcc    4020
acctgcatgc tcccaccggc agcggcaaaa gcaccaaggt cccggctgca tacgcagctc    4080
agggctataa ggtgctagtg ctcaaccccc tgtcgctgc aacactgggc tttggtgctt     4140
acatgtccaa ggcccatggg gtcgatccta atatcaggac cggggtgaga acaattacca    4200
```

```
ctggcagccc catcacgtac tccacctacg gcaagttcct tgccgacggc gggtgttcag    4260
gggatgctta tgacataata atttgtgacg agtgccactc cacggatgcc acatccatct    4320
tgggcatcgg caccgttctt gaccaagcag agaccgcggg ggcgagactg gttgtgctcg    4380
ccaccgctac ccctccgggc tccatcaccg tgccccatcc taacatcgag gaggttgctc    4440
tgtccactac cggagagatc ccttttacg gcaaggctat cccctcgag gcgatcaagg    4500 gggggagaca tctcatcttc tgtcactcaa agaagaagtg cgacgagctc gccgcaaagc    4560
tggtcgcatt gggcatcaat gccgtggcct actaccgcgg tcttgacgtg tctgtcatcc    4620
caaccagcgg cgatgttgtc gtcgtggcga ccgatgctct tatgactggc tataccggcg    4680
actttgactc ggtgatagac tgcaacacgt gtgtcaccca gacagtcgac ctcagccttg    4740
accctacctt caccattgag acgaccacgc tcccccagga cgctgtctcc cgcacacaac    4800
gccggggcag gactggcagg gggaagccag gcatctacag attcgtggca ctgggggagc    4860
gcccctccgg catgttcgac tcgtccgttc tctgtgagtg ctatgacgcg ggctgtgctt    4920
ggtatgagct cacgcccgcc gagactacag ttagactacg agcgtacatg aacaccccgg    4980
ggctccctgt gtgccaggac catcttgaat tttgggaggg cgtctttaca ggcctcaccc    5040
atatagatgc ccatttccta tctcagacaa agcagagcgg ggaaaacttt ccttacctgg    5100
tagcatacca agcaaccgtg tgcgctaggg ctcaagcccc tcccccatcg tgggaccaga    5160
tgtggaagtg tttgactcgc ctcaagccca ccctccatgg gccaacaccc ttgctataca    5220
gactgggcgc tgttcagaat gaagtcaccc tgacgcaccc aatcaccaaa tacatcatga    5280
catgcatgtc ggccgacctg gaggtcgtca cgagcacctg ggtgctcgtc ggcggcgtcc    5340
tggccgcttt ggcctcgtat tgcctgtcaa caggctgcgt ggtcatagtg gcaggattg    5400 tcctgtctgg gaagccggca attataccgt acagggaagt tctctaccgg gagttcgatg    5460
agatggaaga gtgctctcag cacttaccgt acatcgagca agggatgatg ctcgccgagc    5520
agttcaagca gaaggccctc ggcctcctgc agaccgcgtc ccgtcaggca gaggttgtcg    5580
cccctgctgt ccagaccaac tggcaaaaac tcgaggcctt ctgggcgaag catatgtgga    5640
acttcatcag tgggatacac tacttggcgg gcttgtcaac gttgcctggt aaccccgcca    5700
ttgcttcatt gatggctttt acagctgctg tcaccagccc actaaccact agccaaaccc    5760
tcctcttcaa catactgggg gggtgggtgg ctgcccagct tgccgccccc ggtgccgcca    5820
ccgcctttgt gggcgctggc ttagccggcg ccgcaatcgg cagtgttgga ctggggaagg    5880
tcctcgtgga cattctagca gggtatgcg cgggcgtggc gggagctctt gtagcattca    5940
agatcatgag cggtgaggtc ccctccacgg aggacctagt caacctgctg ccgccatcc    6000 tctcgcctga gcccttgta gtcggtgtgg tctgcgcagc aatactgcgc cggcacgtcg    6060
gcccgggcga ggggcagtg caatggatga accggctaat cgccttcgcc tcccggggga    6120
cccatgtttc ccccacgcac tatgtgccgg agagcgatgc agctgcccgc gtcactacca    6180
tactcagcag cctcactgta acccagctcc tgaggcgact gcaccagtgg ataagctcgg    6240
agtgtaccac tccatgctcc ggttcctggc tgagggacat ctgggactgg atatgcgagg    6300
tgctgagcga ctttaagacc tggctgaaag ccaagctcat gccgcaactg cctgggattc    6360
cctttgtgtc ctgccagcgt gggtataagg gggtctggcg aggggacggc atcatgcaca    6420
ctcgctgcca ctgtggagct gagataactg gacatgtcaa aaacgggacg atgaggatcg    6480
ttggtcctaa gacttgcagg aacatgtgga gtgggacttt ccccattaac gcctacacca    6540
```

```
cgggcccctg tactcccctt cctgcgccga actatacgtt cgcgctgtgg agggtgtctg    6600
cagaggaata cgtggagata aggcaggtgg gggacttcca ctacgtgacg ggtatgacta    6660
ctgacaacct taaatgcccg tgccaggtcc catcgcccga attttttcaca gaattggacg   6720 gggtgcgcct acataggttt gcgccccctt gcaagcccct gctgcgggag gaggtgtcat    6780
tcagagtggg actccacgag tacccggtgg ggtcgcaatt accttgcgag cccgaaccgg    6840
acgtggccgt gttgacgtcc atgctcactg atccctccca tataacagca gaggcggccg    6900
ggagaaggtt ggcgagggga tcacccccct ctatggccag ctcctcggct agccaactgt    6960
ccgctccatc tctcagggca acttgcacta ccaaccatga ctcccctgat gctgagctca    7020
tagaggccaa cctcctatgg aggcaggaga tgggcggcaa catcaccagg gttgagtcag    7080
agaacaaagt ggtgattctg gactccttcg atccgcttgt ggcagaggag gatgagcggg    7140
aggtctccgt gcccgcagag atactgcgga agtctcggaa attcacccca gccctaccca    7200
tttgggcgcg gccggactat aaccccccgc tggtggagcc gtggaaaaag cctgactacg    7260
aaccacctgt ggtccatggc tgcccgcttc cacctccaca gtcccctcct gtgcctccac    7320
ctcggaagaa gcggacggtg atcctcaccg aatcaaccct acctactgcc ttggccgagc    7380
ttgccaccaa aagttttggc agctcctcaa cttccggcat tacgggcgac gacacgacaa    7440
catcccctga gcccgcctcc tctagctgcc ctcccgactc cgacgctgag tcctattctt    7500
ccatgccccc tctggagggg gagcctgggg atccggatct cagcgacggg tcatggtcga    7560
cggtcagtag tgaggccgac aaggaggatg tcgtgtgctg ctcaatgtct tatacctgga    7620
caggcgcact cgtcaccccg tgcgccgcgg aagaacaaaa actgcccatc aacgcactaa    7680
gcaactcgtt gctgcgtcat cacaatctgg tgtattccac cacctcacgc agtgcttgcc    7740
aaaggcagaa gaaagtcaca tttgacagac tgcaagtcct ggacagccat taccaggacg    7800
tgctcaagga ggttaaggca gcggcgtcaa aagtgaaggc taacttgcta tccgtagagg    7860
aagcttgcag cctgacgccc ccacactcag ccaaatccaa gtttggctat ggggcaaaag    7920
acgtccgttg ccatgccaga aaggccgtaa accacatcaa ctccgtgtgg aaagaccttc    7980
tggaagacag tgtaacacca atagacacta ccatcatggc taagaacgag gttttctgcg    8040
ttcagcctga aaggggggt cgtaagccag ctcgtctcat cgtgttcccc gacctgggtg    8100
tacgcgtgtg cgagaagatg gccttgtacg acgtagtcag caagctcccc ctagccgtga    8160
tgggaagctc ctacggattc caatactcac caggacagcg ggttgaattc ctcgtgcaag    8220
cgtggaagtc caagaagacc ccaatggggt tttcgtatga tacccgctgt tttgactcca    8280
cagtcactga gaatgatatc cgtacggagg aggcaatcta ccaatgttgt gacctggacc    8340
cccaagcccg cgtggccatc aagtccctca ctgagaggct ttatgtcggg ggccctctta    8400
ccaattcaag gggggagaac tgcggctatc gcaggtgccg cgcgagcggc gtactgacga    8460
ccagctgtgg taacccctc acctgctaca tcaaggcccg agcagcctgt cgagccgcag    8520
ggctccagga ctgcaccatg ctcgtgtgtg gcgacgactt agtcgttatc tgtgagagtg    8580
cgggggtcca ggaggacgcg gcgagcctga gagccttcac ggaggctatg accaggtact    8640
ccgccccccc cggggacccc ccacaaccag aatacgactt ggagctcata acatcatgct    8700
cctccaacgt gtcagtcgcc cacgacggcg ctggaaaaag ggtctactac ctcacccgtg    8760
accctacaac ccccctcgcg cgggccgcgt gggagacagc aagacacact ccagtcaatt    8820
cctggctagg caacataatt atgtttgccc ccacactgtg ggcgaggatg atactgatga    8880
cccatttctt tagcgtcctc atagccaggg atcagcttga acaggccctc gattgcgaga    8940
```

-continued

```
tctacggggc ctgctactcc atagaaccac tggatctacc tccaatcatt caaagactcc    9000
atggcctcag cgcattttca ctccacagtt actctccagg tgaaatcaat agggtggccg    9060
catgcctcag aaaacttggg gtcccgccct tgcgagcttg agacaccgg gcccggaatg     9120
tccgcgctag gcttctgtcc agaggaggca gggctgccat ttgtggcaag tacctcttca    9180
actgggcagt aaggacaaag ctcaaactca ctccaatagc ggccgctggc cggctagact    9240
tatctggctg gttcacggct ggctacagcg ggggaggcat ttttcacagc gtgtctcatg    9300
cccggccccg ctggttctgg tcttgcctac tcctgctcgc tgcaggggta ggcatctacc    9360
tcctccccaa ccgatgaagg ttggggtaaa cactccggcc tcttaggcca tttcctgttt    9420
tttttttttt tttttttttt tttttttttt tttttttttt tttcttttc cctctttttc     9480
ttctcttttt ccttctttaa tggtggctcc atcttagccc tagtcacggc tagctgtgaa    9540
aggtccgtga gccgcatgac tgcagagagt gctgatactg gcctctctgc agatcatgt    9599
```

<210> SEQ ID NO 3
<211> LENGTH: 3030
<212> TYPE: PRT
<213> ORGANISM: Hepatitis C virus

<400> SEQUENCE: 3

```
Met Ser Thr Asn Pro Lys Pro Gln Arg Lys Thr Lys Arg Asn Thr Asn
1               5                   10                  15

Arg Arg Pro Gln Asp Val Lys Phe Pro Gly Gly Gly Gln Ile Val Gly
                20                  25                  30

Gly Val Tyr Leu Leu Pro Arg Arg Gly Pro Arg Leu Gly Val Arg Ala
            35                  40                  45

Thr Arg Lys Thr Ser Glu Arg Ser Gln Pro Arg Gly Arg Arg Gln Pro
        50                  55                  60

Ile Pro Lys Ala Arg Gln Pro Thr Gly Arg Ser Trp Gly Gln Pro Gly
65                  70                  75                  80

Tyr Pro Trp Pro Leu Tyr Ala Asn Glu Gly Leu Gly Trp Ala Gly Trp
                85                  90                  95

Leu Leu Ser Pro Arg Gly Ser Arg Pro Asn Trp Gly Pro Asn Asp Pro
            100                 105                 110

Arg Trp Lys Ser Arg Asn Leu Gly Lys Val Ile Asp Thr Leu Thr Cys
        115                 120                 125

Gly Phe Ala Asp Leu Met Gly Tyr Ile Pro Leu Val Gly Gly Pro Val
    130                 135                 140

Gly Gly Val Ala Arg Ala Leu Ala His Gly Val Arg Val Leu Glu Asp
145                 150                 155                 160

Gly Val Asn Tyr Ala Thr Gly Asn Leu Pro Gly Cys Ser Phe Ser Ile
                165                 170                 175

Phe Ile Leu Ala Leu Leu Ser Cys Leu Thr Ala Pro Thr Ser Ala Val
            180                 185                 190

Pro Tyr Arg Asn Ala Ser Gly Val Tyr His Val Thr Asn Asp Cys Pro
        195                 200                 205

Asn Ser Ser Ile Val Tyr Glu Ala Glu Asp Leu Ile Leu His Ala Pro
    210                 215                 220

Gly Cys Val Pro Cys Val Arg Gln Gly Asn Leu Ser Arg Cys Trp Val
225                 230                 235                 240

Gln Ile Thr Pro Thr Leu Ser Ala Pro Ser Leu Gly Ala Val Thr Ala
                245                 250                 255
```

-continued

```
Pro Leu Arg Arg Ala Val Asp Tyr Leu Ala Gly Gly Ala Ala Leu Cys
            260                 265                 270

Ser Ala Leu Tyr Val Gly Asp Ala Cys Gly Ala Val Phe Leu Val Gly
            275                 280                 285

Gln Met Phe Thr Tyr Ser Pro Arg Arg His Asn Val Val Gln Asp Cys
            290                 295                 300

Asn Cys Ser Ile Tyr Ser Gly His Ile Thr Gly His Arg Met Ala Trp
305                 310                 315                 320

Asp Met Met Met Asn Trp Ser Pro Thr Thr Ala Leu Val Met Ala Gln
                325                 330                 335

Leu Leu Arg Ile Pro Gln Val Val Ile Asp Ile Ile Ala Gly Ala His
            340                 345                 350

Trp Gly Val Leu Phe Ala Ala Ala Tyr Ala Ser Ala Ala Asn Trp
            355                 360                 365

Ala Lys Val Val Leu Val Leu Phe Leu Phe Ala Gly Val Asp Ala Ser
            370                 375                 380

Pro Arg Thr Val Gly Gly Ser Ala Ala Gln Gly Ala Arg Gly Leu Ala
385                 390                 395                 400

Ser Leu Phe Thr Pro Gly Pro Gln Gln Asn Leu Gln Leu Ile Asn Thr
            405                 410                 415

Asn Gly Ser Trp His Ile Asn Arg Thr Ala Leu Asn Cys Asn Asp Ser
            420                 425                 430

Leu Gln Thr Gly Phe Val Ala Gly Leu Leu Tyr Tyr His Lys Phe Asn
            435                 440                 445

Ser Thr Gly Cys Pro Gln Arg Met Ala Ser Cys Arg Pro Leu Ala Ala
450                 455                 460

Phe Asp Gln Gly Trp Gly Thr Ile Ser Tyr Ala Ala Val Ser Gly Pro
465                 470                 475                 480

Ser Asp Asp Lys Pro Tyr Cys Trp His Tyr Pro Arg Pro Cys Gly
            485                 490                 495

Ile Val Pro Ala Arg Gly Val Cys Gly Pro Val Tyr Cys Phe Thr Pro
            500                 505                 510

Ser Pro Val Val Gly Thr Thr Asp Arg Lys Gly Asn Pro Thr Tyr
            515                 520                 525

Ser Trp Gly Glu Asn Glu Thr Asp Ile Phe Leu Leu Asn Asn Thr Arg
530                 535                 540

Pro Pro Thr Gly Asn Trp Phe Gly Cys Thr Trp Met Asn Ser Thr Gly
545                 550                 555                 560

Phe Val Lys Thr Cys Gly Ala Pro Pro Cys Asn Leu Gly Pro Thr Gly
            565                 570                 575

Asn Asn Ser Leu Lys Cys Pro Thr Asp Cys Phe Arg Lys His Pro Asp
            580                 585                 590

Ala Thr Tyr Thr Lys Cys Gly Ser Gly Pro Trp Leu Thr Pro Arg Cys
            595                 600                 605

Leu Val His Tyr Pro Tyr Arg Leu Trp His Tyr Pro Cys Thr Leu Asn
            610                 615                 620

Tyr Thr Ile Phe Lys Val Arg Met Tyr Ile Gly Gly Leu Glu His Arg
625                 630                 635                 640

Leu Glu Val Ala Cys Asn Trp Thr Arg Gly Glu Arg Cys Asp Leu Glu
                645                 650                 655

Asp Arg Asp Arg Ala Glu Leu Ser Pro Leu Leu His Thr Thr Gln
            660                 665                 670

Trp Ala Ile Leu Pro Cys Ser Phe Thr Pro Thr Pro Ala Leu Ser Thr
```

-continued

```
            675                 680                 685
Gly Leu Ile His Leu His Gln Asn Ile Val Asp Thr Gln Tyr Leu Tyr
    690                 695                 700
Gly Leu Ser Ser Ser Ile Val Ser Trp Ala Val Lys Trp Glu Tyr Ile
705                 710                 715                 720
Val Leu Ala Phe Leu Leu Ala Asp Ala Arg Ile Cys Thr Cys Leu
                725                 730                 735
Trp Ile Met Leu Leu Val Cys Gln Ala Glu Ala Leu Glu Asn Val
                740                 745                 750
Ile Val Leu Asn Ala Ala Ala Ala Gly Thr His Gly Phe Phe Trp
            755                 760                 765
Gly Leu Leu Val Ile Cys Phe Ala Trp His Phe Lys Gly Arg Val Val
    770                 775                 780
Pro Gly Ala Thr Tyr Leu Cys Leu Gly Ile Trp Pro Leu Leu Leu Leu
785                 790                 795                 800
Leu Phe Leu Leu Pro Gln Arg Ala Leu Ala Leu Asp Ser Ser Asp Gly
                805                 810                 815
Gly Thr Val Gly Cys Leu Val Leu Thr Ile Leu Thr Ile Phe Thr Leu
                820                 825                 830
Thr Pro Gly Tyr Lys Lys Met Val Val Leu Val Ile Trp Trp Leu Gln
                835                 840                 845
Tyr Phe Ile Ala Arg Val Glu Ala Phe Ile His Val Trp Val Pro Pro
850                 855                 860
Leu Gln Val Arg Gly Gly Arg Asp Ala Ile Ile Met Leu Thr Cys Leu
865                 870                 875                 880
Phe His Pro Ala Leu Gly Phe Glu Val Thr Lys Ile Leu Leu Gly Ile
                885                 890                 895
Leu Gly Pro Leu Cys Leu Leu Gln Tyr Ser Leu Ile Lys Leu Pro Tyr
                900                 905                 910
Phe Ile Arg Ala Arg Ala Leu Leu Arg Ala Cys Leu Leu Ala Lys His
                915                 920                 925
Leu Ala Cys Gly Arg Tyr Val Gln Ala Ala Leu Leu His Leu Gly Arg
    930                 935                 940
Leu Thr Gly Thr Tyr Ile Tyr Asp His Leu Ala Pro Met Lys Asp Trp
945                 950                 955                 960
Ala Ala Ser Gly Leu Arg Asp Leu Ala Val Ala Thr Glu Pro Ile Ile
                965                 970                 975
Phe Ser Pro Met Glu Thr Lys Val Ile Thr Trp Gly Ala Asp Thr Ala
                980                 985                 990
Ala Cys Gly Asp Ile Leu Ala Gly  Leu Pro Val Ser Ala  Arg Arg Gly
        995                 1000                1005
His Glu  Ile Phe Leu Gly Pro  Ala Asp Asp Ile Arg  Glu Gly Gly
        1010                1015                1020
Trp Arg Leu Leu Ala Pro Ile  Thr Ala Tyr Ala Gln  Gln Thr Arg
        1025                1030                1035
Gly Leu  Leu Gly Ala Ile Val  Val Ser Met Thr Gly  Arg Asp Arg
        1040                1045                1050
Thr Glu  Gln Ala Gly Glu Val  Gln Ile Leu Ser Thr  Val Ser Gln
        1055                1060                1065
Ser Phe  Leu Gly Thr Thr Ile  Ser Gly Val Leu Trp  Thr Val Tyr
        1070                1075                1080
His Gly  Ala Gly Asn Lys Thr  Leu Ala Gly Leu Arg  Gly Pro Val
        1085                1090                1095
```

-continued

```
Thr Gln Met Tyr Ser Ser Ala Glu Gly Asp Leu Val Gly Trp Pro
    1100            1105                1110
Ser Pro Pro Gly Thr Arg Ser Leu Glu Pro Cys Lys Cys Gly Ala
    1115            1120                1125
Val Asp Leu Tyr Leu Val Thr Arg Asn Ala Asp Val Ile Pro Ala
    1130            1135                1140
Arg Arg Arg Gly Asp Lys Arg Gly Ala Leu Leu Ser Pro Arg Pro
    1145            1150                1155
Ile Ser Thr Leu Lys Gly Ser Ser Gly Gly Pro Val Leu Cys Pro
    1160            1165                1170
Arg Gly His Val Val Gly Leu Phe Arg Ala Ala Val Cys Ser Arg
    1175            1180                1185
Gly Val Ala Lys Ser Ile Asp Phe Ile Pro Val Glu Thr Leu Asp
    1190            1195                1200
Val Val Thr Arg Ser Pro Thr Phe Ser Asp Asn Ser Thr Pro Pro
    1205            1210                1215
Ala Val Pro Gln Thr Tyr Gln Val Gly Tyr Leu His Ala Pro Thr
    1220            1225                1230
Gly Ser Gly Lys Ser Thr Lys Val Pro Val Ala Tyr Ala Ala Gln
    1235            1240                1245
Gly Tyr Lys Val Leu Val Leu Asn Pro Ser Val Ala Ala Thr Leu
    1250            1255                1260
Gly Phe Gly Ala Tyr Leu Ser Lys Ala His Gly Ile Asn Pro Asn
    1265            1270                1275
Ile Arg Thr Gly Val Arg Thr Val Met Thr Gly Glu Ala Ile Thr
    1280            1285                1290
Tyr Ser Thr Tyr Gly Lys Phe Leu Ala Asp Gly Gly Cys Ala Ser
    1295            1300                1305
Gly Ala Tyr Asp Ile Ile Ile Cys Asp Glu Cys His Ala Val Asp
    1310            1315                1320
Ala Thr Ser Ile Leu Gly Ile Gly Thr Val Leu Asp Gln Ala Glu
    1325            1330                1335
Thr Ala Gly Val Arg Leu Thr Val Leu Ala Thr Ala Thr Pro Pro
    1340            1345                1350
Gly Ser Val Thr Thr Pro His Pro Asp Ile Glu Glu Val Gly Leu
    1355            1360                1365
Gly Arg Glu Gly Glu Ile Pro Phe Tyr Gly Arg Ala Ile Pro Leu
    1370            1375                1380
Ser Cys Ile Lys Gly Gly Arg His Leu Ile Phe Cys His Ser Lys
    1385            1390                1395
Lys Lys Cys Asp Glu Leu Ala Ala Ala Leu Arg Gly Met Gly Leu
    1400            1405                1410
Asn Ala Val Ala Tyr Tyr Arg Gly Leu Asp Val Ser Ile Ile Pro
    1415            1420                1425
Ala Gln Gly Asp Val Val Val Ala Thr Asp Ala Leu Met Thr
    1430            1435                1440
Gly Tyr Thr Gly Asp Phe Asp Ser Val Ile Asp Cys Asn Val Ala
    1445            1450                1455
Val Thr Gln Ala Val Asp Phe Ser Leu Asp Pro Thr Phe Thr Ile
    1460            1465                1470
Thr Thr Gln Thr Val Pro Gln Asp Ala Val Ser Arg Ser Gln Arg
    1475            1480                1485
```

-continued

Arg Gly Arg Thr Gly Arg Gly Arg Gln Gly Thr Tyr Arg Tyr Val
1490                1495                1500

Ser Thr Gly Glu Arg Ala Ser Gly Met Phe Asp Ser Val Val Leu
1505                1510                1515

Cys Glu Cys Tyr Asp Ala Gly Ala Ala Trp Tyr Asp Leu Thr Pro
1520                1525                1530

Ala Glu Thr Thr Val Arg Leu Arg Ala Tyr Phe Asn Thr Pro Gly
1535                1540                1545

Leu Pro Val Cys Gln Asp His Leu Glu Phe Trp Glu Ala Val Phe
1550                1555                1560

Thr Gly Leu Thr His Ile Asp Ala His Phe Leu Ser Gln Thr Lys
1565                1570                1575

Gln Ala Gly Glu Asn Phe Ala Tyr Leu Val Ala Tyr Gln Ala Thr
1580                1585                1590

Val Cys Ala Arg Ala Lys Ala Pro Pro Pro Ser Trp Asp Ala Met
1595                1600                1605

Trp Lys Cys Leu Ala Arg Leu Lys Pro Thr Leu Ala Gly Pro Thr
1610                1615                1620

Pro Leu Leu Tyr Arg Leu Gly Pro Ile Thr Asn Glu Val Thr Leu
1625                1630                1635

Thr His Pro Gly Thr Lys Tyr Ile Ala Thr Cys Met Gln Ala Asp
1640                1645                1650

Leu Glu Val Met Thr Ser Thr Trp Val Leu Ala Gly Gly Val Leu
1655                1660                1665

Ala Ala Val Ala Ala Tyr Cys Leu Ala Thr Gly Cys Val Ser Ile
1670                1675                1680

Ile Gly Arg Leu His Val Asn Gln Arg Val Val Val Ala Pro Asp
1685                1690                1695

Lys Glu Val Leu Tyr Glu Ala Phe Asp Glu Met Glu Glu Cys Ala
1700                1705                1710

Ser Arg Ala Ala Leu Ile Glu Glu Gly Gln Arg Ile Ala Glu Met
1715                1720                1725

Leu Lys Ser Lys Ile Gln Gly Leu Leu Gln Gln Ala Ser Lys Gln
1730                1735                1740

Ala Gln Asp Ile Gln Pro Ala Met Gln Ala Ser Trp Pro Lys Val
1745                1750                1755

Glu Gln Phe Trp Ala Arg His Met Trp Asn Phe Ile Ser Gly Ile
1760                1765                1770

Gln Tyr Leu Ala Gly Leu Ser Thr Leu Pro Gly Asn Pro Ala Val
1775                1780                1785

Ala Ser Met Met Ala Phe Ser Ala Ala Leu Thr Ser Pro Leu Ser
1790                1795                1800

Thr Ser Thr Thr Ile Leu Leu Asn Ile Met Gly Gly Trp Leu Ala
1805                1810                1815

Ser Gln Ile Ala Pro Pro Ala Gly Ala Thr Gly Phe Val Val Ser
1820                1825                1830

Gly Leu Val Gly Ala Ala Val Gly Ser Ile Gly Leu Gly Lys Val
1835                1840                1845

Leu Val Asp Ile Leu Ala Gly Tyr Gly Ala Gly Ile Ser Gly Ala
1850                1855                1860

Leu Val Ala Phe Lys Ile Met Ser Gly Glu Lys Pro Ser Met Glu
1865                1870                1875

Asp Val Ile Asn Leu Leu Pro Gly Ile Leu Ser Pro Gly Ala Leu

-continued

```
            1880                1885                1890
Val Val Gly Val Ile Cys Ala Ala Ile Leu Arg Arg His Val Gly
    1895                1900                1905
Pro Gly Glu Gly Ala Val Gln Trp Met Asn Arg Leu Ile Ala Phe
    1910                1915                1920
Ala Ser Arg Gly Asn His Val Ala Pro Thr His Tyr Val Thr Glu
    1925                1930                1935
Ser Asp Ala Ser Gln Arg Val Thr Gln Leu Leu Gly Ser Leu Thr
    1940                1945                1950
Ile Thr Ser Leu Leu Arg Arg Leu His Asn Trp Ile Thr Glu Asp
    1955                1960                1965
Cys Pro Ile Pro Cys Ser Gly Ser Trp Leu Arg Asp Val Trp Asp
    1970                1975                1980
Trp Val Cys Thr Ile Leu Thr Asp Phe Lys Asn Trp Leu Thr Ser
    1985                1990                1995
Lys Leu Phe Pro Lys Leu Pro Gly Leu Pro Phe Ile Ser Cys Gln
    2000                2005                2010
Lys Gly Tyr Lys Gly Val Trp Ala Gly Thr Gly Ile Met Thr Thr
    2015                2020                2025
Arg Cys Pro Cys Gly Ala Asp Ile Ser Gly Asn Val Arg Leu Gly
    2030                2035                2040
Ser Met Arg Ile Thr Gly Pro Lys Thr Cys Met Asn Thr Trp Gln
    2045                2050                2055
Gly Thr Phe Pro Ile Asn Cys Tyr Thr Glu Gly Gln Cys Ala Pro
    2060                2065                2070
Lys Pro Pro Thr Asn Tyr Lys Thr Ala Ile Trp Arg Val Ala Ala
    2075                2080                2085
Ser Glu Tyr Ala Glu Val Thr Gln His Gly Ser Tyr Ser Tyr Val
    2090                2095                2100
Thr Gly Leu Thr Thr Asp Asn Leu Lys Ile Pro Cys Gln Leu Pro
    2105                2110                2115
Ser Pro Glu Phe Phe Ser Trp Val Asp Gly Val Gln Ile His Arg
    2120                2125                2130
Phe Ala Pro Thr Pro Lys Pro Phe Phe Arg Asp Glu Val Ser Phe
    2135                2140                2145
Cys Val Gly Leu Asn Ser Tyr Ala Val Gly Ser Gln Leu Pro Cys
    2150                2155                2160
Glu Pro Glu Pro Asp Ala Asp Val Leu Arg Ser Met Leu Thr Asp
    2165                2170                2175
Pro Pro His Ile Thr Ala Glu Thr Ala Ala Arg Arg Leu Ala Arg
    2180                2185                2190
Gly Ser Pro Pro Ser Glu Ala Ser Ser Ser Val Ser Gln Leu Ser
    2195                2200                2205
Ala Pro Ser Leu Arg Ala Thr Cys Thr Thr His Ser Asn Thr Tyr
    2210                2215                2220
Asp Val Asp Met Val Asp Ala Asn Leu Leu Met Gly Gly Gly Val
    2225                2230                2235
Ala Gln Thr Glu Pro Glu Ser Arg Val Pro Ala Leu Asp Phe Leu
    2240                2245                2250
Glu Pro Met Ala Glu Glu Ser Asp Pro Glu Pro Ser Ile Pro
    2255                2260                2265
Ser Glu Cys Met Leu Pro Arg Ser Gly Phe Pro Arg Ala Leu Pro
    2270                2275                2280
```

```
Ala Trp Ala Arg Pro Asp Tyr Asn Pro Pro Leu Val Glu Ser Trp
    2285                2290                2295

Arg Arg Pro Asp Tyr Gln Pro Pro Thr Val Ala Gly Cys Ala Leu
    2300                2305                2310

Pro Pro Pro Lys Lys Ala Pro Thr Pro Pro Arg Arg Arg Arg
    2315                2320                2325

Thr Val Gly Leu Ser Glu Ser Thr Thr Ser Glu Ala Leu Gln Gln
    2330                2335                2340

Leu Ala Ile Lys Thr Phe Gly Gln Pro Ser Ser Gly Asp Ala
    2345                2350                2355

Gly Ser Ser Thr Gly Ala Gly Ala Ala Glu Ser Gly Gly Pro Thr
    2360                2365                2370

Ser Pro Gly Glu Pro Ala Pro Ser Glu Thr Gly Ser Ala Ser Ser
    2375                2380                2385

Met Pro Pro Leu Glu Gly Glu Pro Gly Asp Pro Asp Leu Glu Ser
    2390                2395                2400

Asp Gln Val Glu Leu Gln Pro Pro Gln Gly Gly Gly Val Ala
    2405                2410                2415

Pro Gly Ser Gly Ser Gly Ser Trp Ser Thr Cys Ser Glu Glu Asp
    2420                2425                2430

Asp Thr Thr Val Cys Cys Ser Met Ser Tyr Ser Trp Thr Gly Ala
    2435                2440                2445

Leu Ile Thr Pro Cys Ser Pro Glu Glu Glu Lys Leu Pro Ile Asn
    2450                2455                2460

Pro Leu Ser Asn Ser Leu Leu Arg Tyr His Asn Lys Val Tyr Cys
    2465                2470                2475

Thr Thr Ser Lys Ser Ala Ser Gln Arg Ala Lys Lys Val Thr Phe
    2480                2485                2490

Asp Arg Thr Gln Val Leu Asp Ala His Tyr Asp Ser Val Leu Lys
    2495                2500                2505

Asp Ile Lys Leu Ala Ala Ser Lys Val Ser Ser Arg Leu Leu Thr
    2510                2515                2520

Leu Glu Glu Ala Cys Gln Leu Thr Pro Pro His Ser Ala Arg Ser
    2525                2530                2535

Lys Tyr Gly Phe Gly Ala Lys Glu Val Arg Ser Leu Ser Gly Arg
    2540                2545                2550

Ala Val Asn His Ile Lys Ser Val Trp Lys Asp Leu Leu Glu Asp
    2555                2560                2565

Pro Gln Thr Pro Ile Pro Thr Thr Ile Met Ala Lys Asn Glu Val
    2570                2575                2580

Phe Cys Val Asp Pro Ala Lys Gly Gly Lys Lys Pro Ala Arg Leu
    2585                2590                2595

Ile Val Tyr Pro Asp Leu Gly Val Arg Val Cys Glu Lys Met Ala
    2600                2605                2610

Leu Tyr Asp Ile Thr Gln Lys Leu Pro Gln Ala Val Met Gly Ala
    2615                2620                2625

Ser Tyr Gly Phe Gln Tyr Ser Pro Ala Gln Arg Val Glu Tyr Leu
    2630                2635                2640

Leu Lys Ala Trp Ala Glu Lys Lys Asp Pro Met Gly Phe Ser Tyr
    2645                2650                2655

Asp Thr Arg Cys Phe Asp Ser Thr Val Thr Glu Arg Asp Ile Arg
    2660                2665                2670
```

-continued

```
Thr Glu Glu Ser Ile Tyr Gln Ala Cys Ser Leu Pro Glu Glu Ala
2675                2680                2685

Arg Thr Ala Ile His Ser Leu Thr Glu Arg Leu Tyr Val Gly Gly
2690                2695                2700

Pro Met Phe Asn Ser Lys Gly Gln Thr Cys Gly Tyr Arg Arg Cys
2705                2710                2715

Arg Ala Ser Gly Val Leu Thr Thr Ser Met Gly Asn Thr Ile Thr
2720                2725                2730

Cys Tyr Val Lys Ala Leu Ala Ala Cys Lys Ala Ala Gly Ile Val
2735                2740                2745

Ala Pro Thr Met Leu Val Cys Gly Asp Asp Leu Val Val Ile Ser
2750                2755                2760

Glu Ser Gln Gly Thr Glu Glu Asp Glu Arg Asn Leu Arg Ala Phe
2765                2770                2775

Thr Glu Ala Met Thr Arg Tyr Ser Ala Pro Pro Gly Asp Pro Pro
2780                2785                2790

Arg Pro Glu Tyr Asp Leu Glu Leu Ile Thr Ser Cys Ser Ser Asn
2795                2800                2805

Val Ser Val Ala Leu Gly Pro Arg Gly Arg Arg Arg Tyr Tyr Leu
2810                2815                2820

Thr Arg Asp Pro Thr Thr Pro Leu Ala Arg Ala Ala Trp Glu Thr
2825                2830                2835

Val Arg His Ser Pro Ile Asn Ser Trp Leu Gly Asn Ile Ile Gln
2840                2845                2850

Tyr Ala Pro Thr Ile Trp Ala Arg Met Val Leu Met Thr His Phe
2855                2860                2865

Phe Ser Ile Leu Met Val Gln Asp Thr Leu Asp Gln Asn Leu Asn
2870                2875                2880

Phe Glu Met Tyr Gly Ser Val Tyr Ser Val Asn Pro Leu Asp Leu
2885                2890                2895

Pro Ala Ile Ile Glu Arg Leu His Gly Leu Asp Ala Phe Ser Met
2900                2905                2910

His Thr Tyr Ser His His Glu Leu Thr Arg Val Ala Ser Ala Leu
2915                2920                2925

Arg Lys Leu Gly Ala Pro Pro Leu Arg Val Trp Lys Ser Arg Ala
2930                2935                2940

Arg Ala Val Arg Ala Ser Leu Ile Ser Arg Gly Gly Lys Ala Ala
2945                2950                2955

Val Cys Gly Arg Tyr Leu Phe Asn Trp Ala Val Lys Thr Lys Leu
2960                2965                2970

Lys Leu Thr Pro Leu Pro Glu Ala Arg Leu Leu Asp Leu Ser Ser
2975                2980                2985

Trp Phe Thr Val Gly Ala Gly Gly Gly Asp Ile Phe His Ser Val
2990                2995                3000

Ser Arg Ala Arg Pro Arg Ser Leu Leu Phe Gly Leu Leu Leu Leu
3005                3010                3015

Phe Val Gly Val Gly Leu Phe Leu Leu Pro Ala Arg
3020                3025                3030
```

<210> SEQ ID NO 4
<211> LENGTH: 9669
<212> TYPE: DNA
<213> ORGANISM: Hepatitis C virus

<400> SEQUENCE: 4

```
acctgcccct aatagggcg acactccgcc atgaatcact ccctgtgag gaactactgt      60
cttcacgcag aaagcgccta gccatggcgt tagtatgagt gtcgtacagc ctccaggccc    120
cccctcccg ggagagccat agtggtctgc ggaaccggtg agtacaccgg aattgccggg    180
aagactgggt cctttcttgg ataaacccac tctatgcccg ccatttgggt cgtgcccccg    240
caagactgct agccgagtag cgttgggttg cgaaaggcct tgtggtactg cctgataggg    300
cgcttgcgag tgcccggga ggtctcgtag accgtgcacc atgagcacga atcctaaacc     360
tcaaagaaaa accaaagaa acaccaaccg ccgcccacag gacgtcaagt tcccgggcgg    420
tggtcagatc gttggtggag tttacttgtt gccgcgcagg gccctaggt tgggtgtgcg     480
cgcaactcgg aagacttcag aacggtcgca accccgtgga cggcgtcagc ctatccccaa    540
ggcgcgccag cccacgggcc ggtcctgggg tcaacccggg tacccttggc ccctttatgc    600
caatgagggc ctcgggtggg cagggtggtt gctctccccc cgaggctctc ggcctaattg    660
gggcccaat gaccccggt ggaaatcgcg caacttgggt aaggtcatcg ataccctgac      720
gtgcggattc gccgacctca tggggtacat cccgctcgta ggcggccccg ttggggcgt    780
cgcaagggct ctcgcacacg tgtgagggt ccttgaggac ggggtaaact atgcaacagg     840
gaatttaccc ggttgctctt tctctatctt tatccttgca cttctttcat gcctgactgc    900
cccgacctct gccgttccct accgaaatgc ctctggggtt tatcatgtca ccaatgattg    960
cccaaactct tctatcgtct atgaggctga agacctgatc ttacacgcac ctggttgcgt   1020
gccctgtgtt aggcagggta atctcagtag gtgctgggtc cagatcaccc ccacactgtc   1080
agccccgagc ctcggagcgg tcacggctcc tcttcggagg gccgttgact acttagcggg   1140
gggggctgcc ctttgctccg cgttatacgt cggagacgcg tgcggggcag tgttttggt    1200
aggtcaaatg ttcacctata gccctcgccg gcataatgtt gtgcaggact gcaactgttc   1260
catttacagt ggccacatca ccggccaccg gatggcatgg acatgatga tgaattggtc    1320
acctacaaca gctttggtga tgcccagtt gttacggatt cccagggtgg tcattgacat    1380
cattgccggg gcccactggg gggtcttgtt cgccgccgca tactacgcgt cggcggctaa   1440
ctgggccaag gttgtgctgg tcctgtttct gtttgcgggg gtcgatgcca gccccgcac    1500
tgtgggtggt agtgcggccc aaggcgcgcg cgggctcgct tcactttca ccctgggcc     1560
gcagcagaac ttgcagctca taaataccaa cgggagctgg cacatcaaca gaactgcccct 1620
taactgtaat gacagcctcc agactgggtt tgtagccggc ctcctgtatt atcacaagtt   1680
caactccact gggtgtccgc agcggatggc tagctgtagg ccctcgccg cattcgacca    1740
gggctgggga actatcagct atgccgccgt gtcgggcccc agtgatgaca gccctattg    1800
ctggcactac cccccacgcc cgtgcggaat agtgccagcg cgaggtgtct gcggtccggt   1860
ctattgtttt acacctagcc cggtggtcgt cggcaccaca gaccgcaagg ggaatcccac   1920
ttacagttgg ggcgaaaatg agactgacat ctttctcttg aacaacacga ggcccctac    1980
tggcaactgg tttggctgca cctggatgaa ttccacaggg tttgtcaaga cttgcggggc   2040
tccaccctgc aacttagggc ctacaggcaa caatagcctt aagtgtccta ctgattgctt   2100
ccgcaagcac ccagacgcca cctacaccaa gtgtgggtca ggaccctggc tcactccccg   2160
gtgtctggtg cattacccctt accggttgtg gcattaccog tgcaccctaa attacaccat   2220
cttcaaggtg cgcatgtaca ttgggggcct cgagcacagg ctcgaggtgg catgcaactg   2280
gacccgtggt gagcggtgtg atcttgaaga cagggatagg gccgagctga gcccgctcct   2340
```

```
acataccacc acgcagtggg ccatattgcc gtgctctttc acacccacac ccgctcttag    2400
cactggtctc atacacttac atcaaaatat agtagacacc cagtatcttt acggtctgag    2460
ctccagcatc gtctcgtggg ccgttaagtg ggagtacata gtgctggcct tcttattact    2520
tgctgatgcc cgtatttgta cttgcctatg gatcatgctc ctggtttgtc aggccgaagc    2580
ggccctggag aacgtcattg tcctaaacgc ggctgcggct gcgggactc atgggttttt     2640 ctggggcctg ctcgtcatct gcttcgcctg gcacttcaag ggcagggtgg tccctggggc    2700
cacctacctt tgcttgggca tttggccatt actcttactc cttttcctcc tgccccaaag    2760
ggctctagcc ctggactcaa gcgatggcgg gactgtgggt tgtcttgtgt taaccatcct    2820
tacaatcttc acactcaccc ccgggtacaa gaagatggta gtgttggtca tatggtggct    2880
tcagtatttc atagcccggg tagaggcctt tatccatgtg tgggtgcccc cgttgcaggt    2940 tagggggtggt cgtgatgcta ttatcatgct cacatgcctt ttccatcctg ccctggggtt    3000
tgaggtcacg aaaatcctcc tcgggatact aggtcctttg tgcctgctgc agtactcgct    3060
catcaagctg ccttatttca tcagggcgcg cgccctgctg agggcgtgcc tgctagcgaa    3120
gcacttggcc tgtggcaggt acgtgcaggc ggccttgctc caccttggta ggctgaccgg    3180
aacgtacatt tatgaccacc ttgccccat gaaggattgg gcagcgtccg ggctgcgcga    3240
cttagcagtg gccacggagc ccatcatatt ctcccctatg gagacgaagg tcatcacgtg    3300
gggggctgac acgccgcat gtggggacat acttgccggc cttcctgtat cagctaggcg     3360
aggccatgaa atcttcctgg ggccagccga tgacatcaga gaggggggct ggcgacttct    3420
cgctcccatc actgcttatg cccagcaaac acgaggcctc ctgggcgcca tagtggtgag    3480
tatgacgggg cgtgacagga cagaacaggc cggggaagtc caaatcctgt ccacagtctc    3540
tcagtccttc ctcggaacaa ccatctcggg ggttttgtgg actgtttacc acggagctgg    3600
caacaagact ctagccggct tacggggtcc ggtcacgcag atgtactcga gtgctgaggg    3660
ggacttggta ggctggccca gccccctgg gaccaggtct ttggagccgt gcaagtgtgg    3720
agccgtcgac ctatatctgg tcacgcggaa cgctgatgtc atcccggctc ggagacgcgg    3780
ggacaagcgg ggagcattgc tctccccgag acccatttcg accttgaagg ggtcctcggg    3840
ggggccggtg ctctgcccta ggggccacgt cgttgggctc ttccgagcag ctgtgtgctc    3900
tcggggcgtg gccaaatcca tcgatttcat ccccgttgag acactcgacg ttgttacaag    3960
gtctcccact ttcagtgaca acagcacgcc accggctgtg cccagacct atcaggtcgg    4020 gtacttgcat gctccaactg gcagtggaaa gagcaccaag gtccctgtcg cgtatgccgc    4080
ccaggggtac aaagtactag tgcttaaccc ctcggtagct gccaccctgg ggtttggggc    4140
gtacctatcc aaggcacatg gcatcaatcc caacattagg actggagtca ggaccgtgat    4200
gaccggggag gccatcacgt actccacata tggcaaattt ctcgccgatg ggggctgcgc    4260
tagcggcgcc tatgacatca tcatatgcga tgaatgccac gctgtggatg ctacctccat    4320
tctcggcatc ggaacggtcc ttgatcaagc agagacagcc ggggtcagac taactgtgct    4380
ggctacggcc acaccccccg ggtcagtgac aaccccccat cccgatatag aagaggtagg    4440
cctcgggcgg gagggtgaga tcccccttcta tgggagggcg attcccctat cctgcatcaa    4500
gggagggaga cacctgattt tctgccactc aaagaaaaag tgtgacgagc tcgcggcggc    4560
ccttcggggc atgggcttga atgccgtggc atactataga gggttggacg tctccataat    4620
accagctcag ggagatgtgg tggtcgtcgc caccgacgcc ctcatgacgg ggtacactgg    4680
agactttgac tccgtgatcg actgcaatgt agcggtcacc caagctgtcg acttcagcct    4740
```

```
ggaccccacc ttcactataa ccacacagac tgtcccacaa gacgctgtct cacgcagtca   4800
gcgccgcggg cgcacaggta gaggaagaca gggcacttat aggtatgttt ccactggtga   4860
acgagcctca ggaatgtttg acagtgtagt gctttgtgag tgctacgacg caggggctgc   4920
gtggtacgat ctcacaccag cggagaccac cgtcaggctt agagcgtatt tcaacacgcc   4980
cggcctaccc gtgtgtcaag accatcttga attttgggag gcagttttca ccggcctcac   5040
acacatagac gcccacttcc tctcccaaac aaagcaagcg ggggagaact cgcgtacct    5100
agtagcctac caagctacgg tgtgcgccag agccaaggcc cctcccccgt cctgggacgc   5160
catgtggaag tgcctggccc gactcaagcc tacgcttgcg ggcccacac  ctctcctgta   5220
ccgtttgggc cctattacca atgaggtcac cctcacacac cctgggacga agtacatcgc   5280
cacatgcatg caagctgacc ttgaggtcat gaccagcacg tgggtcctag ctggaggagt   5340
cctggcagcc gtcgccgcat attgcctggc gactggatgc gtttccatca tcggccgctt   5400
gcacgtcaac cagcgagtcg tcgttgcgcc ggataaggag gtcctgtatg aggcttttga   5460
tgagatggag gaatgcgcct ctagggcggc tctcatcgaa gaggggcagc ggatagccga   5520
gatgttgaag tccaagatcc aaggcttgct gcagcaggcc tctaagcagg cccaggacat   5580
acaacccgct atgcaggctt catggcccaa agtggaacaa ttttgggcca gacacatgtg   5640
gaacttcatt agcggcatcc aatacctcgc aggattgtca acactgccag gaacccccgc   5700
ggtggcttcc atgatggcat tcagtgccgc cctcaccagt ccgttgtcga ccagtaccac   5760
catccttctc aacatcatgg gaggctggtt agcgtcccag atcgcaccac ccgcggggggc  5820
caccggcttt gtcgtcagtg gcctggtggg ggctgccgtg ggcagcatag gcctgggtaa   5880
ggtgctggtg gacatcctgg caggatatgg tgcgggcatt tcgggggccc tcgtcgcatt   5940
caagatcatg tctggcgaga agccctctat ggaagatgtc atcaatctac tgcctgggat   6000
cctgtctccg ggagccctgg tggtgggggt catctgcgcg gccattctgc gccgccacgt   6060
gggaccgggg gagggcgcgg tccaatggat gaacaggctt attgcctttg cttccagagg   6120
aaaccacgtc gcccctactc actacgtgac ggagtcggat gcgtcgcagc gtgtgacccca  6180
actacttggc tctcttacta taaccagcct actcagaaga ctccacaatt ggataactga   6240
ggactgcccc atcccatgct ccggatcctg gctccgcgac gtgtgggact gggtttgcac   6300
catcttgaca gacttcaaaa attggctgac ctctaaattg ttccccaagc tgcccggcct   6360
cccccttcatc tcttgtcaaa aggggtacaa gggtgtgtgg gccggcactg gcatcatgac  6420
cacgcgctgc ccttgcggcg ccgacatctc tggcaatgtc cgcctgggct ctatgaggat   6480
cacagggcct aaaacctgca tgaacacctg gcagggacc  tttcctatca attgctacac   6540
ggagggccag tgcgcgccga aaccccccac gaactacaag accgccatct ggagggtggc   6600
ggcctcggag tacgcggagg tgacgcagca tgggtcgtac tcctatgtaa caggactgac   6660
cactgacaat ctgaaaattc cttgccaact accttctcca gagttttttct cctgggtgga   6720
cggtgtgcag atccataggt ttgcacccac accaaagccg ttttttccggg atgaggtctc   6780
gttctgcgtt gggcttaatt cctatgctgt cgggtcccag cttccctgtg aacctgagcc   6840
cgacgcagac gtattgaggt ccatgctaac agatccgccc cacatcacgg cggagactgc   6900
ggcgcggcgc ttggcacggg gatcacctcc atctgaggcg agctcctcag tgagccagct   6960
atcagcaccg tcgctgcggg ccacctgcac cacccacagc aacacctatg acgtggacat   7020
ggtcgatgcc aacctgctca tggggggcgg tgtggctcag acagagcctg agtccaggt    7080
```

```
gcccgctctg gactttctcg agccaatggc cgaggaagag agcgaccctg agccctcaat      7140
accatcggag tgcatgctcc ccaggagcgg gtttccacgg gccttaccgg cttgggcacg      7200
gcctgactac aacccgccgc tcgtggaatc gtggaggagg ccagattacc aaccgcccac      7260
cgttgctggt tgtgctctcc cccccccaa gaaggcccg acgcctcccc caaggagacg        7320
ccggacagtg ggtctgagcg agagcaccac atcagaagcc ctccagcaac tggccatcaa      7380
gacctttggc cagccccccct cgagcggtga tgcaggctcg tccacggggg cgggcgccgc     7440
cgaatccggc ggtccgacgt cccctggtga gccggccccc tcagagacag gttccgcctc     7500
ctctatgccc cccctcgagg gggagcctgg agatccggac ctggagtctg atcaggtaga      7560
gcttcaacct ccccccccagg gggggggggt agctcccggt tcgggctcgg ggtcttggtc    7620
tacttgctcc gaggaggacg ataccaccgt gtgctgctcc atgtcatact cctggaccgg     7680
ggctctaata actccctgta gccccgaaga ggaaaagttg ccaatcaacc ctttgagtaa      7740
ctcgctgttg cgataccata acaaggtgta ctgtacaaca tcaaagagcg cctcacagag     7800
ggctaaaaag gtaacttttg acaggacgca agtgctcgac gcccattatg actcagtctt     7860
aaaggacatc aagctagcgg cttccaaggt cagctcgagg ctcctcacct tggaggaggc     7920
gtgccagttg actccacccc attctgcaag atccaagtat ggattcgggg ccaaggaggt    7980
ccgcagcttg tccgggaggg ccgttaacca catcaagtcc gtgtggaagg acctcctgga    8040
agacccacaa acaccaattc ccacaaccat catggccaaa aatgaggtgt tctgcgtgga    8100
ccccgccaag gggggtaaga aaccagctcg cctcatcgtt taccctgacc tcggcgtccg    8160
ggtctgcgag aaaatggccc tctatgacat tacacaaaag cttcctcagg cggtaatggg    8220
agcttcctat ggcttccagt actcccctgc ccaacgggtg gagtatctct tgaaagcatg    8280
ggcggaaaag aaggaccccca tgggtttttc gtatgatacc cgatgcttcg actcaaccgt   8340
cactgagaga gacatcagga ccgaggagtc catataccag gcctgctccc tgcccgagga    8400
ggcccgcact gccatacact cgctgactga gagactttac gtaggagggc ccatgttcaa    8460
cagcaagggt caaacctgcg gttacagacg ttgccgcgcc agcggggtgc taaccactag    8520
catgggtaac accatcacat gctatgtgaa agccctagcg gcctgcaagg ctgcggggat    8580
agttgcgccc acaatgctgg tatgcggcga tgacctagta gtcatctcag aaagccaggg    8640
gactgaggag gacgagcgga acctgagagc cttcacggag gccatgacca ggtactctgc    8700
ccctcctggt gatccccca gaccggaata tgacctggag ctaataacat cctgttcctc     8760
aaatgtgtct gtggcgttgg gcccgcgggg ccgccgcaga tactacctga ccagagaccc    8820
aaccactcca ctcgcccggg ctgcctggga aacagttaga cactcccctta tcaattcatg   8880
gctgggaaac atcatccagt atgctccaac catatgggct cgcatggtcc taatgacaca    8940
cttcttctcc attctcatgg tccaagacac cctggaccag aacctcaact ttgagatgta    9000
tggatcagta tactccgtga atcctttgga ccttccagcc ataattgaga ggttacacgg    9060
gcttgacgcc ttttctatgc acacatactc tcaccacgaa ctgacgcggg tggcttcagc    9120
cctcagaaaa cttggggcgc accccctcag ggtgtggaag agtcgggctc gcgcagtcag    9180
ggcgtccctc atctccgtg gagggaaagc ggccgtttgc ggccgatatc tcttcaattg     9240
ggcggtgaag accaagctca aactcactcc attgccggag gcgcgcctac tggacttatc    9300
cagttggttc accgtcggcg ccggcggggg cgacattttt cacagcgtgt cgcgcgcccg    9360
accccgctca ttactcttcg gcctactcct acttttcgta ggggtaggcc tcttcctact    9420
ccccgctcgg tagagcggca cactaggt acactccata gctaactgtt ccttttttttt     9480
```

```
tttttttttt tttttttttt tttttttttt tttttctttt tttttttttt ccctctttct    9540
tcccttctca tcttattcta ctttctttct tggtggctcc atcttagccc tagtcacggc    9600
tagctgtgaa aggtccgtga gccgcatgac tgcagagagt gccgtaactg gtctctctgc    9660
agatcatgt                                                            9669

<210> SEQ ID NO 5
<211> LENGTH: 18
<212> TYPE: DNA
<213> ORGANISM: Artificial Sequence
<220> FEATURE:
<223> OTHER INFORMATION: Probe used for HCV quantification

<400> SEQUENCE: 5
ccttgtggta ctgcctga                                                  18

<210> SEQ ID NO 6
<211> LENGTH: 18
<212> TYPE: DNA
<213> ORGANISM: Artificial Sequence
<220> FEATURE:
<223> OTHER INFORMATION: Forward primer used for HCV quantification

<400> SEQUENCE: 6
agygttgggt ygcgaaag                                                  18

<210> SEQ ID NO 7
<211> LENGTH: 16
<212> TYPE: DNA
<213> ORGANISM: Artificial Sequence
<220> FEATURE:
<223> OTHER INFORMATION: Reverse primer used for HCV quantification

<400> SEQUENCE: 7
cactcgcaag crccct                                                    16
```

METHOD OF PURIFYING WHOLE VIRUS PARTICLES

CROSS REFERENCE TO RELATED APPLICATIONS

This application is a U.S. National Phase Application of PCT International Application Number PCT/EP2021/069300, filed on Jul. 12, 2021, designating the United States of America and published in the English language, which is an International Application of and claims the benefit of priority to European Patent Application No. 20186549.0, filed on Jul. 17, 2020. The disclosures of the above-referenced applications are hereby expressly incorporated by reference in their entireties.

REFERENCE TO SEQUENCE LISTING

A Sequence Listing submitted as an ASCII text file via EFS-Web is hereby incorporated by reference in accordance with 37 U.S.C. § 1.52 (e). The name of the ASCII text file for the Sequence Listing is SeqList-PLOUG165-003APC.txt, the date of creation of the ASCII text file is Dec. 5, 2022, and the size of the ASCII text file is 79,602 bytes.

TECHNICAL FIELD OF THE INVENTION

The present invention relates to a method of purifying whole virus particles. In particular, the present invention relates to an improved downstream process for purification of cell culture-derived viruses to obtain a whole virus vaccine candidate stock.

BACKGROUND OF THE INVENTION

The hepatitis C virus (HCV) is a small enveloped virus, 30 to 80 nm in diameter, with a single positive stranded RNA genome, belonging to the Flaviviridae family. The RNA genome encodes three structural proteins, the capsid protein Core, and the envelope proteins E1 and E2, which are incorporated into the viral particle, as well as seven non-structural proteins (p7, NS2, NS3, NS4A, NS4B, NS5A, and NS5B). There are eight different major genotypes, differing in ~30% of their nucleotide and amino acid sequence, with genotype 1 being most frequent worldwide.

Each year, there are at least 2 million new HCV infections, of which ~80% result in chronic infections. There are at least 71 million chronically infected individuals worldwide with an increased risk for liver cirrhosis and hepatocellular carcinoma, resulting in 400.000 deaths per year.

Only a minor fraction of HCV-infected individuals is treated with recently licensed efficient direct-acting antivirals (DAA). The main reasons for this are that most individuals are not aware of their infection status, as the infection is typically asymptomatic until a severe and often irreversible liver disease has developed, and because of the lack of screening programs and the high cost of DAA. Furthermore, resistance to DAA is increasing and might compromise future treatment efficacy. Thus, a vaccine is urgently needed to control HCV on a global scale.

Most antiviral vaccines are based on whole viral particles as vaccine antigens and protect by their induction of neutralizing antibodies. The proof-of-concept for the immunogenicity of cell culture-derived inactivated HCV has been obtained in animal models. However, in these studies, ultracentrifugation-based downstream processes (DSP) were employed for concentration and purification of cell culture-derived HCV. This approach is in general characterized by a relatively low recovery, a limited scalability, and a limited impurity depletion. Thus, as for most other vaccines, the development of an efficient DSP, compatible with industrial requirements, is a major bottleneck for the manufacturing of a whole virus HCV vaccine for human use.

Hence, an improved downstream process providing an efficient, scalable and GMP-compatible DSP for purification of cell culture-derived HCV to facilitate an industrial production of a human HCV vaccine would be advantageous.

SUMMARY OF THE INVENTION

The present inventors have now surprisingly found that virus particles from cell cultures may be efficiently purified by a DSP comprising specific purification steps, resulting in purified viruses with only a minimal amount of impurities being ready for use for immunizing. These virus particle stocks may be used in facilitating virological studies, and for vaccine development.

Thus, it is an object of the present invention to provide such purified virus particles for example as a whole virus vaccine candidate stock.

Thus, one aspect of the invention relates to a method of purifying whole HCV particles, the method comprising the steps of
a) providing a cell culture supernatant comprising virus particles,
b) purification and/or concentration of the cell culture supernatant,
c) purification and/or concentration of the product of above step b) using steric exclusion chromatography (SXC) at alkaline pH in the range of 8-10,
d) purification and/or concentration of the product of above step c) using sulphated cellulose membrane absorbers (SCMA),
e) obtaining purified whole virus particles.

BRIEF DESCRIPTION OF THE FIGURES

FIG. 2 shows the influence of pH on SXC chromatography. For binding and washing of genotype 1a HCV, 20 mM Tris with 180 mM NaCl and 8% PEG 6000 were used at (A) pH 8, (B) pH 9 and (C) pH 10; loading: 0-9 mL, washing: 9-15 mL, elution (without PEG using 180 mM NaCl): 15-21 mL. (D) at pH 11 the flow rate was reduced at about 4 mL as the pressure already increased above 2.5 MPa. Here washing was already initiated after 6 mL;

FIG. 6 shows process performance for a different HCV genotype. Shown is (A) the recovery of virus, DNA and protein during SXC and (B) the recovery of virus and DNA in the different SCMA fractions. Furthermore, (C) the total protein amounts and (D) the total DNA amounts throughout the process are depicted. All recovery values are step-recoveries, correlated to the quantities in the loading sample of the respective step. For the SCMA, no protein recoveries and amounts are depicted as no proteins could be detected in any of the SCMA fractions. Error bars indicate technical triplicates with error bars reflecting SD.

Figure 1:
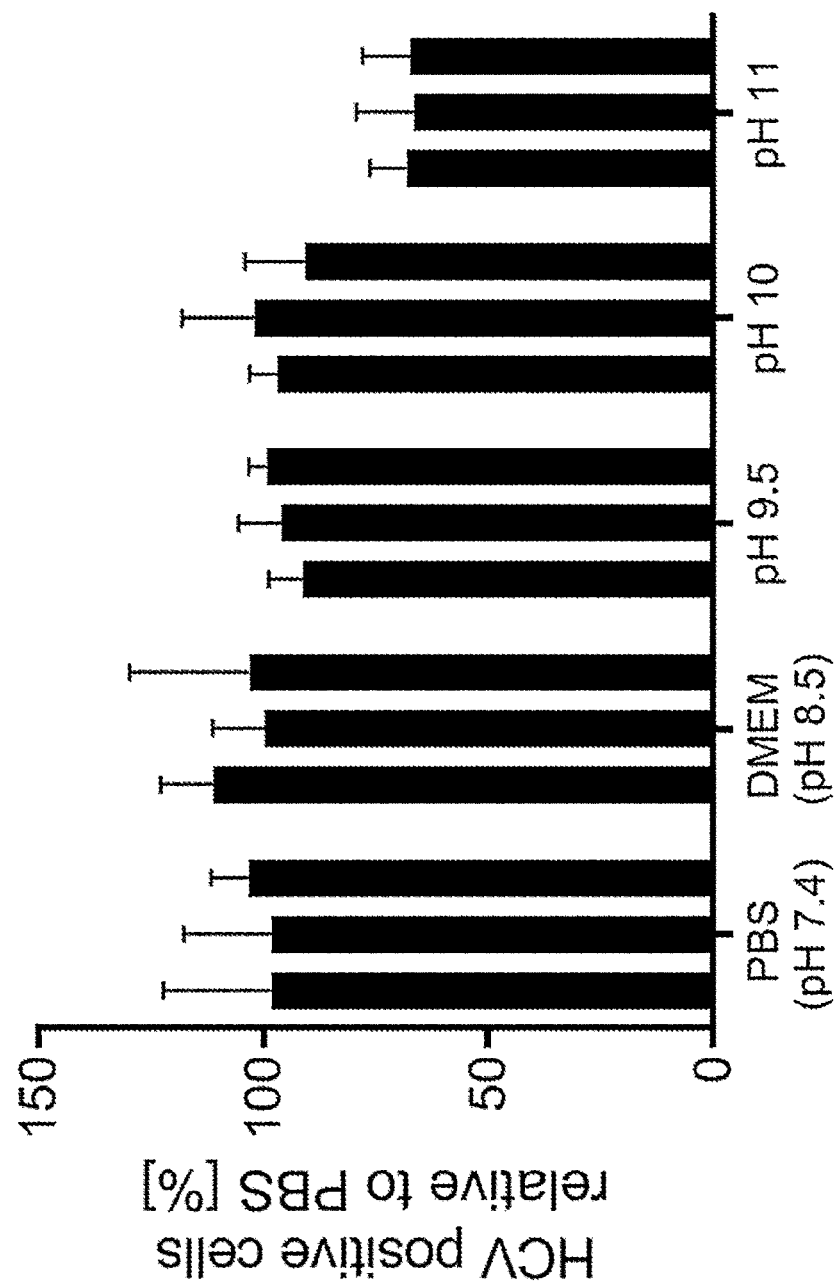
FIG. 1 shows HCV stability at alkaline pH. HCV was incubated at room temperature for 90 minutes in PBS (pH 7.4), DMEM standard cell culture medium (pH 8.5) and phosphate buffers for alkaline conditions (pH 9.5, 10 and 11). Subsequently, solutions were neutralized with DMEM containing 20 mM HEPES and used to infect cells. The number of infected cells after 48 hours of incubation was evaluated relative to the mean of the number of infected cells resulting from infection with virus incubated in PBS. Data from three biological replicates are shown as separate bars. Error bars are standard deviations (SD) representing 3 technical replicates.

The present invention will now be described in more detail in the following.

DETAILED DESCRIPTION OF THE INVENTION

Definitions

Prior to discussing the present invention in further details, the following terms and conventions will first be defined:

The term "clarification" is to be understood as a step of clarification or a step of clarifying a sample i.e. the cell culture supernatant is crudely purified from large impurities such as whole cells and cell debris.

The term "ultrafiltration" is to be understood as a step of ultrafiltration as known to the persons skilled in the art, where a sample may be concentrated. In addition, the ultrafiltration further purifies the sample by removing impurities such as smaller host cell-derived proteins and DNA, which are below the molecular weight cut-off of the used devices.

The term "chromatography" is to be understood as a step performed by a chromatographic technique as known to the persons skilled in the art including anion- or cation exchange chromatography, hydrophilic interaction chromatography, SXC or SCMA as well as flow through methods such as Capto Core 700 chromatography or size exclusion chromatography.

The term "SXC" is to be understood as steric exclusion chromatography as commonly known to the persons skilled in the art. Steric exclusion chromatography is run in a membrane-containing column, where the sample is loaded via a loading buffer to the column for binding of the product to the membranes, the column is then washed to elute impurities from the column prior to eluting the product from the column by means of an elution buffer.

The term "SCMA" is to be understood as sulphated cellulose membrane absorbers as commonly known to the persons skilled in the art. SCMA is also a chromatography-based method, which is run in a membrane-containing column. The sample is loaded via a loading buffer to the column for binding of the product to the membranes, the column is then washed to elute impurities from the column prior to eluting the product from the column by means of an elution buffer.

The term "dynamic binding capacity (DBC)" is to be understood as commonly known by the persons skilled in the art i.e. it describes the maximum amount of product that may be loaded onto the column without causing unnecessary loss, measured under realistic experimental conditions (default flow-rate, real sample).

The term "virus particles" is to be understood as infectious viruses, inactive viruses as well as virus-like particles.

The term "whole virus particles" is to be understood as virus particles, which consist of RNA or DNA surrounded by a protein shell, optionally surrounded by an envelope.

The terms "isolate" and "strain" are used herein interchangeably.

As commonly defined "identity" is here defined as sequence identity between genes or proteins at the nucleotide or amino acid level, respectively. Thus, in the present context "sequence identity" is a measure of identity between proteins at the amino acid level and a measure of identity between nucleic acids at nucleotide level. The protein sequence identity may be determined by comparing the amino acid sequence in a given position in each sequence when the sequences are aligned. Similarly, the nucleic acid sequence identity may be determined by comparing the nucleotide sequence in a given position in each sequence when the sequences are aligned. To determine the percent identity of two amino acid sequences or of two nucleic acid sequences, the sequences are aligned for optimal comparison purposes (e.g., gaps may be introduced in the sequence of a first amino acid or nucleic acid sequence for optimal alignment with a second amino or nucleic acid sequence). The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position. The percent identity between the two sequences is a function of the number of identical positions shared by the sequences (i.e., % identity=# of identical positions/total # of positions (e.g., overlapping positions)×100).

One may manually align the sequences and count the number of identical amino acids. Alternatively, alignment of two sequences for the determination of percent identity may be accomplished using a mathematical algorithm. Such an algorithm is incorporated into the NBLAST and XBLAST programs (Altschul et al. 1997; Altschul et al. 2005). BLAST nucleotide searches may be performed with the NBLAST program, score=100, wordlength=12, to obtain nucleotide sequences homologous to a nucleic acid molecules of the invention. BLAST protein searches may be performed with the XBLAST program, score=50, word-length=3 to obtain amino acid sequences homologous to a protein molecule of the invention. To obtain gapped alignments for comparison purposes, Gapped BLAST may be utilised. Alternatively, PSI-Blast may be used to perform an iterated search, which detects distant relationships between molecules. When utilising the NBLAST, XBLAST, and Gapped BLAST programs, the default parameters of the respective programs may be used.

See http://www.ncbi.nlm.nih.gov. Alternatively, sequence identity may be calculated after the sequences have been aligned e.g. by the BLAST program in the EMBL database (www.ncbi.nlm.gov/cgi-bin/BLAST). Generally, the default settings with respect to e.g. "scoring matrix" and "gap penalty" may be used for alignment. In the context of the present invention, the BLASTN and PSI BLAST default settings may be advantageous.

The percent identity between two sequences may be determined using techniques similar to those described above, with or without allowing gaps. In calculating percent identity, only exact matches are counted.

It should be noted that while several of the sequences in the present application are DNA sequences, the present invention contemplates the corresponding RNA sequence, and DNA and RNA complementary sequences as well.

Thus, in cases where a DNA sequence is mentioned refers such DNA sequence also to the RNA equivalent i.e. with Ts exchanged with Us as well as their complimentary sequences.

The term "adaptive mutation" is meant to cover mutations identified in passaged viruses that provide the original and any other HCV sequence the ability to grow efficiently in culture. Furthermore, all introductions of mutations into the sequences described, whether or not yielding better growth abilities, and the introduction of these mutations into any HCV sequence should be considered. Throughout the description the adaptive mutations as described herein is to be interpreted as XZY being amino acid/nucleic acid "X" at position "Z" being changed to amino acid/nucleic acid "Y" e.g. as an example A1226G is to be understood as the amino acid alanine (A) at position 1226 being changed to the amino acid glycine (G).

The term "composition" refers to a pharmaceutical composition suitable for administration to a subject, and such compositions may comprise a pharmaceutically acceptable carrier or diluent, for any of the indications or modes of administration as described. The active materials in the compositions of this invention can be administered by any appropriate route, for example, orally, parenterally, intravenously, intradermally, subcutaneously, or topically, in liquid or solid form.

The term "pharmaceutically acceptable" refers to molecular entities and compositions that are physiologically tolerable and do not typically produce an allergic or similar untoward reaction, such as gastric upset, dizziness and the like, when administered to a human. Preferably, as used herein, the term "pharmaceutically acceptable" means approved by a regulatory agency of the Federal or a state government or listed in the U.S. Pharmacopoeia or other generally recognized pharmacopoeia for use in animals, and more particularly in humans.

The term "excipient" refers to a diluent, adjuvant, carrier, or vehicle with which the compound is administered. Such pharmaceutical carriers can be sterile liquids, such as water and oils, including those of petroleum, animal, vegetable or synthetic origin, such as peanut oil, soybean oil, mineral oil, sesame oil and the like. Water or aqueous solution saline solutions and aqueous dextrose and glycerol solutions are preferably employed as carriers, particularly for injectable solutions. Suitable pharmaceutical carriers are described in "Remington's Pharmaceutical Sciences" by E. W. Martin.

The term "adjuvant" refers to a compound or mixture that enhances the immune response to an antigen. An adjuvant can serve as a tissue depot that slowly releases the antigen and also as a lymphoid system activator that non-specifically enhances the immune response. Often, a primary challenge with an antigen alone, in the absence of an adjuvant, will fail to elicit a humoral or cellular immune responses.

The terms "cell" and/or "cell systems" are to be understood comprising primary cultures or other, also non hepatic cell lines. "Primary cultures" refers in the present context to a culture of cells that is directly derived from cells or tissues from an individual, as well as cells derived by passage from these cells, or immortalized cells.

The term "cell line" refers to a population of cells capable of continuous or prolonged growth and division in vitro. The term "cell lines" also includes immortalized cells. Often, cell lines are clonal populations derived from a single progenitor cell. Such cell lines are also termed "cell clones".

Method

For development of vaccines targeting different viruses such as e.g. HCV, an inactivated whole virus approach is attractive, given the intricate conformation of the envelope proteins, which is difficult to mimic in subunit envelope vaccines. Also considering the higher immunogenicity of whole particles compared to envelope proteins, and the historic success of this strategy in antiviral vaccine development, whole virus particles are preferable. For HCV, this approach has only become feasible due to the relatively recent development of cell culture systems for the production of HCV. However, for a success of this strategy, it is important that the virus particles are purified from the cell cultures in an efficient manner and in a manner leaving only traces of impurities in the purified virus stock.

Here, we evaluated clarification and ultrafiltration in combination with two chromatography technologies, such as the membrane-based chromatography technologies (1) SXC, and (2) SCMA, for the development of a cost-efficient, scalable DSP, compatible with good manufacturing practices (GMP).

In one aspect, the present invention relates to a method of purifying whole virus particles, the method comprising the steps of
   a) providing a cell culture supernatant comprising virus particles,
   b) purification and/or concentration of the cell culture supernatant,
   c) purification and/or concentration of the product of above step b) using chromatography,
   d) purification and/or concentration of the product of above step c) using chromatography,
   e) obtaining purified whole virus particles.

In one embodiment, the chromatography used in step c) is steric exclusion chromatography (SXC) and the chromatography used in step d) is sulphated cellulose membrane absorbers (SCMA).

The examples show experiments using such methods and the resultant high recovery rates and low amount of impurities. Example 7 also demonstrates how this method is advantageous as compared to an alternative method known in the art.

Purification and/or Concentration of the Cell Culture Supernatant

The first step of purification and/or concentration of the cell culture supernatant is performed on the cell culture supernatant in step b) in order to remove vast amounts of impurities obtained when harvesting the cell culture supernatant comprising the virus particles and/or to concentrate the supernatant.

In one embodiment, the purification and/or concentration is performed using a method selected from the list consisting of centrifugation, ultracentrifugation, density gradient ultracentrifugation, iodixanol cushion centrifugation, sucrose cushion centrifugation, nycodenz cushion centrifugation, cesium chloride cushion, iodixanol gradient centrifugation, sucrose gradient centrifugation, nycodenz gradient centrifugation, cesium chloride gradient centrifugation, ultracentrifugation pelleting, filtration, clarification, microfiltration, nanofiltration, direct filtration, cross-flow filtration, ultrafiltration, precipitation, polyethylene glycol precipitation, polymer precipitation and polyelectrolyte precipitation.

In a further embodiment, the purification and/or concentration is performed using filtration.

In a further embodiment, the filtration is selected from the list consisting of conventional direct or dead-end filtration, depth filtration, cut-off filtration, microfiltration, nanofiltration, ultrafiltration, small-scale cross-filtration, and cross-flow filtration.

In a further embodiment, the precipitation is polyethylene glycol (PEG) precipitation.

In one embodiment, the purification in step b) comprises at least one step of clarification. In a further embodiment, two steps of clarification are performed. The step of clarification may beneficially be a step of filtration that covers clarification and endotoxin removal. This can be done using a 3M Purification Inc.™ filtration system. The 3M Purification Inc.™ filtration system includes but is not limited to depth filters "Zeta Plus", "Zeta Plus EXT Series" and "Betapure NT-P™" which can be used for clarification, adsorption-based separation systems "Zeta Plus ZA", which can be used for endotoxin removal, and surface filters "LifeASSURE SP", which can be used for endotoxin removal. Alternatively, the clarification is performed using capsule filters such as Sartopur® PP3 capsule filters.

Alternatively, the purification may be performed using 3 or 4 cushions. Cushions can have different densities, for example, iodixanol cushions could be 10%, 20%, 28%, 30%, 60% or 70%.

In a further embodiment, the ultracentrifugation is selected from the group consisting of iodixanol gradient ultracentrifugation, sucrose gradient ultracentrifugation, and ultracentrifugation pelleting. The gradient ultracentrifugations can be done at different ranges, for example 1-80%, 5-60%, 10-40%, 20-60%, or 20-70%.

In a further embodiment, step b) further comprises at least one step of ultrafiltration.

In a still further embodiment, the purification is performed using two steps of ultrafiltration. The ultrafiltration may advantageously be performed by two subsequent steps of ultrafiltrations preferably using different parameter settings e.g. different filter sizes, where the largest filter is used in the first ultrafiltration. The ultrafiltration is preferably performed using hollow fiber filters.

In a further embodiment, the hollow-fiber filters may be filters such as but not limited to MicroKros® Filter Modules, MidiKros® Filter Modules, MidiKros® TC Filter Modules, MiniKros® Sampler Filter Modules, MiniKros® Filter Modules, KrosFlo® Filter Modules, KrosFlo® Max Filter Modules and Vivaflow. Different molecular weight cut-offs such as 500 kDa, 300 kDA, 200 kDa, 100 kDa, 70 kDa, 50 kDa, 30 kDa, 10 kDa, 5 kDa, 3 kDa, 1 kDa might be used. Filters with different surface areas may be used.

Different filters can be applied, and they may have different pore size, greater surface or have a higher molecular weight cut-off to allow purification from bigger proteins.

In a preferred embodiment, the first step of purification and/or concentration i.e. step b) comprises two steps; step b1) a step of clarification performed by filtration, optionally using capsule filters, for purification of the cell culture supernatant and step b2) a step of ultrafiltration, optionally using hollow fiber filters, for concentrating the product obtained from step b1).

Steps b1) and b2) are performed at least once. Thus, the step of clarification and/or ultrafiltration may be performed one time, two times, three times, four times or so forth.

In a further embodiment, step b1) comprises two steps of clarification.

In a still further embodiment, step b2) comprises two steps of ultrafiltration.

In a more preferred embodiment, step b1) and step b2) comprises two subsequently following steps of clarification or ultrafiltration, respectively.

Chromatographic Purifications and/or Concentrations

In the steps c) and d), the product is further purified and/or concentrated by means of chromatographic techniques. These techniques include anion- or cation exchange chromatography, hydrophilic interaction chromatography, SXC or SCMA, which can be performed either by binding the virus particle and washing out the contaminants or vice versa. The chromatographic techniques could also be flow through methods such as Capto Core 700 chromatography or size exclusion chromatography.

In one embodiment, the chromatographic purifications and/or concentrations are a combination of SXC and SCMA. In a further embodiment, the chromatographic purifications and/or concentrations are a SXC in step c) and a SCMA in step d). Alternatively, the chromatographic purification and/or concentrations are a SCMA in step c) and a SCMA in step d).

SXC

SXC is a membrane-based chromatography technology known as steric exclusion chromatography. The method is based on the steric exclusion of particles in a solution of an inert polymer, e.g. polyethylene glycol (PEG). This exclusion leads to the formation of polymer-rich and polymer-deficient zones, resulting in a thermodynamic instability, which is resolved by an association of the excluded particles with each other, and with the hydrophilic stationary phase, thus, retaining target molecules from the mobile phase. Adjustment of the PEG concentration and the molecular weight, with regard to the size of the product and expected process impurities, allows a selective product retention. Retained particles are eluted by the removal of the inert polymer from the mobile phase as known to the persons skilled in the art.

In one embodiment, step c) is performed using SXC.

The chromatographic process may be monitored continuously by techniques common to the persons skilled in the art e.g. by light-scattering techniques, system-integrated UV, measurements of conductivity and by using systems such as a Nano DLS Particle Size Analyzer.

The SXC may be run using membranes as known to the persons skilled in the art such as cellulose membranes like regenerated cellulose membranes, or other hydrophilic membranes such as polyamide, glass fibre membranes may be used. In one embodiment, the SXC is performed using cellulose membranes.

The number of membranes used for each separate run would depend on the product to be purified. However, in one embodiment, the SXC is performed using 4-20 membranes, such as 5-15 membranes, like 8-12 membranes, such as 10 membranes per column.

In a further embodiment, the membranes have a pore size in the range of 0.1-10 µm, such as in the range of 0.2-9 µm, like in the range of 0.3-8 µm, such as in the range of 0.4-7 µm, like in the range of 0.5-6 µm such as in the range of 0.6-5 µm, like in the range of 0.5-4 µm, such as in the range of 0.6-3 µm, like in the range of 0.7-2 µm, such as in the range of 0.8-1.5 µm, like in the range of 0.9-1.2 µm, such as around 1 µm. The purification ability depends on the size of the product to be purified why it is important to adjust the pore size to the size of the product to obtain optimal purification.

In an even further embodiment, the SXC is performed at a flow rate in the range of 0.1-20 mL/min, such as in the range of 0.2-18 mL/min, like in the range of 0.3-16 mL/min, such as in the range of 0.4-14 mL/min, like in the range of 0.5-12 mL/min, such as in the range of 0.6-10 mL/min, like in the range of 0.7-8 mL/min, such as in the range of 0.8-6 mL/min, like in the range of 1.0-4 mL/min, such as in the range of 1.5-3 mL/min, like around 2 mL/min.

The pH of the SXC may be adjusted depending on the target virus particle for it to be adjusted around the isoelectric point of the target particle. In one embodiment, purifying HCV, the SXC is performed at a pH in the range of 8-10, such as 8.5-9.5, like around 9. In a further embodiment, the pH is 8 or above. In an even further embodiment, the pH is below 11. In a further embodiment, the pH is adjusted to a level at which the virus particle would remain stable.

In a further embodiment, the elution buffer comprises a conductivity in the range of 0-300 mS/cm$^2$, such as in the range of 25-250 mS/cm$^2$, like in the range of 35-200 mS/cm$^2$, such as in the range of 50-150 mS/cm$^2$.

The elution buffer may be chosen from different salt combinations of anions like F$^-$, SO$_4^{2-}$, HPO$_4^{2-}$, CH$_3$COO$^-$, NO$_3^-$, Br$^-$, ClO$_3^-$, I$^-$, ClO$_4^-$, SCN$^-$, Cl$_3$CCOO$^-$ and cations like NH$_4^+$, K$^+$, Na$^+$, Li$^+$, Mg$_2^+$, Ca$_2^+$. In one embodiment, the elution buffer comprises NaCl. In a further embodiment, the concentration of NaCl is 0-2 M, such as 0.1-2 M.

In a further embodiment, the inert buffer used in the system is polyethylene glycol, which is advantageously mixed with the product prior to loading onto the SXC column.

Different PEG sized may be used depending on the virus particles to be purified such as PEG 4000 to PEG 20000. In one embodiment, PEG6000 is used.

The total concentration of PEG in the column may differ depending on the virus particles to be purified. In one embodiment, the final concentration in the column during loading and washing is in the range of 1-20%, such as 2-18%, like 3-16%, such as 4-14%, like 5-12%, such as 6-10%, like 7-9%, such as around 8%.

SCMA

SCMA is a pseudo affinity-based orthogonal technique. The method utilizes the heparin-mimicking effect of sulphated cellulose.

In one embodiment, step d) is performed using SCMA for subsequent polishing.

The chromatographic process may be monitored continuously by techniques common to the persons skilled in the art e.g. by light-scattering techniques, system-integrated UV, measurements of conductivity and by using systems such as a Nano DLS Particle Size Analyzer.

The SCMA may be run using membranes as known to the persons skilled in the art such as sulphated cellulose membranes. In one embodiment, the SCMA is performed using Sartobind® sulphated cellulose membranes.

The number of membranes used for each separate run would depend on the product to be purified. However, in one embodiment, the SCMA is performed using 1-20 membranes, such as 5-15 membranes, like 8-12 membranes, such as 10 membranes per column.

In a further embodiment, the membranes have a nominal pore size in the range of 0.1-5 µm, such as in the range of 0.2-4 µm, like in the range of 0.3-3 µm, such as in the range of 0.4-2 µm, like in the range of 0.5-1.5 µm, such as in the range of 0.6-1.2 µm, like around 0.8 µm. The purification ability depends on the size of the product to be purified why it is important to adjust the pore size to the size of the product to obtain optimal purification.

In an even further embodiment, the SCMA is performed at a flow rate in the range of 0.1-5 mL/min, such as in the range of 0.2-4 mL/min, like in the range of 0.3-3 mL/min, such as in the range of 0.4-2 mL/min, like in the range of 0.5-1 mL/min, such as in the range of 0.6-1 mL/min, like in the range of 0.7-0.9 mL/min, such as around 0.8 mL/min.

In a further embodiment, the elution buffer comprises a conductivity in the range of 10-300 mS/cm$^2$, such as in the range of 25-250 mS/cm$^2$, like in the range of 35-200 mS/cm$^2$, such as in the range of 50-150 mS/cm$^2$, like in the range of 80-110 mS/cm$^2$, such as around 100 mS/cm$^2$.

The elution buffer may be chosen from different salt combinations of anions like F$^-$, SO$_4^{2-}$, HPO$_4^{2-}$, CH$_3$COO$^-$, NO$_3^-$, Br$^-$, ClO$_3^-$, I$^-$, ClO$_4^-$, SCN$^-$, Cl$_3$CCOO$^-$ and cations like NH$_4^+$, K$^+$, Na$^+$, Li$^+$, Mg$_2^+$, Ca$_2^+$. In one embodiment, the elution buffer comprises NaCl. In a further embodiment, the concentration of NaCl is 0.1-2 M, such as 0.5-0.7 M NaCl.

In embodiment, the present invention relates to a method of purifying whole virus particles, the method comprising the steps of
  a) providing a cell culture supernatant comprising virus particles,
  b) purification and/or concentration of the cell culture supernatant,
  c) purification and/or concentration of the product of above step b) using SXC,
  d) purification and/or concentration of the product of above step c) using SCMA,
  e) obtaining purified whole virus particles.

In one particular embodiment, the method comprises the steps of:
  a) providing a cell culture supernatant comprising virus particles,
  b1) at least one clarification of the cell culture supernatant,
  b2) at least one ultrafiltration of the product of step b1)
  c) purification and/or concentration of the product of above step b) using SXC, optionally at alkaline pH in the range of 8-10, such as 8.5-9.5, like around 9,
  d) purification and/or concentration of the product of above step c) using SCMA,
  e) obtaining purified whole virus particles.

In one particular embodiment, the method comprises the steps of:
  a) providing a cell culture supernatant comprising virus particles,
  b1a) first clarification of the cell culture supernatant, b1b) second clarification of the product of step b1a)
b2a) first ultrafiltration of the product of step b1b)
b2b) second ultrafiltration of the product of step b2a)
c) purification and/or concentration of the product of above step b) using SXC, optionally at alkaline pH in the range of 8-10, such as 8.5-9.5, like around 9,
d) purification and/or concentration of the product of above step c) using SCMA,
e) obtaining purified whole virus particles.

Inactivation, Nuclease Treatment and Freezing

In one embodiment, the method may further comprise a step of inactivating the virus particles. In principle, the virus particles may be inactivated before or after any of the steps b)-e). However, in a further embodiment, the virus particles are inactivated prior to step c). By prior to step c), is to be understood that the virus particles may be inactivated at any time during the process before step c) is initiated e.g. after step a), and/or after step b). Inactivation of the virus particles results in inactivated whole virus particles.

In another embodiment, the inactivation is performed using UV irradiation, UV combined with photosensitizer, paraformaldehyde, or betapropiolactone, binary ethylen-imine, or gamma-irradiation. For certain chemicals and in case the inactivation is performed after step d) or e) an additional process step may be introduced to remove the chemical, used for the inactivation, such as diafiltration. In one embodiment, the inactivation is performed using UV irradiation.

In a further embodiment, the method further comprises a step of nuclease treatment. In a still further embodiment, the nuclease treatment is performed during step b). In an even further embodiment, the nuclease treatment is performed following the step(s) of ultrafiltration and optionally, after the step of clarification. In one embodiment, the nuclease treatment is performed prior to step c). The nuclease treatment may be performed using commercially available nucleases and according to the instructions of the manufacturer. Preferably, the nuclease activity is following blocked e.g. by addition of EDTA.

In a still further embodiment, the method comprises at least one step of nuclease treatment. In an even further embodiment, the method comprises two or more steps of nuclease treatment. As an example, the sample may be treated with nuclease during step b) and between step c) and d). In another embodiment, the sample is treated with nuclease during step b) and after step d). In an even further embodiment, the sample is treated with nuclease prior to step c) and between step c) and d). In a still further embodiment, the sample is treated with nuclease prior to step c) and after step d).

If required, an additional DNA reduction may be achieved by optimizing the nuclease treatment regarding the enzyme amount and the incubation time.

In one embodiment, the method comprises nuclease treatment during step b) and inactivation of the virus particles after step b).

In a further embodiment, the eluate does not comprise a step of freezing between step c) and step d). In a still further embodiment, the method does not comprise a step of freezing. As demonstrated in Example 5, better recovery rates are obtained if the samples are not frozen between these purification steps using SXC and SCMA.

Virus Particles

The method according to the present invention may be used for the purification of different virus particles obtaining purified whole virus particles. In one embodiment, the virus particle is non-enveloped or enveloped.

In a further embodiment, the virus particle belongs to the Flaviviridae family. In another embodiment, the virus particle belongs to the Coronaviridae family. In a still further embodiment, the virus particle is selected from the genus flavivirus, hepacivirus, pegivirus or pestivirus.

In a further embodiment, the virus particle is a virus selected from the group consisting of yellow fever virus, West Nile virus, dengue fever virus, tick borne encephalitis virus, Zika virus, Usutu virus, GB virus C, bovine viral diarrhea virus, classical swine fever, border disease virus coronaviridae, SARS-CoV-2, SARS-CoV, MERS-CoV, as well as human coronaviruses 229E, NL63, 0C43, and HKU1, HAV, HBV and HCV.

In one embodiment, the virus particles are HCV particles. In a further embodiment, the HCV is of a genotype selected from the group consisting of genotype 1, 2, 3, 4, 5, 6, 7 and 8 as well as their subtypes such as a, b, c, d, e, and f.

In a further embodiment, the HCV particles are of genotype 1a and/or genotype 5a. In a still further embodiment, the HCV particles are HCV genotype 1a such as strain TNcc (GenBank accession no. JX993348), strain H77 (GenBank accession no. KP098533.1) and strain HCV1 (GenBank accession no. KP098532). In an even further embodiment, the HCV particles are HCV genotype 5a such as strain SA13 (GenBank accession no. F3393024.1).

The hepatitis C virus can be either full length or an intra- or intergenotypic recombinant.

In a still further embodiment, the HCV comprises adaptive mutations. The adaptive mutations attenuate the virus in vivo. Cell cultures comprising HCV having adaptive mutations are known to be able to replicate and form viral particles in cell culture with high efficiency. These genomes have the complete functions of HCV and in consequence, they are able to produce infectious viruses.

The adaptive mutation is a mutation that can be observed by clonal or direct sequencing. One or more adaptive mutations may be present in Core, E1, E2, p7, NS2, NS3, NS4A, NS4B, NS5A or NS5B singly or in combination.

As an example, the virus particle may comprise at least one amino acid mutation selected from the group consisting of A1226G, F1464L, A1672S, Q1773H, N1927T, D2979G, Y2981F, F2994S according to the H77 reference sequence with GenBank accession number AF009606. In a further example, the virus particle may be TNcc (GenBank accession no. JX993348) as set forth in SEQ ID NO. 1 and SEQ ID NO. 2. In addition, TNcc may comprise additional mutations selected from the group detailed in Table 1.

As another example, the virus particle may encode a human hepatitis C virus wherein the hepatitis C virus is derived from genotype 5a, comprising at least one amino acid mutation selected from the group consisting of R114W, V187A, V235L, T385P, L782V, Y900C, A1021G, K1118R, N2034D, E2238G, V2252A, L2266P, 12340T, A2500S, V2841A according to the H77 reference sequence with GenBank accession number AF009606. In a further example, the virus particle may be SA13 (GenBank accession no. F3393024.1). In an even further example, the virus particle may be as set forth in SEQ ID NO. 3 and SEQ ID NO. 4.

In a further embodiment, the virus particles are obtained from a high-titre cell culture. This may be determined in IU/ml (international units/ml) with Taq-Man Real-Time-PCR and infectious titers are determined with a focus forming unit assay.

The infectious titers are determined as TCID50/ml (median tissue culture infectious dose/ml) or FFU/ml (focus forming unites/ml); in such method, infectivity titers are determined by infection of cell culture replicates with serial dilutions of virus containing supernatants and, following immunostainings for HCV antigens, counting of HCV-antigen positive cell foci.

HCV RNA titers and infectivity titers can be determined extracellularly, in cell culture supernatant (given as IU and TCID50 or FFU per ml, respectively) or intracellularly, in lysates of pelleted cells (given as IU and TCID50 or FFU related to a the given cell number or culture plate wells, which was lysed).

In another embodiment, the high titer would be an HCV infectivity titer of at least $10^2$ FFU/ml or above following transfection and/or subsequent viral passage, such as a titer of at least $10^3$ FFU/ml, such as a titer of at least $10^4$ FFU/ml, such as a titer of at least $10^5$ FFU/ml, such as a titer of at least $10^6$ FFU/ml, such as a titer of at least $10^7$ FFU/ml, such as a titer of at least $10^8$ FFU/ml, such as a titer of at least $10^9$ FFU/ml or such as a titer of at least $10^{10}$ FFU/ml.

The virus particles may be obtained from cell cultures that are cultured under different culture conditions and in different culture settings in order to provide cell culture supernatants comprising the virus particles for step a) of the method.

In one embodiment, the cell culture is grown on optimized surfaces, in suspension, on beads, on microcarriers, on macrocarriers, in cell factories or bioreactors. Virus particles grown in serum free medium may have favorable density profiles. Thus, in one such embodiment, the cell culture is grown in a serum free medium.

In a further embodiment, the cell culture is grown in an adenovirus expression medium, optionally supplemented with penicillin 100 U/ml and streptomycin 100 μg/ml.

The cell cultures used for culturing the virus particles are commonly known by the persons skilled in the art. In one embodiment, the cell line is a hepatocyte cell line such as Huh7 or derived cell lines e.g. Huh7.5 or Huh7.5.1. In one embodiment, the cells in the cell culture are Huh7.5 cells.

In a further embodiment, the cell culture is any cell expressing the genes necessary for HCV infection and replication, such as but not limited to CD81, SR-BI, Claudin-1, -4, -6 or -9, occludin, and the low-density lipoprotein receptor.

Various methods for producing e.g. HCV particles are commonly known to the persons skilled in the art and as e.g. described in WO2013/139339, WO2015/058772, WO2016/066171 and WO2019/154472, the content of which is hereby incorporated by reference. These include culturing a host expression cell line transfected with HCV RNA under conditions that permit expression of HCV particle proteins; and isolating HCV particles or particle proteins from the cell culture.

The replication level of a virus may be determined using techniques known in the art, and in other embodiments, as exemplified herein. For example, the genome level can be determined using RT-PCR, and northern blot. To determine the level of a viral protein, one can use techniques including ELISA, immunoprecipitation, immunofluorescence, EIA, RIA, and Western blotting analysis.

Pharmaceutical Compositions/Use of Purified Virus Particles

The purified virus particles such as HCV particles from cell cultures may be used for the development or production of therapeutics and vaccines as well as for diagnostic purposes after being purified using the method according to the present invention.

A further aspect of the present invention relates to purified whole virus particles obtained from the methods as herein described. These purified whole virus particles may form a whole virus vaccine candidate stock, such as a whole virus vaccine inactivated candidate stock.

A still further aspect of the present invention relates to a pharmaceutical composition comprising the whole virus vaccine inactivated candidate stock as herein described formulated with one or more adjuvant(s), excipients and/or carriers.

Such pharmaceutical compositions are ideal for use in immunizing and vaccination. They will also be key in facilitating virological studies, and for vaccine development.

Adjuvants include, but are not limited to, complete Freund's adjuvant, incomplete Freund's adjuvant, saponin, mineral gels such as aluminum hydroxide, surface active substances such as lysolecithin, pluronicpolyols, polyanions, peptides, oil or hydrocarbon emulsions, keyhole limpet hemocyanins, dinitrophenol, and potentially useful human adjuvants such as BCG (bacilleCalmette-Guerin), Corynebacteriumparvmm, aluminum hydroxide, aluminum hydroxide+MPL, Addavax, MF59, CAF01, CAF04, CAF05 and CAF09, AS03, CpG, CpG 1018, Toll-like receptor agonists such as, but not limited to poly:IC, and Sigma adjuvant system.

Preferably, the adjuvant is pharmaceutically acceptable.

In a further aspect, the present invention relates to use of whole virus particles obtained by a method as described herein for preparation of a whole virus vaccine candidate stock and/or a pharmaceutical composition.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1—Materials and Methods

Huh7.5 Cell Culture

Huh7.5 cells were maintained in DMEM (Gibco™) with 10% fetal bovine serum (Sigma) and penicillin (100 U/mL)/streptomycin (100 μg/mL) (Sigma) and were incubated at 37° C. and 5% $CO_2$. Adenovirus Expression Medium (AEM) (Gibco™), supplemented with penicillin (100 U/mL) and streptomycin (100 μg/mL), was used for HCV production under serum-free conditions.

The percentage of HCV infected cells was evaluated by immunostainings (Scheel, T. K. H. et al. 2011). In brief, cells were seeded in a chamber slide (Thermo Fisher Scientific) for a confluent cell layer, fixed with acetone (Merck) the next day, and stained with primary antibody 9E10 diluted 1:3000 (Lindenbach, B. D. et al., 2005), followed by secondary antibody Alexa Flour 488 goat anti-mouse IgG diluted 1:500 (Invitrogen), and Hoechst 33342 (Molecular Probes) diluted 1:1000.

HCV-infectivity titres were determined with three technical replicates as FFU/mL in a cell-based assay in 96-well plates as described (Scheel, T. K. H. et al. 2011). The immunostaining of 96-well plates was carried out with primary antibody 9E10 diluted 1:5000, secondary antibody ECL Anti-mouse IgG Horseradish Peroxidase linked from sheep (Amersham Biosciences) diluted 1:500, and visualized with Pierce™ DAB Substrate Kit (Thermo Scientific). 96-well plates were imaged and automatically counted for FFU quantification.

Serial Passage for Generation of High-Titre Genotype La HCV

For the production of genotype 1a HCV, the cell culture infectious recombinant TNcc (Li, Y.-P. et al. 2012) (GenBank accession no.: JX993348) was further adapted to cell culture by serial passage in Huh7.5 cells. Following a transfection of HCV RNA transcripts, 18 viral passages to naïve cells were carried out in T80 cell culture flasks (Nunc). Naïve cells were inoculated with cell culture supernatant derived from the previous culture at the peak of infection according to immunostainings as described (Mathiesen, C. K. et al. 2015). A passage 19, virus seed stock was prepared in T500 triple-layer-flasks (NUNC™ TripleFlask™ Treated Cell Culture Flask); supernatants from two time points at the peak of infection were pooled.

Production of Genotype 1a and 5a HCV for DSP Development

For genotype 1a HCV, T175 flasks, seeded with $6\times10^6$ cells in DMEM on the previous day, were inoculated at a multiplicity of infection 0.003 with the passage 19 virus seed stock. Cultures were expanded to T500 triple-layer-flasks. When 80% of cells were estimated to be infected by immunostaining in a replicate T25 culture, the cultures were washed with PBS (Sigma) and subsequently maintained in AEM under serum-free conditions. The supernatant was harvested five times every 2-3 days, yielding 10.5 L, which was stored at ~80° C. until further processing.

For genotype 5a HCV (amino acid sequence—SEQ ID NO. 3; nucleotide sequence-SEQ ID NO. 4), $18\times10^6$ cells, seeded the previous day in DMEM, were infected at a multiplicity of infection 0.003 in T500 triple layer cell culture flasks with a 3rd passage seed stock of the further adapted SA13/JFH1 recombinant (Mathiesen, C. K. et al. 2015). The following day, cells were transferred to cell factories (NUNC™ Cell Factory™). When 80% of cells were expected to be infected as indicated by immunostaining in a replicate T25 culture, the cells were washed with PBS and cultured in AEM. The harvesting of the supernatant was carried out five times every 2-3 days, yielding 20.4 L total.

Sequence Analysis

NGS (next generation sequencing) of the virus populations was carried out as described (Jensen, S. B. et al. 2019). Briefly, RNA was extracted with Trizol LS and the RNA Clean & Concentrator™-5 (Zymo research) kit. The reverse transcription was carried out with Maxima H Minus Reverse Transcriptase (ThermoScientific), the whole open reading frame was amplified with PCR Q5® Hot start High-Fidelity DNA Polymerase (New England Biolabs), and the PCR product was purified (DNA Clean & Concentrator™-25 and Zymoclean™ Large Fragment DNA Recovery Kit, Zymo research). The NEBNext ultra II FS DNA Library Prep Kit was used for library preparation, and sequencing was performed with an Illumina Miseq platform.

The alignment of amino acid sequences of structural proteins (Core, envelope proteins E1 and E2) of 1a and 5a HCV was done in BLAST® (Altschul, S. F. et al. 1997, Altschul, S. F. et al. 2005).

Evaluation of Infectious HCV Stability at Alkaline pH Values

The HCV genotype 5a seed stock described above, was concentrated using Ultra-15 Centrifugal Filter Unit-100K (Amicon) and diluted by a factor 17 in PBS (for pH 7.4 reference), DMEM (standard cell culture medium, pH 8.5) or phosphate buffer ($KH_2PO_4$ (Sigma) and $K_2HPO_4$ (Sigma), adjusted with NaOH for pH values of 9.5, 10 and 11) in triplicate Eppendorf tubes, and incubated for 90 minutes at room temperature. After incubation, the virus/buffer solutions were diluted 1:40 in DMEM containing 20 mM HEPES (HEPES solution 1 M, Sigma), and added to triplicate wells seeded with $7\times10^3$ cells/well in 96-well poly-D lysine plates (Thermo Scientific) the previous day. The infected cell plates were incubated for six hours at 37° C. and 5% $CO_2$ before the medium was exchanged to DMEM without HEPES. The cell plates were fixed, stained, and evaluated as described above, in order to quantify HCV infected single cells. The cell viability was evaluated after the experimental read-out had been obtained in a replicate experiment with the CellTiter 96® AQueous One Solution Cell Proliferation Assay (Promega) according to the manufacturer's protocol. The pH effect on virus stability was evaluated as the number of HCV-positive cells in a well, relative to the average number of HCV-positive cells obtained from the virus incubated at a pH value of 7.4.

Virus Clarification, Ultrafiltration and Inactivation

The genotype 1a and 5a virus material was passed over 5 μm and 0.65 μm Sartopure® PP3 (Sartorius) capsule filters for a two-step clarification by peristaltic pumping (Masterflex L/S 7554-95 Cole-Parmer, Masterflex L/S Easy Load pump head, and Extended Lifetime Silicone Tubing size 17 (Repligen)). Subsequently, the clarified 1a and 5a viruses were concentrated 249 and 325 times, respectively, in two sequential ultrafiltration steps with hollow fibre filters (MINIKROS SAMPLER 65 CM 500K MPES 0.5 MM ¾TC×¾TC STERILE followed by MINIKROS SAMPLER 20 CM 500K MPES 0.5 MM ¾TC×¾TC STERILE, both Repligen). The HCV infectivity titres and RNA titres were determined for samples from each step of clarification and concentration. The virus recovery was calculated from the HCV RNA titres.

The virus was inactivated by UV exposure (UVP Handheld UV lamp, UVG-54 254 nm in lamp stand) in 6-well plates (Nunc™) with 1.5-2.5 mL per well for eight hours. The E-well plate was kept on ice with frequent agitation. To confirm inactivation, naïve Huh7.5 cells were seeded in triplicate T25 flasks ($1\times10^6$ cells/flask) the previous day, and inoculated with 20 μL of UV-treated material. Inoculated cultures were passaged for 21 days and monitored for HCV positive cells by immunostaining as described above. In replicate samples, it was confirmed that a similar incubation without UV irradiation did not inactivate HCV.

Nuclease Treatment

The nuclease treatment was performed in triplicates for both genotypes. The clarified virus was subjected to 250 U/mL Benzonase® nuclease (Merck) at a final concentration of 2 mM $MgCl_2$. The incubation was done overnight at 4° C., and the nuclease activity was blocked afterwards, using a final concentration of 5 mM EDTA. Subsequently, the chromatography was performed, using nuclease—digested, clarified HCV.

Chromatographic Purification

The chromatographic experiments were done with an Akta Pure 25 system, operated by the Unicorn 7 software (GE Healthcare Life Sciences). Online monitoring was done by system-integrated UV (280 nm) and conductivity detectors, and additionally light-scattering was detected with a Nano DLS Particle Size Analyzer (Brookhaven Instruments). All chromatographic experiments were done in technical triplicates, unless stated otherwise.

Virus Capture Using SXC

SXC was performed using regenerated cellulose membranes with 1 μm pore size (Whatman), as previously reported (Lothert, K. et al. 2019). In brief, for preparing the column, 10 membranes were punched and stacked into a 13 mm filter holder (Pall), yielding a total membrane area of 13.3 cm². All steps were performed at a flow rate of 2 mL/min. The stack was equilibrated using 5-10 mL of 20 mM Tris at the specified pH value, supplemented with 180 mM NaCl, and 8% PEG 6000. Clarified, concentrated, and inactivated HCV was mixed 1:4 with the above stated buffer and supplemented with 32% PEG to yield final concentrations of 8% PEG to match the equilibration conditions. After sample application, the stack was washed with equilibration buffer until the detector signals decreased to baseline (>5 mL). Elution was achieved using 20 mM Tris at pH 7.4 without PEG, but supplemented with 0.4 M NaCl. Initial screening SXC runs were tested at pH 7.4 to pH 11 for genotype 1a HCV, while final process conditions were at pH 9, and tested for robustness at pH 8.5 and 9.5. Following optimization, the SXC performance was verified for the genotype 5a HCV at pH 9 with a preceding nuclease treatment.

Virus Polishing Using SCMA

Sartobind® Sulphated Cellulose membranes with a nominal pore size of 0.8 µm (Sartorius Stedim Biotech GmbH) were punched to disks of 13 mm diameter. As for SXC, the disks were stacked to layers of 10 membranes (13.3 cm² total membrane area). All steps were performed at a flow rate of 0.8 mL/min. Membranes were equilibrated using 20 mM Tris pH 7.4 prior to sample application. For the purification, SXC elution fractions were diluted 1:10 with equilibration buffer in order to reduce the conductivity of the solution below 5 mS/cm. After complete sample loading, the membranes were washed with equilibration buffer until UV- and light scattering signals returned to baseline. Bound components were subsequently eluted in three fractions, using increasing NaCl concentrations (0.6, 1.2 and 2 M). The SCMA was evaluated for genotype 1a HCV, using SXC elutions with and without an interim storage at ~80° C., as well as with and without additional nuclease treatment before SXC. Finally, the SCMA performance was confirmed, using a nuclease-treated and SXC-purified genotype 5a HCV.

Determination of Dynamic Binding Capacities

For SXC and SCMA, the DBC (dynamic binding capacities) was determined in order to optimize the virus load on the membrane stacks. Stationary and mobile phase compositions were the same as described above. A clarified, concentrated, and inactivated virus feed of a known concentration was prepared and applied to the column, until detected breakthrough of 10% and 100% of the particles, based on the evaluation of the light-scattering detector signal. Depending on the loaded volume, the total amount of virus particles, at which breakthrough rates of 10% or 100% ($DBC_{10}$ and $DBC_{100}$) occurred, was calculated and related to the area of the membrane. All process runs were performed at or below $DBC_{10}$.

HCV Quantification

The virus amount was evaluated using an in-house quantitative polymerase chain reaction as described previously, with minor modifications (Mathiesen, C. K. et al. 2014). Briefly, viral RNA was extracted from 200 µL sample and eluted in 50 µL water, using the High Pure Viral Nucleic Acid Kit (Roche) according to the manufacturer's instructions. Afterwards, a mixture comprising TaqMan® Fast Virus 1-step Mastermix (Thermo Fisher Scientific), nuclease-free water, probe (5' FAM-CCTTGTGGTACTGCCTGA-MGB 3'; SEQ ID NO. 5 containing a FAM dye and an MGB quencher) and primers (Forward: 5' AGYGTTGGGTYGCGAAAG 3' [SEQ ID NO. 6]; Reverse: 5' CACTCGCAAGCRCCCT 3' [SEQ ID NO. 7]; Sigma-Aldrich) was prepared. 12 µL of that mixture were added to 8 µL of the extracted RNA in a 96-well PCR plate (Twin.tec®, Eppendorf) preparing duplicates for each sample. The amplification was done using a Mastercycler Ep gradient S realplex (Eppendorf) after a pre-incubation period at 50° C. for 300 s. A total of 53 cycles of 95° C. for 20 s, followed by 62° C. for 60 s, were performed. An HCV standard panel, containing $10^2$ to $10^6$ IU/mL in 1-log increments, was prepared and included in each run, in addition to negative control samples. HCV RNA titres (IU/mL) were calculated using a standard curve generated from values obtained for the standard panel and corresponding cycle threshold values. The standard deviation of triplicate measurements was below 20%.

Protein Determination

For a quantification of the total protein amount contained in the chromatographic samples, the Pierce™ BCA Protein Assay Kit (Thermo Fisher Scientific) was applied according to the manufacturer's instructions. In brief, 25 µL of sample were transferred into a clear 96-well plate; duplicates were prepared for each sample. The standard panel (in the range of 25 to 2000 µg/mL) was prepared from gamma globulin according to the manufacturer's instructions. To each well, 200 µL of the reaction mix were added, and absorbance at 562 nm was measured after 30 min of incubation at 37° C. using the Cytation 3 plate reader (BioTek). The values obtained from a blank sample (buffer) were subtracted before interpolating the sample concentrations. Results given are from duplicate measurements with less than 10% standard deviation.

DNA Determination

The total amount of double stranded DNA (referred to as "DNA" in this work) was determined, using the Quant-iT™ PicoGreen® dsDNA Kit according to the manufacturers' instructions. The assay was performed in a 96-well format, using black microtiter plates (Nunc). Chromatographic samples, including the feed, were mixed 1:4 (S×C samples) or 1:2 (SCMA samples) with the assay's 1× TE buffer to a final volume of 100 µL. For each plate, blank samples (buffer) and two standard panels were prepared from kit-contained lambda-DNA in the range of 1 to 1000 ng/mL and 0.025 to 25 ng/mL, using a tenfold dilution series. After adding 100 µL of the reaction dye, the plate was incubated for 5 min in the dark, and a fluorescence emission at 520 nm (excitation: 485 nm) was subsequently determined, using the Cytation 3 plate reader (BioTek). All measurements were done in duplicates with a general standard deviation of less than 10%.

Ultracentrifugation-Based Downstream Process

This process is performed as described in U.S. Pat. No. 10,258,687 B2, which is hereby incorporated by reference, with a slight modification of introducing one additional filtration step upstream of the ultracentrifugation. In general, ~16 L cell factory supernatants were clarified on Sartopure® PP3 filters with a pore size of 5 µM and 0.65 µM (Sartorius). Pooled supernatants were subjected to two ultrafiltration steps using mPES hollow fiber filters with a surface area (SA) of 2600 cm² and molecular weight cut off (MWCO) of 500 kD followed by a fiber with SA of 790 cm² and MWCO of 500 kD (Repligen) to yield a total volume of ~30 mL.

For the subsequent 3-cushion ultracentrifugation (UC), 1 mL of undiluted Optiprep™ Density Gradient Medium (60%) (Sigma) was layered in a Beckman centrifuge tube (Beckman Coulter). Optiprep™ dilutions of 28% and 12% were made in phosphate buffered saline (PBS) (Sigma) and 1 mL of each was added to the tube sequentially.

Approximately 6 mL clarified and concentrated HCV-containing supernatant and PBS to a total volume of 11 mL were layered on top of the dilutions in each of 6 tubes and centrifuged in a Beckman XL-70 ultracentrifuge at 4° C. for 2 h at 40,000 rpm in a SW-41 rotor (Beckman Coulter).

Three fractions (F) of ~8 mL (F1), ~1.5 mL (F2) and ~1.5 mL (F3) were collected from the top of each tube. Fraction 2 from 6 tubes were pooled to ~9.5 mL, diluted in PBS to a total volume of 20 mL and subjected to cross flow filtration on a fiber with SA of 20 cm$^2$ and MWCO of 500 kD (Repligen), resulting in a volume of ~1.5 mL. For gradient UC, Optiprep™ dilutions of 40%, 30%, 20% and 10% in PBS were made and a semi-continuous gradient was prepared by sequentially adding 2.5 mL of each dilution to a tube followed by upright incubation overnight at 4° C.

Approximately 1.5 mL of HCV-containing material resulting from the previous step was loaded on top of the gradient in one tube and centrifuged for 6 h as described above. Eighteen fractions of ~550 µL were eluted from the bottom of the tube and ~400 µL of each fraction were weighed to determine fraction density. Three fractions with densities of ~1.1 g/mL were selected and pooled.

Sephadex G-100 (Sigma Aldrich), swelled with sterile water three days earlier was added to a chromatography column (PD-10 reservoirs, GE Healthcare Life Sciences). HCV-containing material from gradient UC was added to the top of the column and allowed to enter before 12 fractions of 1 mL were eluted from the bottom of the column in NaCl (9 mg/mL), of which 5 fractions were selected based on OD (230 nM) measurement using a NanoDrop (Thermo Scientific) and pooled. The 5 mL pool was UV-irradiated by exposing ~1.5 mL per well of a 6-well plate to a UVG-54 Handheld UV lamp (254 nm UV, 6 watt) (Analytik Jena) for 25 min.

Example 2—Production of High-Titre Genotype La Virus Stock for DSP Development

Aim

To produce a high-titre cell culture with infectious viruses in order to facilitate DSP development.

Results

The previously reported recombinant genotype 1a virus TNcc (Li, Y.-P. et al. 2012) was serially passaged in naïve human hepatoma cell line 7.5 (Huh7.5) cells for a further adaptation to the cell culture, until HCV infectivity titres of ~6 log$_{10}$, focus forming units (FFU)/mL, were observed for several passages.

A passage 19 stock was prepared, serving as the seed for the genotype 1a passage 20 virus production in triple-layer culture flasks, which was then used in the DSP development.

Next generation sequencing (NGS) revealed that, in addition to the eight cell-culture adaptive substitutions in the original 1a virus, passage 20 viruses had acquired 3 substitutions present in >50% of the virus population, G1909A in NS4B as well as N2651H and H2986R in NSSB (Table 1).

Conclusion

High-titre infectious genotype 1a viruses were successfully produced in cell culture at least partly due to acquisition of further adaptive mutations resulting in a heterogeneous population of viruses. The largest heterogeneity was observed in the non-structural proteins, which are not believed to be incorporated in the HCV particle.

Example 3—HCV Clarification and Ultrafiltration

Aim

To establish clarification and ultrafiltration as well as inactivation and to monitor virus recovery.

Results

A two-step filtration, with cut-offs of 5 μm and 0.65 μm, was selected for the clarification of genotype 1a HCV. Subsequently, the material was concentrated in two sequential ultrafiltration steps with a cut-off of 500 kDa from a starting volume of 10.5 L to volumes of 600 mL and 42 mL, respectively.

We observed a virtually complete virus recovery for the clarification and the first ultrafiltration step, whereas a 45% recovery was observed for the second ultrafiltration step (data not shown).

For inactivation, the resulting material was treated by UV irradiation, and naïve cell cultures were inoculated and followed for three weeks by regular immunostainings for the HCV NS5A antigen to confirm inactivation.

Conclusion

The two steps of clarification along with the first step of ultrafiltration resulted in an almost complete virus recovery. However, the second step of ultrafiltration resulted in depletion of 55% of the viruses from the sample. It should be noted that 55% is in the lower range of recoveries observed using ultrafiltration in other experiments. Thus, mean recovery of seven ultrafiltrations with the larger fibre was 86% and the mean recovery of eight ultrafiltrations with the smaller fibre was 77%.

Inactivation of the virus using UV irradiation resulted in virtually complete inactivation of the HCV viruses.

Example 4—HCV Capture by SXC

Aim

To study the ability of SXC to capture HCV including studying factors influencing the purity of the obtained sample as well as the recovery rate.

Results

In initial SXC experiments, using standard conditions with 8% PEG and physiological pH values, the majority of the viruses were found in the flow-through fraction, and an increase in the PEG concentration to up to 12% did not result in improvements.

We hypothesized that the isoelectric point (pI) of HCV was alkaline. Thus, prior to testing alkaline SXC conditions, we investigated HCV stability at different pH values. HCV was incubated in phosphate-buffered saline (PBS, pH 7.4), Dulbecco's Modified Eagle Medium (DMEM, standard cell culture medium, pH 8.5), and phosphate buffers for final pH values of ~9.5, 10 and 11, prior to inoculation of naïve Huh7.5 cells for the determination of HCV infectivity.

Of note, the tested conditions did not result in an impairment of cell viability. HCV was stable when subjected to pH values of up to 10 for 90 minutes (FIG. 1), which equals the approximate duration of the SXC.

Testing alkaline SXC conditions revealed a large virus breakthrough at pH 8 and 10 during loading (FIG. 2A,C) based on light-scattering detection. At pH 11 a strongly increasing back pressure was observed with increasing loading volume during sample application and wash (FIG. 2D). This resulted in a reduced virus breakthrough, a decreased possible loading volume, and nearly no virus recovery in any of the fractions. In contrast, at pH 9, the virus breakthrough was minimized (FIG. 2B).

Figure 3:
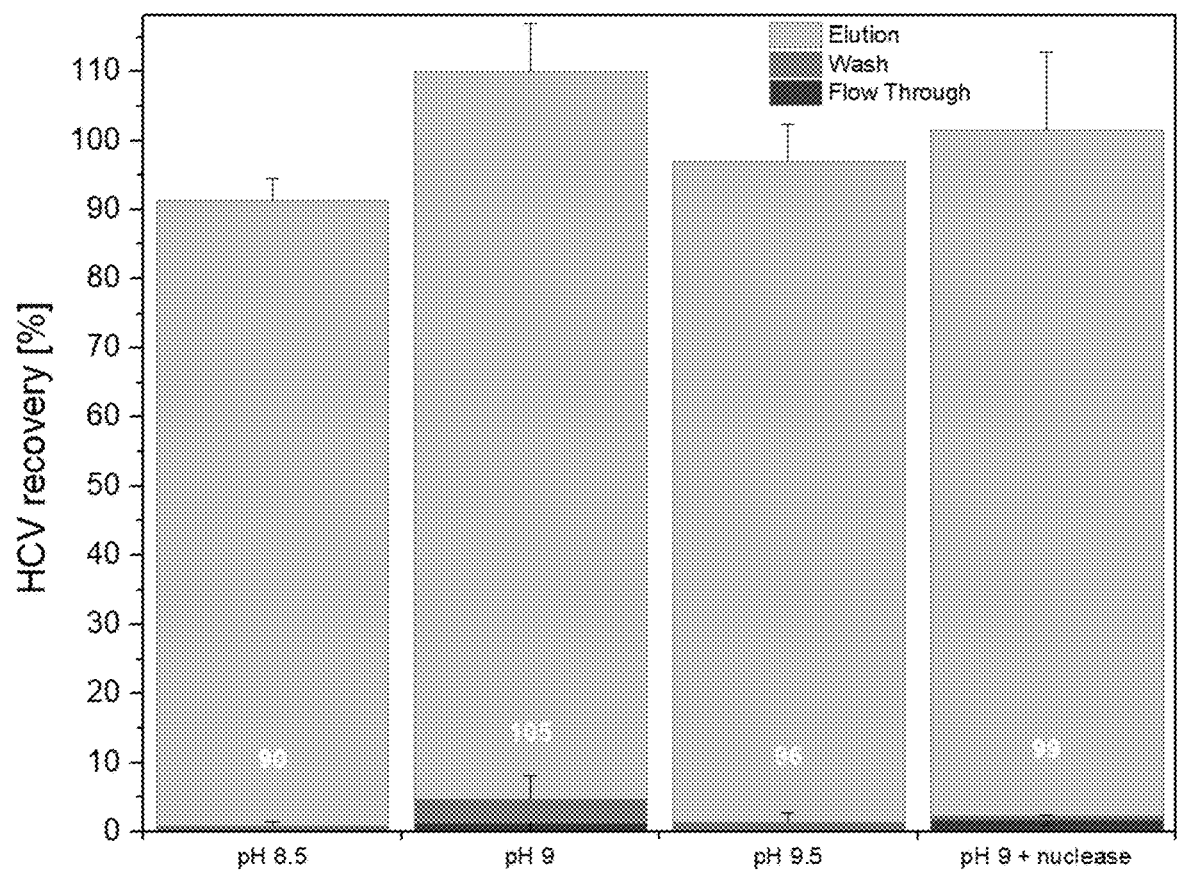
FIG. 3 shows SXC HCV recoveries for different process conditions. Recovery was calculated by relating amounts of genotype 1a HCV RNA in flow through, wash and elution fractions to the total RNA amount in the feed prior to SXC. Variations included changes in the process pH and additional nuclease digestion prior to SXC. Values are means of technical triplicates with error bars reflecting SD.

In an additional experiment, the qualitative data, based on the light-scattering signal, was verified by quantitative polymerase chain reaction (qPCR) analytics of the recovered viral RNA. Here, at pH 8.5, 9, and 9.5, a virtually full virus retention and recovery in the elution fraction could be achieved, with a product yield in the range of 90% to $10^5$% (FIG. 3, Table 2). An additional nuclease treatment did not affect the SXC and resulted in similar yields of 99% (FIG. 3, Table 2) with minor amounts of virus found in the flow-through (2%) and wash (<1%) fractions.

The dynamic binding capacity (DBC) of the membranes was determined using 3.9E+08 international units (IU)/cm$^2$ until a pressure limitation occurred and was approximately 2.1E+08 IU/cm$^2$ until a 10% breakthrough was observed ($DBC_{10}$%). However, due to an excessive pressure increase, it was not possible to load the virus until a 100% breakthrough occurred, thus $DBC_{100}$% could not be determined.

Figure 4:
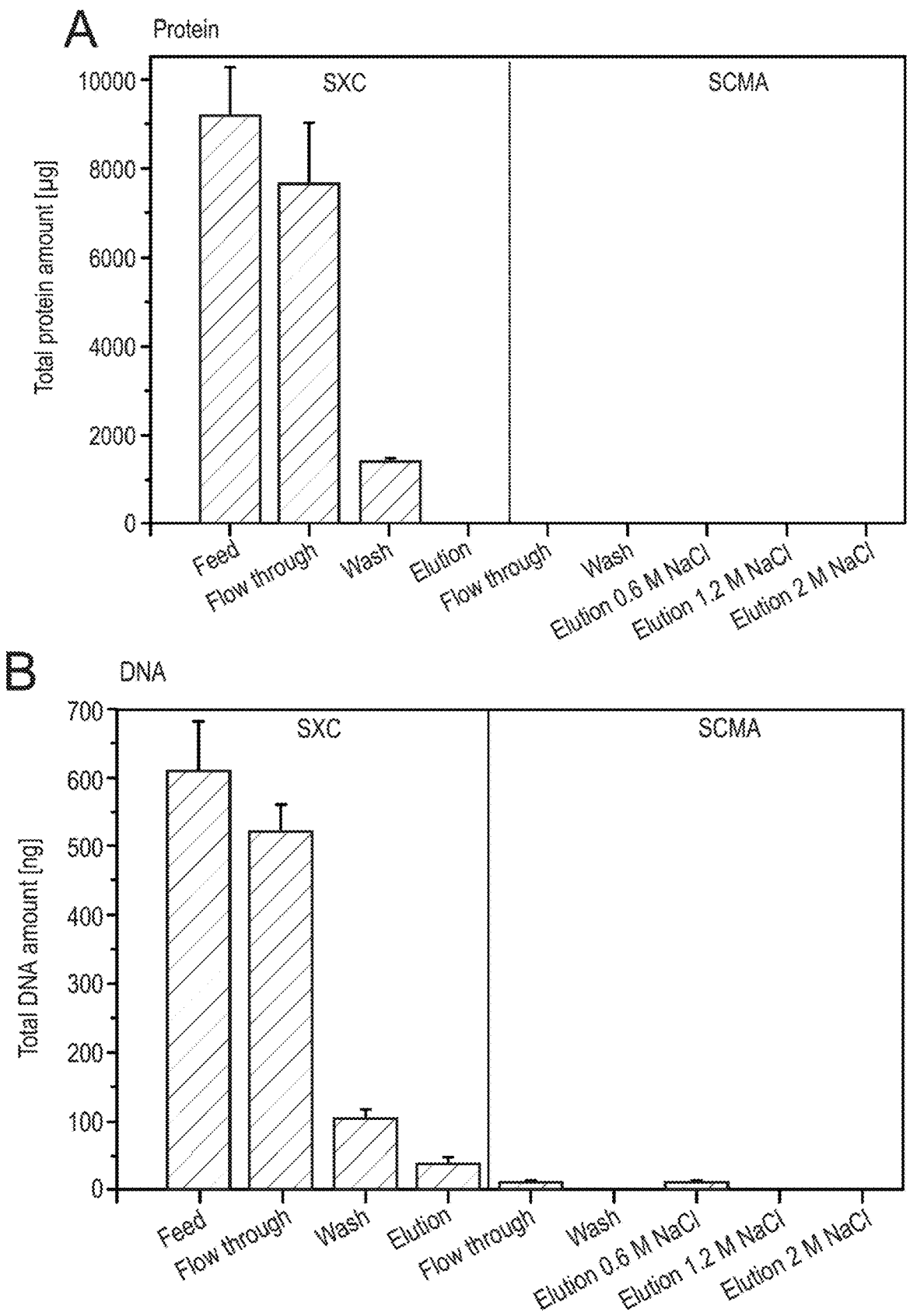
FIG. 4 shows impurity removal during SXC and SCMA with preceding nuclease treatment. Shown is (A) the total amount of protein and (B) DNA in individual fractions resulting from SXC (pH 9) of nuclease treated 1a HCV (material shown in FIG. 3) and consecutive SCMA. In the cases where no bars are visible, protein and DNA amounts were below the limit of detection of the assay.

The impurity removal did not depend on the pH value. For the runs without a preceding nuclease treatment as shown in FIG. 3 (pH 8.5, 9 and 9.5), the protein depletion was above 99% and the DNA depletion was at 84% (data for pH 9 shown in Table 2, other data not shown). The additional nuclease digestion, followed by SXC at pH 9, did not affect the protein depletion, which was above 99% (FIG. 4A, Table 2), but resulted in an increased DNA depletion of 94%, and DNA concentrations of 9 ng/mL at viral RNA titres of 9.3E+07 IU/mL after SXC (FIG. 4B, Table 2).

Conclusion

HCV may be purified by SXC having a high degree of recovery. In particular, a pH in the range of 8-10 appeared to result in a good recovery rate. Importantly the HCV virus particle was able to remain stable for the duration of the SXC under these alkaline conditions.

For SXC, the initial application of published process conditions (Marichal-Gallardo, P. et al. 2017) did not result in a successful virus retention. It was previously described, that the SXC performance is optimal at pH conditions near the pI (Lee, J. et al. 2012). For HCV, no characterization of the pI of the complete virus has been published so far. Testing alkaline pH conditions, we defined a small operating window for an optimal SXC performance at pH 9±0.5.

For HCV, the intense pressure increase observed during SXC at pH 11 suggested severe membrane fouling, resulting in a nearly complete virus retention, which hampers elution. This might be caused by the precipitation of proteins, medium components, or virus particles under these conditions. The pressure increase during DBC determination may be due to the possible aggregation potential of the virus, leading to increased membrane fouling for higher loading volumes. It is not likely, that an increased pore blockage is caused by protein impurities, as these are mostly washed out during sample application, with mainly virus particles remaining on the column. On a process scale, the pressure limitations might be additionally reduced as well as the binding capacity increased by using a different type of membrane housing, offering an altered angle of the incident flow.

Treatment with nuclease prior to the SXC run did not affect the protein depletion but increased the DNA depletion.

Accordingly, SXC may be used for purification of virus particles such as HCV with high recovery rates.

Example 5—HCV Polishing by SCMA Chromatography

Aim

To study the effect of further purifying the SXC elution obtained in Example 4 by means of SCMA chromatography.

Results

The SXC elutions, resulting from the SXC experiments done at pH 9 without and with preceding nuclease treatment (FIG. 3), were further processed using SCMA.

Figure 5:
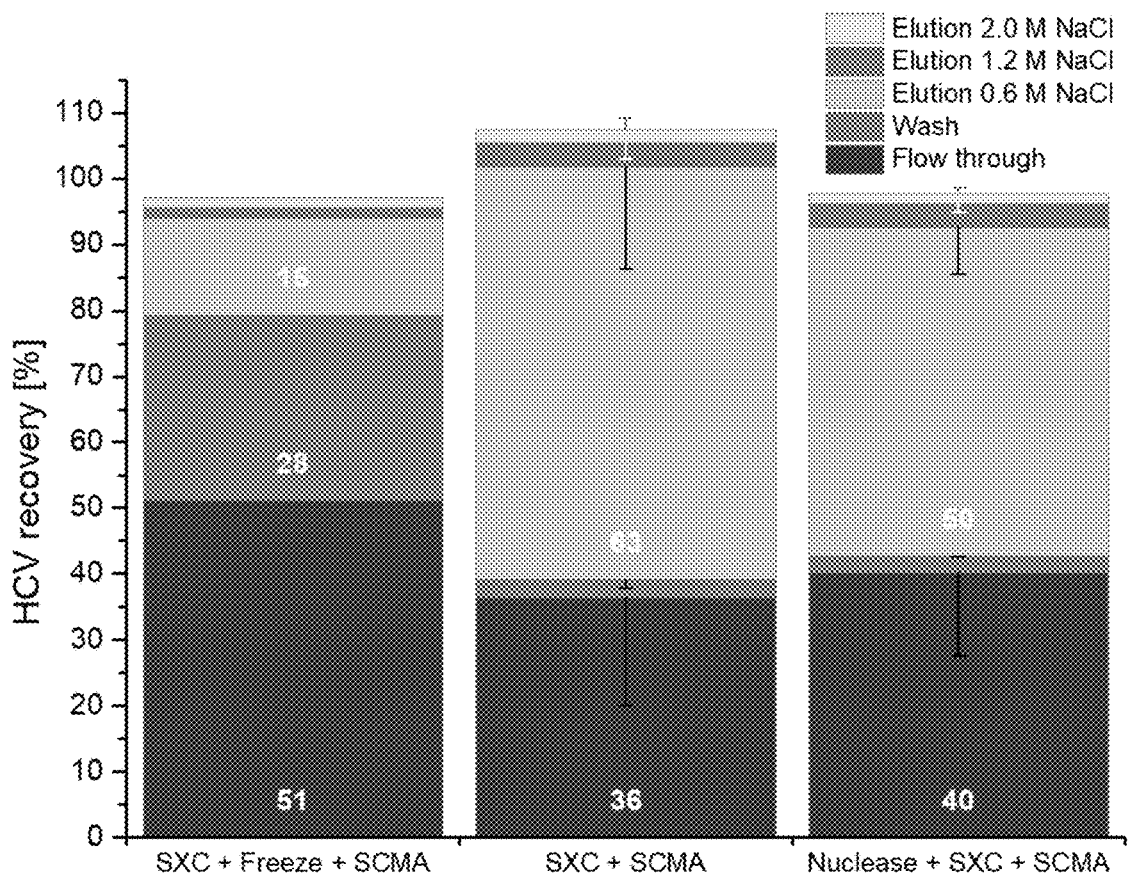
FIG. 5 shows SCMA HCV recoveries for different process conditions. Recovery was calculated by relating amounts of genotype 1a HCV RNA in flow through, wash and elutions at 0.6, 1.2, and 2.0 M NaCl to the total RNA amount prior to SCMA. All preceding SXC runs were performed at pH 9 (eluate fractions of FIG. 3), without nuclease treatment prior to SXC (left and middle bar), including intermediate freezing (left bar) and with nuclease treatment preceding SXC (right bar). Bar captions state the order, in which steps were performed. Error values are means of technical triplicates with error bars reflecting SD.

Following SXC without a preceding nuclease treatment, the HCV recovery was 63% in the 0.6 M NaCl elution fraction, if the SXC elution was directly processed without an additional freeze-thaw cycle (FIG. 5).

A storage at ~80° C. in between the SXC and SCMA led to a reduction of retained and eluted viruses to 15%, with the majority of viruses found in the flow-through and wash fractions.

The implementation of an additional nuclease treatment prior to SXC resulted in a virus recovery of 50% in the 0.6 M NaCl elution fraction. Minor amounts of virus eluted at higher salt concentrations of 1.2 and 2M NaCl (FIG. 5), whereas 42% of the loaded virus was found in the flow-through and wash fractions.

Due to a breakthrough of about 40-50% of the virus, $DBC_{10}$% and $DBC_{100}$% could not be reached. However, the sample application was not limited by binding capacity, but by pressure, as the pressure after an application of ~5.9E+09 IU/cm$^2$ exceeded the limits.

Considering the removal of impurities, no proteins could be detected in any of the SCMA fractions (flow-through, wash, elution/-s) obtained following SXC (pH 9) without or with preceding nuclease treatment, indicating a protein content below the assays' limit of detection (<25 µg/mL) and hence a virtually complete protein depletion (FIG. 4A for nuclease treatment+SXC (pH 9)+SCMA; Table 2 for both datasets). The overall DNA depletion was 90% following SXC (pH 9) and SCMA without a preceding nuclease treatment compared to the initial feed concentration before SXC (Table 2). The introduction of a nuclease digestion followed by SXC (pH 9) and SCMA resulted in an increased DNA depletion of above 99% compared to the initial feed concentration before nuclease treatment and SXC, leading to DNA concentrations of about 2 ng/mL at viral RNA titres of 3.5E+07 IU/mL (FIG. 4B, Table 2).

Conclusion

The DSP developed in this study consisted of clarification, ultrafiltration, nuclease treatment, and SXC and SCMA steps. While filtration-based clarification and concentration are commonly used initial process steps for the production of viral vaccines, a major rationale for using SXC for the virus capture was the predominant dependency on the size of the target species (Lee, J. et al. 2012). This promised an independence with regard to the specific HCV genotype and the robust depletion of smaller impurities. SCMA was selected for virus polishing, based on the heparin affinity of HCV (Fortuna, A. R. et al. 2019). Another benefit of the chosen methodology is the possibility to directly load the SXC eluent to the SCMA—if necessary by an inline dilution.

Our data highlights the importance of avoiding a freeze-thaw cycle in a SXC elution buffer preceding SCMA, which resulted in a large decrease in recovery, possibly due to a degradation of HCV particles, or changes in the surface protein composition or structure. Although in general storage times using freeze-thaw cycles are unusual during a production process, this information may support similar trials in other laboratories.

With regard to virus recovery, no significant differences (according to a students' T-test, data not shown) were observed for samples that had been subjected to a nuclease treatment+SXC prior to SCMA (50% for 1a HCV) compared to samples that had been processed by SXC only prior to SCMA (63% for 1a HCV), with respect to the analytical error. Thus, SCMA appeared to be unaffected by a preceding nuclease treatment and independent of the virus genotype.

We observed a highly efficient protein depletion. Within the analytical error, a virtually full protein depletion could be achieved by SXC, with a protein removal of >99% for 1a HCV. Following SCMA for 5a HCV, protein levels were below the detection limit. The absence of protein in the SCMA flow-through and wash fractions may be caused by the sample dilution preceding the SCMA.

A comparable DNA depletion of at least 98% was achieved following a nuclease treatment, SXC, and SCMA. Of this overall DNA depletion, 5-12% were achieved by SCMA, whereas the nuclease treatment allowed an additional removal of about 10% of the total DNA. Most likely, the remaining DNA represents fragments attached to the virus as described above, or DNA being co-eluted with the virus particles using 0.6 M NaCl as SCMA elution buffer. For the latter, a further optimization of the SCMA procedure, including the evaluation of the virus elution using buffers with lower conductivity, is conceivable.

Accordingly, it is shown that this method of purification results in a high recovery of virus particles together with a low level of impurities.

Example 6—the Developed DSP was Equally Efficient for Different HCV Genotypes

Aim

To investigate the applicability of the developed DSP for different HCV isolates, we applied this strategy to a high-titre cell culture-derived genotype 5a virus.

Results

The 5a virus differs with structural proteins differing in ~20% and envelope proteins differing in ~26% from the genotype 1a virus on the amino acid level.

The 5a virus was produced in cell factories; NGS showed that, in comparison to the published sequence, no additional substitutions were present in >2% of the viral population.

Clarification and ultrafiltration were carried out as for the 1a virus, with a volume reduction from 20.4 L to 420 mL and 63 mL in the first and second ultrafiltration, respectively. During clarification and the first ultrafiltration, we observed a virtually complete virus recovery, whereas an 87% recovery was observed for the second ultrafiltration step. The resulting 5a material was UV-irradiated and the inactivation was confirmed as described for the 1a material.

With a preceding nuclease digestion, the SXC virus recovery was 97% (FIG. 6A, Table 2). During the SXC, the $DBC_{10}$% was determined with 9.8E+07 $IU/cm^2$ and a sample application was pressure-limited at about 2.7E+08 $IU/cm^2$.

SCMA was carried out directly after SXC and resulted in a virus recovery of 49% in the 0.6 M NaCl elution fraction, whereas 47% of the applied virus was lost in the flow-through (FIG. 6B, Table 2). As for the 1a virus, $DBC_{10}$% or $DBC_{100}$% could not be determined during SCMA.

The whole process led to a complete protein removal with a protein depletion of 97% after SXC as well as undetectable protein levels in the SCMA fractions (FIG. 6A,C, Table 2). The DNA depletion was 86% after SXC and 98% after SCMA compared to the initial feed concentration before nuclease treatment and SXC (FIG. 6A,B,D, Table 2). In the SCMA eluate, the DNA concentration was 3 ng/mL at viral RNA titres of 3.2E+07 IU/mL (FIG. 6B,D, Table 2).

Conclusion

Importantly, the described DSP showed a similar performance for two major HCV genotypes (1a and 5a), facilitating the development of vaccines targeting different HCV genotypes.

With regard to virus recovery, no significant differences (according to a students' T-test, data not shown) were observed for samples that had been subjected to a nuclease treatment+SXC prior to SCMA (49% for 5a HCV) compared to samples that had been processed by SXC only prior to SCMA, with respect to the analytical error. Thus, SCMA appeared to be unaffected by a preceding nuclease treatment and independent of the virus genotype.

We observed a highly efficient protein depletion. Within the analytical error, a virtually full protein depletion could be achieved by SXC, with a protein removal of 3% of the remaining proteins in the SXC elution for 5a HCV. Following SCMA for 5a HCV, protein levels were below the detection limit. The absence of protein in the SCMA flow-through and wash fractions may be caused by the sample dilution preceding the SCMA. Since the SCMA elution resulted in a sample concentration, the absence of proteins in the final 5a HCV product suggested a successful depletion of the remaining proteins during SCMA.

Additionally, it should be mentioned, that not the entire DNA amount in the SCMA feed could be recovered in the subsequent fractions. This might be caused by the remaining DNA on the column, and by an inhomogeneous error distribution between the varying salt concentrations.

The DSP may not only be used for successful recovery of genotype 1a but also results in successful recovery of HCV genotype 5a.

Example 7—Comparison of a Chromatography-Based DSP to an Ultracentrifugation-Based Downstream Process Aim To study the efficiency of the method according to the present invention as compared to ultracentrifugation-based downstream processes (DSP) as commonly used in the technical area.

Results

The method according to the present invention (chromatography-based) was performed as described in the materials and methods section as described in Example 1 for HCV genotype 5a.

The results of several experiments demonstrated that the chromatography-based techniques according to the present invention in general showed the following recovery percentage:

Chromatography-Based Technique According to the Present Invention:
- i. Clarification ~100% recovery
- ii. Ultrafiltration ~50-100% recovery (mean recovery of 7 experiments employing large followed by small hollow fiber was 70%)
- iii. SXC ~100% recovery
- iv. SCMA ~50-60% recovery Steps downstream of clarification and ultrafiltration (step iii and iv) resulted in a ~50% total recovery.

The ultracentrifugation-based downstream process was performed on HCV genotype 5a as described in Example 1.

Figure 7:
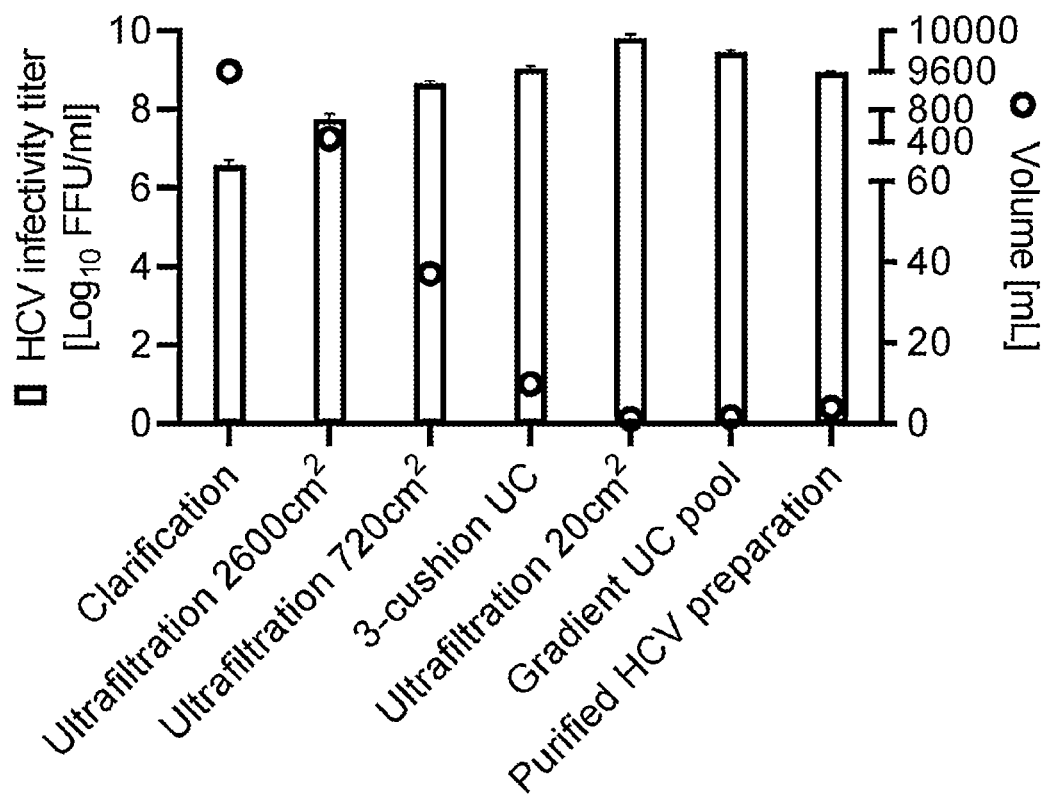
FIG. 7 shows a representative example of an ultracentrifugation-based technique for comparison to the DSP according to the present invention. Process steps are indicated on the x-axis. Left y-axis: HCV infectivity titers of samples resulting from the indicated process steps. Right y-axis: Volume of sample resulting from the indicated process steps.

FIG. 7 shows a representative example of the results of HCV infectivity titers and sample volumes from specified process steps of an ultracentrifugation-based technique for comparison to the present invention.

The ultracentrifugation-based technique includes clarification (FIG. 7: Clarification) and concentration by ultrafiltration with a large and smaller hollow fiber filter (FIG. 7: Ultrafiltration 2600 cm$^2$ and Ultrafiltration 720 cm$^2$) using a starting volume of 9.6 L HCV containing cell culture supernatant. 37 mL concentrated virus was passed to the first ultracentrifugation step with 3 cushions of different iodixanol concentrations (60, 28 and 12%) and three fractions were collected. Fraction 2 (FIG. 7: 3-cushion UC) consisting of 9.9 ml with an HCV infectivity titer of 9 log$_{10}$ FFU/mL was further processed in a buffer exchange step by ultrafiltration using a 20 cm$^2$ hollow fiber filter (FIG. 7: Ultrafiltration 20 cm$^2$). The second ultracentrifugation using a 10-40% iodixanol gradient yielded 18 fractions, 3 fractions were selected based on buoyant density and pooled; this ~1.6 mL pool had a titer of 9.5 log$_{10}$ FFU/mL (FIG. 7: Gradient UC pool).

Iodixanol was removed by sephadex chromatography resulting in 12 fractions. Five fractions were selected based on optical density and pooled; this pool hada titer of 8.9 log$_{10}$ FFU/mL (FIG. 7: Purified HCV preparation). This purified HCV preparation was UV-inactivated for a final ~4 mL preparation of purified inactivated HCV.

The results of several experiments demonstrated that the ultracentrifugation-based technique in general showed the following recovery percentage:

Ultracentrifugation-Based Technique:
- i. Clarification ~100% recovery
- ii. Ultrafiltration filtration ~50-100% recovery (mean recovery of 7 experiments employing large followed by small hollow fiber was 70%)
- iii. Ultracentrifugation ~31-64% recovery (mean recovery of 3 experiments was 49%)
- iv. Small-scale ultrafiltration ~71-100% recovery (mean recovery of 3 experiments was 94%)
- v. Ultracentrifugation ~21-100% recovery (mean recovery of 3 experiments was 75%)
- vi. Sephadex chromatography ~45-100% recovery (mean recovery of 3 experiments was 78%)

Steps downstream of clarification and ultrafiltration (steps iii to vi) resulted in a ~6-39% total recovery (mean recovery of 3 experiments was 22%).

Furthermore, the chromatography-based technique allows a scalable set-up, an improved recovery and real-time monitoring during process steps. In contrast, the ultracentrifugation-based technique is not easily scalable, shows large variation in recovery and has a delayed monitoring read-out.

Additionally, the contamination of the products obtained by the two processes were measured as described under Example 1. These results show that for the 5a HCV the ultracentrifugation-based technique resulted in residual contaminant levels of 400-500 μg (protein) and 150-250 ng (DNA) compared to 1E+08 viruses (RNA titer). The chromatography-based technique resulted for the 5a HCV in a complete protein removal (<20 μg/ml, being the lower limit of detection) and remaining DNA levels of 9 ng compared to 1E+08 viruses.

Conclusion

This comparison between the techniques demonstrates the advantages in recovery rates of the new chromatography-based technique as compared to the ultracentrifugation-based technique. Thus, the chromatography based technique is superior the ultracentrifugation-based technique.

In addition, the ultracentrifugation-based technique showed high variability.

TABLE 1

| Protein | Core | E2 | E2 | NS2 | NS2 | NS2 | NS2 | NS4B | NS4B | NS5A | NS5A |
|---|---|---|---|---|---|---|---|---|---|---|---|
| Nucleotide position | 373 | 1571 | 2464 | 2822 | 2824 | 2935 | 3364 | 5812 | 6067 | 6729 | 7296 |
| Original nucleotide | C | C | G | G | C | A | G | G | G | C | C |
| Acquired nucleotide | A | G | A | A | T | C | A | A | C | A | T |
| Allele frequency (%) | 44 | 46 | 22 | 29 | 21 | 26 | 48 | 27 | 75 | 45 | 28 |
| Amino acid change | T11N | N410K | S708N | M827I | A828V | N865T | R1008Q | G1824D | G1909A | L2130I | P2319S |

| Protein | ... | NS5A | NS5A | NS5A | NS5A | NS5A | NS5B | NS5B | NS5B | NS5B | NS5B |
|---|---|---|---|---|---|---|---|---|---|---|---|
| Nucleotide position | ... | 7464 | 7522 | 7588 | 7591 | 7596 | 7785 | 8292 | 8985 | 9045 | 9298 |
| Original nucleotide | ... | A | A | A | T | T | A | A | A | A | A |
| Acquired nucleotide | ... | G | G | G | C | C | G | C | C | C | G |
| Allele frequency (%) | ... | 23 | 21 | 26 | 49 | 23 | 46 | 83 | 28 | 47 | 98 |
| Amino acid change | ... | S2375G | E2394G | D2416G | V2417A | C2419R | S2482G | N2651H | I2882L | I2902L | H2986R |

Table 1 shows a next generation sequencing analysis of the open reading frame of the 1a HCV virus production. The sequence of 1a virus produced for DSP development (passage 20) was analyzed. Nucleotide and protein positions are stated relative to the TNcc sequence (GenBank accession no. JX993348) and are equivalent to positions in the 1a H77 sequence (GenBank accession no. AF009606). Positions with changes of at least 20% population prevalence are included in the table.

TABLE 2

| | HCV genotype | Virus in product [IU/mL] | Virus recovery [%] | Protein in product [µg/mL] | Protein depletion [%] | DNA in product [ng/mL] | DNA depletion [%] | DNA per 1.0E+08 IU/mL [ng] |
|---|---|---|---|---|---|---|---|---|
| SXC Capture | 1a (without nuclease) | 2.7E+08 | 105 ± 7 | <LOD | >99 | 107 ± 42 | 84 ± 3 | ~39 |
| | 1a | 9.3E+07 | 99 ± 11 | <LOD | >99 | 9 ± 1 | 94 ± 2 | ~10 |
| | 5a | 8.1E+07 | 97 ± 3 | 13 ± 5 | 97 ± 2 | 12 ± 2 | 86 ± 1 | ~15 |
| SCMA Polishing | 1a (without nuclease) | 1.7E+08 | 63 ± 16 | <LOD | >99 | 57 ± 17 | 90 ± 6 | ~33 |
| | 1a | 3.5E+07 | 50 ± 16 | <LOD | >99 | 2 ± 0.5 | 99 ± 0.5 | ~5 |
| | 5a | 3.2E+07 | 49 ± 5 | <LOD | >99 | 3 ± 1 | 98 ± 1 | ~9 |

LOD: Limit of detection, n = 3 for all steps

Table 2 shows an overview on viral recovery and impurity depletion for the two chromatography-based process steps and cell culture-derived genotype 1a and 5a HCV. Shown are the values for SXC capture at pH 9 and the SCMA polishing using a TRIS buffer at pH 7.4. Recoveries are step recoveries comparing feed and product fractions of the respective step, and depletions are overall values, related to the initial feed concentrations before nuclease treatment and SXC. For a better overview, normalized DNA contents are given for each step, calculated for virus titres of 1.0E+08. While stated values for protein and DNA concentrations are rounded, values for % protein and DNA depletion as well as DNA per 1.0E+08 IU/ml were calculated using non-rounded values.

REFERENCES

Altschul, S. F. et al. Gapped BLAST and PSI-BLAST: a new generation of protein database search programs. Nucleic acids research 25, 3389-3402; 10.1093/nar/25.17.3389 (1997).

Altschul, S. F. et al. Protein database searches using compositionally adjusted substitution matrices. The FEBS journal 272, 5101-5109; 10.1111/j.1742-4658.2005.04945.x (2005).

Fortuna, A. R. et al. Use of sulfated cellulose membrane adsorbers for chromatographic purification of cell cultured-derived influenza A and B viruses. Separation and Purification Technology 226, 350-358; 10.1016/j.seppur.2019.05.101 (2019).

Jensen, S. B. et al. Evolutionary Pathways to Persistence of Highly Fit and Resistant Hepatitis C Virus Protease Inhibitor Escape Variants. Hepatology (Baltimore, Md.) 70, 771-787; 10.1002/hep.30647 (2019).

Lee, J. et al. Principles and applications of steric exclusion chromatography. Journal of chromatography. A 1270, 162-170; 10.1016/j.chroma.2012.10.062 (2012).

Li, Y.-P. et al. Highly efficient full-length hepatitis C virus genotype 1 (strain TN) infectious culture system. PNAS 109, 19757-19762; 10.1073/pnas.1218260109 (2012).

Lindenbach, B. D. et al. Complete replication of hepatitis C virus in cell culture. Science (New York, N.Y.) 309, 623-626; 10.1126/science.1114016 (2005).

Lothert, K. et al. Membrane-Based Steric Exclusion Chromatography for the Purification of a Recombinant Baculovirus and its Application for Cell Therapy. Journal of Virological Methods, 113756; 10.1016/j.jviromet.2019.113756 (2019).

Marichal-Gallardo, P., Pieler, M. M., Wolff, M. W. & ReichL, U. Steric exclusion chromatography for purification of cell culture-derived influenza A virus using regenerated cellulose membranes and polyethylene glycol. J. Chromatogr. A 1483, 110-119; 10.1016/j.chroma.2016.12.076 (2017).

Mathiesen, C. K. et al. Production and characterization of high-titer serum-free cell culture grown hepatitis C virus particles of genotype 1-6. Virology 458-459, 190-208; 10.1016/j.virol.2014.03.021 (2014).

Mathiesen, C. K. et al. Adaptive Mutations Enhance Assembly and Cell-to-Cell Transmission of a High-Titer Hepatitis C Virus Genotype 5a Core-NS2 JFH1-Based Recombinant. Journal of virology 89, 7758-7775; 10.1128/JVI.00039-15 (2015).

Scheel, T. K. H., Gottwein, J. M., Mikkelsen, L. S., Jensen, T. B. & Bukh, J. Recombinant HCV variants with NS5A from genotypes 1-7 have different sensitivities to an NS5A inhibitor but not interferon-α. Gastroenterology 140, 1032-1042; 10.1053/j.gastro.2010.11.036 (2011).

| Sequence listing |
|---|
| SEQ ID NO. 1 - Amino acid sequence of HCV genotype 1a strain TNcc |
| SEQ ID NO. 2 - Nucleotide sequence of HCV genotype 1a strain TNcc |
| SEQ ID NO. 3 - Amino acid sequence of HCV genotype 5a used in the experiments |
| SEQ ID NO. 4 - Nucleotide sequence of HCV genotype 5a used in the experiments |
| SEQ ID NO. 5 - 5' FAM-CCTTGTGGTACTGCCTGA-MGB 3' (Probe used for HCV quantification (example 1)) |
| SEQ ID NO. 6 - 5' AGYGTTGGGTYGCGAAAG 3' (Forward primer used for HCV quantification (example 1)) |
| SEQ ID NO. 7 - 5' CACTCGCAAGCRCCCT 3' (Reverse primer used for HCV quantification (example 1)) |

Items
1. A method of purifying whole virus particles, the method comprising the steps of
   a) providing a cell culture supernatant comprising virus particles,
   b) purification and/or concentration of the cell culture supernatant,
   c) purification and/or concentration of the product of above step b) using chromatography,
   d) purification and/or concentration of the product of above step c) using chromatography,
   e) obtaining purified whole virus particles.
2. The method according to item 1, wherein the chromatography used in step c) is steric exclusion chromatography (SXC) and the chromatography used in step d) is sulphated cellulose membrane absorbers (SCMA).
3. The method according to any one of the items 1-2, wherein the virus particles are HCV particles.
4. The method according to item 3, wherein the HCV particles is of a genotype selected from the group consisting of genotype 1, 2, 3, 4, 5, 6, 7 and 8 as well as their subtypes.
5. The method according to any of the preceding items, wherein the virus particles are inactivated prior to step c).
6. The method according to any of the preceding items, wherein the purification and/or concentration in step b) is performed using filtration.
7. The method according to any of the preceding items, wherein the purification in step b) comprises at least one step of clarification.
8. The method according to any of the preceding items, wherein step b) further comprises at least one step of ultrafiltration.
9. The method according to any of the preceding items, wherein the method further comprises a step of nuclease treatment.
10. The method according to any of the preceding items, wherein the SXC is performed using cellulose membranes.
11. The method according to any of the preceding items, wherein the SXC is performed at a pH in the range of 8-10, such as 8.5-9.5, like around 9.
12. The method according to any of the preceding items, wherein the SCMA is performed using Sartobind® sulphated cellulose membranes.
13. The method according to any of the preceding items, wherein the method does not comprise a step of freezing.
14. The method according to any of the preceding items, the method comprising the steps of:
    a) providing a cell culture supernatant comprising virus particles,
    b1) at least one clarification of the cell culture supernatant,
    b2) at least one ultrafiltration of the product of step b1)
    c) purification and/or concentration of the product of above step b) using SXC, optionally at alkaline pH in the range of 8-10, such as 8.5-9.5, like around 9,
    d) purification and/or concentration of the product of above step c) using SCMA,
    e) obtaining purified whole virus particles.
15. The method according to item 14, wherein step b1) comprises two steps of clarification and/or step b2) comprises two steps of ultrafiltration.

The invention claimed is:

1. A method of purifying whole hepatitis C virus (HCV) particles, the method comprising:
   a) providing a cell culture supernatant comprising virus particles,
   b) purifying and/or concentrating the cell culture supernatant,
   c) purifying and/or concentrating the product of step b) using steric exclusion chromatography (SXC) at alkaline pH in the range of 8-10,
   d) purifying and/or concentrating the product of step c) using sulphated cellulose membrane absorbers (SCMA), and
   e) obtaining purified whole virus particles.

2. The method according to claim 1, wherein the HCV particles is of a genotype selected from the group consisting of genotype 1, 2, 3, 4, 5, 6, 7 and 8 or their subtypes.

3. The method according to claim 1, wherein the HCV particles are full length or an intra- or intergenotypic recombinant.

4. The method according to claim 1, wherein the virus particles are inactivated.

5. The method according to claim 4, wherein the virus particles are inactivated prior to step c).

6. The method according to claim 1, wherein step b) is performed using filtration.

7. The method according to claim 1, wherein step b) comprises at least one step of clarification.

8. The method according to claim 1, wherein step b) further comprises at least one step of ultrafiltration.

9. The method according to claim 1, wherein the method further comprises a nuclease treatment.

10. The method according to claim 9, wherein the nuclease treatment is performed during step b).

11. The method according to claim 1, wherein the SXC is performed using cellulose membranes.

12. The method according to claim 1, wherein the SCMA is performed using sulphated cellulose membranes.

13. The method according to claim 1, wherein the method does not comprise a step of freezing.

14. The method according to claim 1, wherein the method comprises:
   a) providing a cell culture supernatant comprising virus particles,
   b1) clarifying the cell culture supernatant at least once,
   b2) performing at least one ultrafiltration of the product of step b1)
   c) purifying and/or concentrating the product of step b) using SXC,
   d) purifying and/or concentrating the product of step c) using SCMA, and
   e) obtaining purified whole virus particles.

15. The method according to claim 14, wherein step b1) comprises two steps of clarification and/or step b2) comprises two steps of ultrafiltration.

* * * * *